US010376851B2

(12) United States Patent
Mochizuki

(10) Patent No.: US 10,376,851 B2
(45) **Date of Patent: *Aug. 13, 2019**

(54) MIXING UNIT AND DEVICE, AND FLUID MIXING METHOD

(71) Applicant: ISEL CO., LTD., Osaka (JP)

(72) Inventor: Noboru Mochizuki, Osaka (JP)

(73) Assignee: ISEL CO., LTD., Osaka (JP)

(*) Notice: Subject to any disclaimer, the term of this patent is extended or adjusted under 35 U.S.C. 154(b) by 7 days.

This patent is subject to a terminal disclaimer.

(21) Appl. No.: 15/484,352

(22) Filed: Apr. 11, 2017

(65) Prior Publication Data

US 2017/0216786 A1 Aug. 3, 2017

Related U.S. Application Data

(63) Continuation-in-part of application No. 14/203,188, filed on Mar. 10, 2014, now Pat. No. 9,656,223,
(Continued)

(30) Foreign Application Priority Data

Jun. 16, 2008 (JP) ................................. 2008-157237
Oct. 22, 2008 (JP) ................................. 2008-272394
(Continued)

(51) Int. Cl.
*B01F 5/00* (2006.01)
*B01F 5/06* (2006.01)
(Continued)

(52) U.S. Cl.
CPC .......... *B01F 5/0604* (2013.01); *B01F 5/0694* (2013.01); *B01F 5/104* (2013.01);
(Continued)

(58) Field of Classification Search
CPC .. B01F 5/00; B01F 5/06; B01F 5/0602–0604; B01F 5/0682;
(Continued)

(56) References Cited

U.S. PATENT DOCUMENTS 6,568,845 B1 * 5/2003 Harada ................. B01F 5/0603 366/340
8,715,585 B2 * 5/2014 Mochizuki ............ B01F 5/0604 366/220
(Continued)

FOREIGN PATENT DOCUMENTS

JP 10216495 A * 8/1998
JP 10314563 A * 12/1998
(Continued)

OTHER PUBLICATIONS

Machine translation of JP 11-009980 A, which was published on Jan. 19, 1999. (Year: 1999).*
(Continued)

*Primary Examiner* — Natasha E Young
(74) *Attorney, Agent, or Firm* — Nakanishi IP Associates, LLC

(57) ABSTRACT

A mixing unit includes a mixing body having mixing elements that are stacked in a stacking direction and that extend in an extending direction. The mixing elements have a plurality of first through holes to form a flow path therein, and are arranged such that part or all of the first through holes in one of the mixing elements communicate with first through holes in the adjacent mixing elements to allow fluid to be passed in the direction in which the mixing element extends.

20 Claims, 52 Drawing Sheets

Related U.S. Application Data which is a continuation-in-part of application No. PCT/JP2013/056439, filed on Mar. 8, 2013, said application No. 14/203,188 is a continuation-in-part of application No. 12/999,102, filed as application No. PCT/JP2009/060922 on Jun. 16, 2009, now Pat. No. 8,715,585.

(60) Provisional application No. 61/610,290, filed on Mar. 13, 2012.

(30) Foreign Application Priority Data

| | | |
|---|---|---|
| Feb. 27, 2009 | (JP) | 2009-045414 |
| Jun. 2, 2009 | (JP) | 2009-132802 |

(51) Int. Cl.

| | |
|---|---|
| ***B01F 5/10*** | (2006.01) |
| ***B01F 5/12*** | (2006.01) |
| ***B01F 7/00*** | (2006.01) |
| ***B01F 15/00*** | (2006.01) |
| ***B01J 19/00*** | (2006.01) |
| ***B01J 19/18*** | (2006.01) |
| ***B01J 19/24*** | (2006.01) |
| ***B01F 7/16*** | (2006.01) |

(52) U.S. Cl.

CPC ............ *B01F 5/12* (2013.01); *B01F 7/00241* (2013.01); *B01F 7/00458* (2013.01); *B01F 7/00491* (2013.01); *B01F 7/00633* (2013.01); *B01F 7/1625* (2013.01); *Y10T 29/49885* (2015.01)

(58) Field of Classification Search

CPC ........ B01F 5/0687; B01F 5/0688; B01F 5/10; B01F 5/104; B01F 7/00; B01F 7/00008; B01F 7/00233; B01F 7/00341; B01F 7/0035; B01F 7/0045; B01F 7/00458; B01F 7/00491; B01F 7/00625; B01F 7/00633; B01F 15/00; B01F 15/00922; B01F 2215/00; B01F 2215/0001; B01F 2215/0036; B01J 19/00; B01J 19/18; B01J 19/24

See application file for complete search history.

(56) References Cited

U.S. PATENT DOCUMENTS

| | | | | |
|---|---|---|---|---|
| 9,656,223 | B2 * | 5/2017 | Mochizuki | B01F 5/12 |
| 2018/0339277 | A1 * | 11/2018 | Mochizuki | B01F 5/0604 |

FOREIGN PATENT DOCUMENTS

| | | | |
|---|---|---|---|
| JP | 11009980 A | * | 1/1999 |
| JP | 11114396 A | * | 4/1999 |

OTHER PUBLICATIONS

Machine translation of JP 10-216495 A, which was published on Aug. 18, 1998. (Year: 1998).*

Machine translation of JP 11-114396 A, which was published on Apr. 27, 1999. (Year: 1999).*

* cited by examiner

MIXING UNIT AND DEVICE, AND FLUID MIXING METHOD

CROSS-REFERENCE TO RELATED APPLICATIONS

This application is a continuation-in-part of application Ser. No. 14/203,188, now U.S. Pat. No. 9,656,223 (filed on Mar. 10, 2014).

The application Ser. No. 14/203,188, now U.S. Pat. No. 9,656,223, is a continuation-in-part of application Ser. No. 12/999,102, now U.S. Pat. No. 8,715,585 (filed on Dec. 15, 2010), which claims the benefit of priority from International Patent Application No. PCT/JP2009/060922, now WO 2009/154188 (filed on Jun. 16, 2009) which further claims the benefit of priority from U.S. Provisional Patent Application No. 61/610,290 (filed on Mar. 12, 2012).

Also, the application Ser. No. 14/203,188 is a continuation-in-part of application of International Patent Application No. PCT/JP2013/056439, now WO2013/137136 (filed on Mar. 8, 2013), which claims the benefit of priority from U.S. Provisional Application No. 61/610,290 (filed on Mar. 13, 2012).

The entire contents of the above applications, which the present application is based on, are incorporated herein by reference.

BACKGROUND OF THE INVENTION

1. Field of the Invention

The present invention relates to a mixing unit for mixing a fluid such as a liquid or a gas and a device using such a mixing unit, and, more particularly, relates to a mixing unit that can be suitably utilized for static mixing where a fluid is mixed by being passed, dynamic mixing where a fluid is mixed by rotation within the fluid, the promotion of a reaction involving the mixing of a liquid and the like, and to a device and a method using such a mixing unit.

2. Description of the Related Art

As a static mixing device for mixing a fluid, a Kenics-type static mixer or the like is widely used. Since this type of static mixing device generally does not include a movable component, the static mixing device is widely used in fields, such as the chemical industry and the food industry, in which fluids are required to be mixed in piping. On the other hand, as a dynamic mixing device, a product is widely used in which an agitation impeller is provided in a fluid within a mixing vessel and which rotates the agitation impeller to mix the fluid.

As a conventional static fluid mixing device, there is a static fluid mixing device which includes a tubular case body and a plurality of types of disc-shaped elements where a plurality of holes are drilled a predetermined space apart within the tubular case body, and in which the elements are sequentially combined in the direction of thickness thereof, are fitted and are fixed with connection hardware.

In the fluid mixing device described above, a plurality of types of elements are sequentially combined, and thus static mixing agitation caused by the division and combination of a fluid is performed, and mixing agitation is also performed such as by eddies and disturbance resulting from enlarged and reduced cross sections and shearing stress.

However, in the fluid mixing device described above, since the direction from the inlet to the outlet of the mixing device is the same as the direction of the division and aggregation of the fluid, its static mixing effect is low. Although the cross sections of holes are enlarged and reduced to increase its flow resistance and thus the mixing effect is improved, the loss of pressure in the entire device is increased. Since the holes are trapezoidal and have a flow reduction portion, it is difficult to process the holes.

As another conventional static fluid mixing device, there is a static fluid mixing device that includes a cylindrical casing and a mixing unit member which is formed with a first mixing hollow core group and a second mixing hollow core group, each having a plurality of hollow cores within a cylindrical member inserted into the cylindrical casing.

In the fluid mixing device described above, a fluid entering from its inlet is prevented from flowing linearly to changes direction, and flows radially between the hollow cores communicating with each other, with the result that the fluid is dispersed and mixed such as by collision, dispersion, combination, meandering and eddying flow. Since the direction from the inlet to the outlet of the mixing device differs from the direction of the division and aggregation of the fluid, its static mixing effect is high.

However, in the fluid mixing device described above, since the mixing unit member is formed with only the first mixing hollow core group and the second mixing hollow core group, the dispersion and combination of the fluid is performed only planarly and two-dimensionally with respect to the radial direction. The fluid only flows alternately between the first mixing hollow core group and the second mixing hollow core group, which overlap each other, and is thereby prevented from extending in the direction in which the first mixing hollow core group and the second mixing hollow core group overlap each other, with the result that the loss of pressure is increased.

SUMMARY OF THE INVENTION

One or more embodiments of the present invention provides a mixing device, and a pump mixture, an agitation impeller, a reaction device or a catalyst unit using such a mixing device, which has a simple structure and is easy to be made, applicable to versatile use according to desired mixing degrees.

According to one or more embodiments of the present invention, there is provided a mixing unit including a mixing body including mixing elements that are stacked in a stacking direction and that extend in an extending direction; wherein the mixing elements have a plurality of first through holes to form a flow path therein, and the mixing elements are arranged such that part or all of the first through holes in one of the mixing elements, whose upper surface is in contact with another mixing element and whose lower surface is in contact with another mixing element, communicate with first through holes in the adjacent mixing elements to allow fluid to be passed in the extending direction in which the mixing element extends and to be divided as the fluid passes into the mixing elements.

According to one or more embodiments of the present invention, there is provided a mixing unit including a mixing body having mixing elements that are stacked in a stacking direction and that extend in an extending direction; wherein the mixing elements have a plurality of first through holes to form a flow path therein, and the mixing elements are arranged such that part or all of the first through holes in one of the mixing elements communicate with first through holes in the adjacent mixing elements to allow fluid to be passed in the direction in which the mixing element extends, wherein the mixing elements include second through holes and are arranged such that the second through holes communicate with each other in a direction in which the mixing elements are stacked so as to form a hollow portion in the mixing body.

According to one or more embodiments of the present invention, there is provided an agitation impeller having one of the above-described mixing units that is disposed to be driven to rotate, and further provided an agitation device including the agitation impeller and a mixing vessel within the agitation impeller is disposed.

According to one or more embodiments of the present invention, there is provided a mixer including a casing having a suction port that sucks fluid, and a discharge port that discharges fluid mixed within the casing; a mixing unit supported by the casing for a rotatable movement around a rotational axis within and relative to the casing, and having a hollow part provided with an opening port around the rotational axis; and a flow path disposed within the mixing unit communicating the hollow part with a periphery of the mixing unit, wherein the casing sucks the fluid through the suction port from an outside of the casing into an inside of the casing, mixes the fluid within the casing, and discharges the fluid through the discharge port to the outside of the casing.

According to one or more embodiments of the present invention, there is provided a mixing system including the above-described mixer and a fluid circulating path communicating between the discharge port to the suction port of the mixer to allow the fluid to flow from the discharge port to the suction port for a circulation movement.

According to one or more embodiments of the present invention, there is provided a mixing unit including a mixing body including mixing elements that are stacked in a stacking direction and that extend in an extending direction, a first layer, and a second layer disposed opposite the first layer, wherein the mixing body is sandwiched between the first layer and the second layer.

According to one or more embodiments of the present invention, there is provided a reaction device including the above-mentioned mixing unit disposed within a vessel provided with an inlet and an outlet for reacting fluid within the vessel.

According to one or more embodiments of the present invention, there is provided a reaction device including one of the above-mentioned mixing units, wherein each of the mixing elements comprises a partition wall between the first through holes.

According to one or more embodiments of the present invention, there is provided a fluid mixing method using one of the above-described mixing units, including the steps of: passing fluid into the mixing body, and dividing the fluid through the first through holes arranged in the direction in which the mixing element extends.

According to one or more embodiments of the present invention, there is provided a manufacturing method for a mixing unit, the method including: forming mixing elements extending in an extending direction, each of which includes first through holes; and forming a mixing body by the mixing elements, wherein the mixing elements are arranged such that at least one of the first through holes of one of the mixing elements communicates with at least one of the first through holes in an adjacent one of the mixing elements to allow fluid to be passed in the extending direction to provide a flow path that divides the fluid in the extending direction.

According to one or more embodiments of the present invention, there is provided a mixing unit including a mixing body having a plurality of mixing elements which are stacked, and a first layer and a second layer between which the mixing body is sandwiched and which are arranged opposite each other, wherein each of the mixing elements has a plurality of first through holes, the first layer has a surface in contact with the mixing body for blocking a fluid flow from the mixing body, the second layer has an opening portion communicating with at least one of the first through holes in the mixing body, and each of the mixing elements has a partition wall to constitute the first through holes provided by the partition wall, wherein mixing elements are arranged such that, a part of the partition wall of one of mixing elements extending in a direction crossing a direction in which the mixing element extends is differently positioned between adjacent one of mixing elements to provide a flow path for passing fluid within one of the first through holes to one of the first through holes in adjacent one of mixing elements in the direction in which the mixing element extends and for dividing, the fluid in a direction in which mixing elements are stacked is provided, and wherein the opening portion of the second layer is an inlet or outlet of fluid and an outer circumferential side of the mixing body is an outlet or inlet of the fluid.

The "extending surface" described above refers to a surface extending in a direction in which the mixing element extends. The "extending surface" in one or more embodiments of the present invention includes surfaces that are formed not only planarly but also three-dimensionally such as curvedly and conically.

According to one or more embodiments of the present invention, there is provided a fluid that is mixed by the fluid mixing method described above.

According to one or more embodiments of the present invention, the mixing unit according to one or more embodiments of the present invention may be formed by a 3-D printer.

According to one or more embodiments of the present invention, a program for manufacturing the mixing unit according to one or more embodiments of the present invention may be stored on a non-transitory computer-readable medium.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Returning to FIG. 1 there is shown an exploded perspective view of a cylindrical-shaped mixing unit 1*a* in accordance with a first embodiment of the present invention. Mixing unit 1*a* includes a mixing body or staked member 2 having a plurality of mixing elements 21 (21*a* and 21*b*; here exemplary, three mixing elements) which are alternately stacked, a first plate 3, and a second plate 4. FIG. 2 is a plan view showing two types of mixing elements 21*a* and 21*b* (exemplary, a pair of mixing elements) of mixing unit 1*a* and a state of mixing elements 21*a* and 21*b* stacked. FIG. 3A is a partial plan view of the mixing elements (exemplary, three mixing elements) and FIG. 3B is a cross-sectional view showing a state of flow of a fluid A within mixing unit 1*a*.

Figure 1:
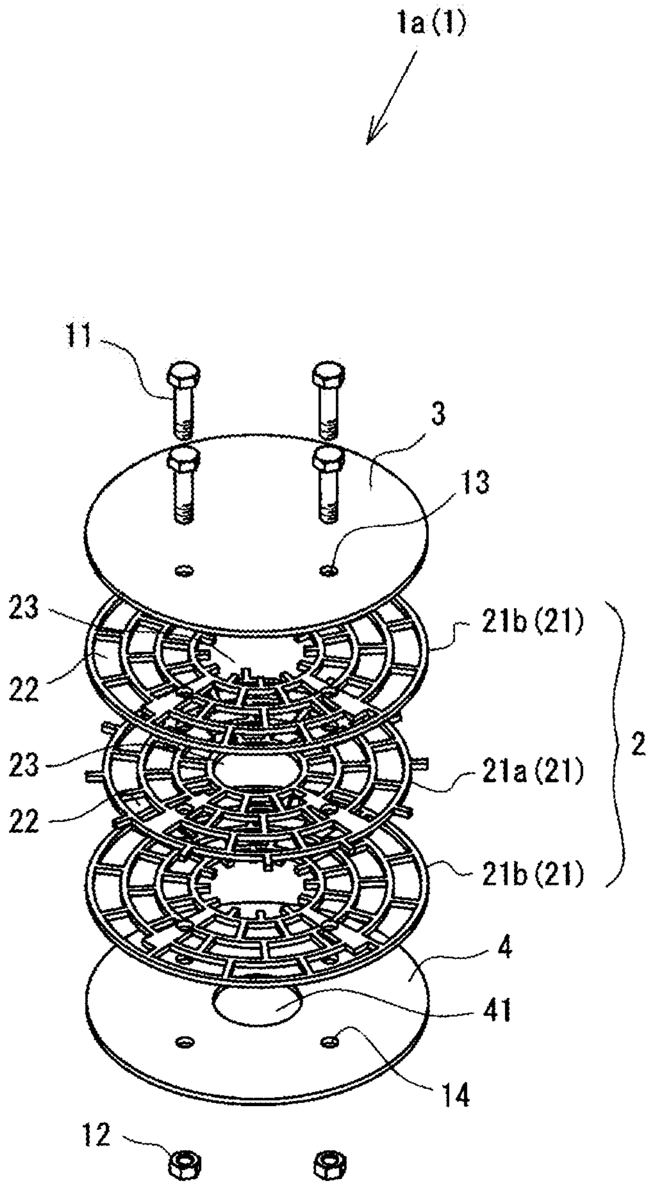
FIG. 1 is an exploded perspective view of a mixing unit in accordance with a first embodiment of the present invention.
Figure 2:
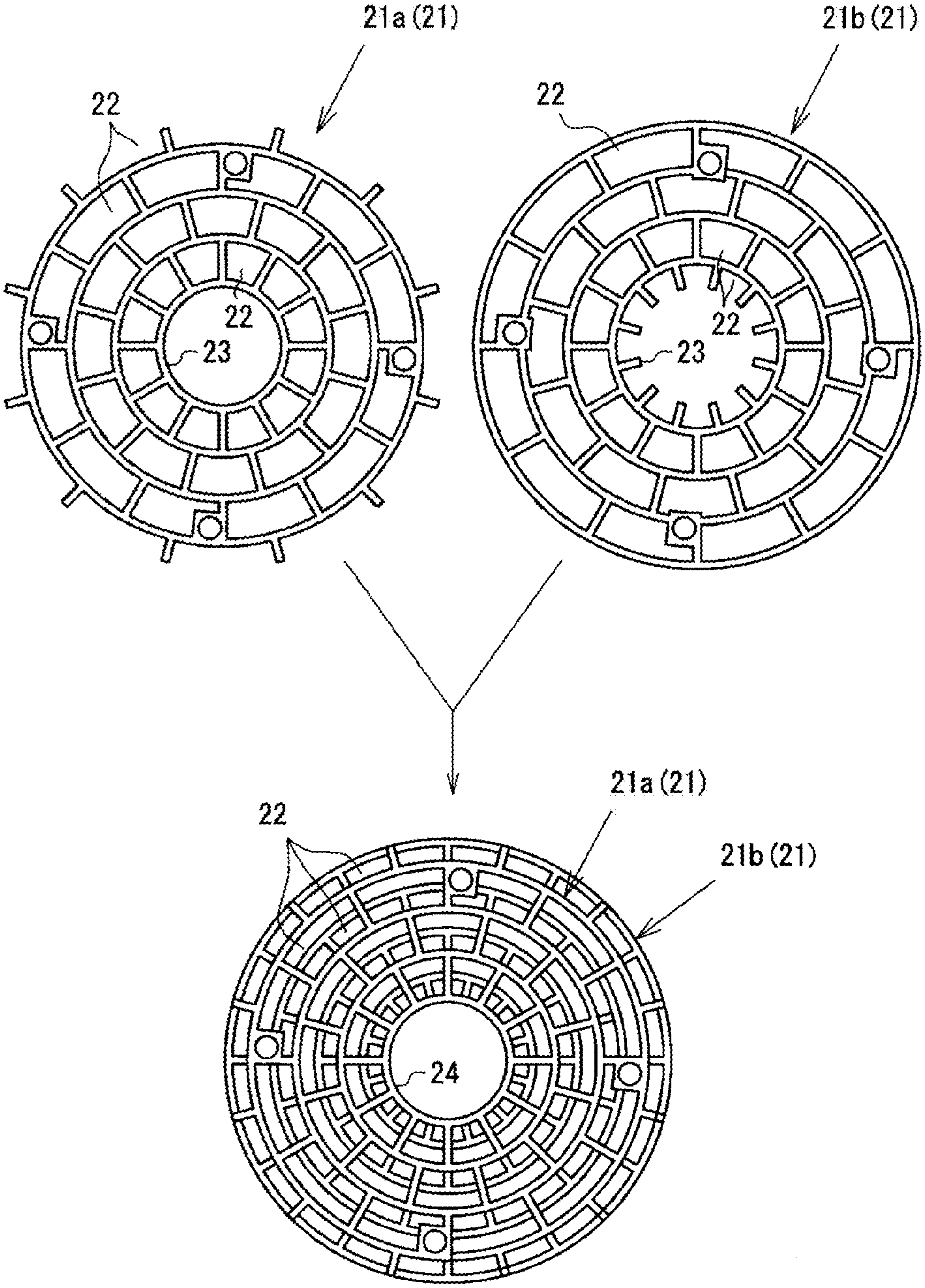
FIG. 2 is a plan view of mixing elements employed by the mixing unit of FIG. 1.
Figure 3A:
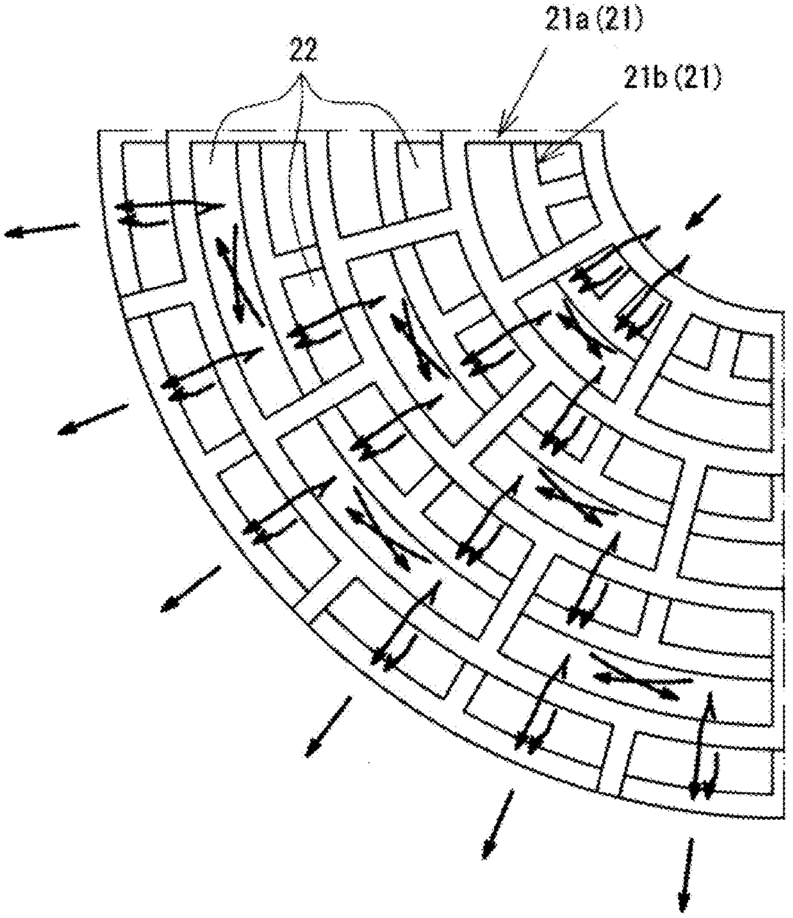
FIG. 3A is a partial plan view of the mixing elements and FIG. 3B is a cross-sectional view showing a state of flow of a fluid within the mixing unit of FIG. 1.
Figure 3B:
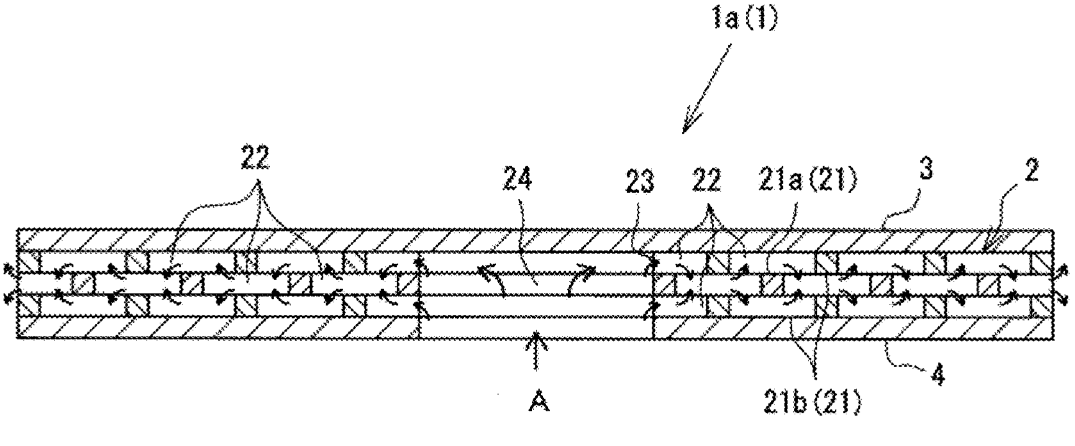

As shown in FIGS. 1 and 2, mixing unit 1*a* is configured by sandwiching a mixing body 2, in which a plurality of two types of disc-shaped mixing elements 21*a* and 21*b* are alternately stacked, between first plate 3 and second plate 4, for example, fixed with four bolts 11 and nuts 12 appropriately arranged. Although here, three mixing elements are stacked, according to one or more embodiments of the present invention, more than three mixing elements may be employed. Mixing elements 21*a* and 21*b* and first and second plates 3 and 4 can be separated from each other; thus, mixing unit 1*a* may be disassembled.

First plate 3 is a disc that has holes 13 for the bolts and no other holes. Second plate 4 has not only holes 14 for the bolts but also a circular opening portion 41, in a center portion, through which fluid A flows in and out as shown in FIG. 3B. First plate 3 and second plate 4 are substantially equal in outside diameter to mixing elements 21*a* and 21*b*. An outside shape of first plate 3 is larger than opening portion 41 of second plate 4.

The two types of mixing elements 21*a* and 21*b* each have a plurality of first through holes 22 penetrating in the direction of thickness thereof. In other words, a plurality of first through holes are provided along an extending surface that extends in a direction in which mixing elements 21*a* and 21*b* extend. Moreover, the two types of mixing elements 21*a* and 21*b* each has substantially circular second through holes 23 in the center portion. Second through hole 23 is substantially equal in inside diameter to and is substantially concentric with opening portion 41 of second plate 4. As mixing elements 21*a* and 21*b* are stacked, the second through holes 23 form a hollow portion 24.

Each of the first through holes 22 is substantially rectangular as seen in plan view, and is arranged concentrically with respect to the center of the second through hole 23. The first through holes 22 are staggered; the two types of mixing elements 21*a* and 21*b* differ from each other in the arrangement pattern of the first through holes 22 itself.

First through holes 22 of mixing elements 21*b* and 21*c* are partially displaced and overlapped in a radial direction and in a circumferential direction, and communicate with each other in the direction in which mixing elements 21*b* and 21*c* extend. In other words, among partition walls between first through holes 22, the partition walls that extend in a direction intersecting the direction in which mixing elements 21*a* and 21*b* extend are displaced between their adjacent mixing elements, and are arranged such that a fluid may be sequentially passed through first through holes 22 of the adjacent mixing elements 21*a* and 21*b* in the direction in which mixing elements 21*a* and 21*b* extend.

As shown in FIG. 2, on one hand, in mixing element 21*a*, first through holes 22 arranged along the inner circumferential surface are not open, and on the other hand, in mixing elements 21*b*, first through holes 22 in the inner circumferential surface are open. The size of and the pitch between first through holes 22 are increased as first through holes 22 extend outward in the radial direction. Furthermore, in the state where mixing elements 21*a* and 21*b* are stacked, the areas in which first through holes 22 overlap each other are equal to each other in the circumferential direction.

The mixing body 2 is formed by stacking the mixing elements 21*a* and 21*b* described above.

As shown in FIG. 3B, first through holes 22 of mixing elements 21*a* and 21*b* on both ends of mixing body 2 are closed, in the direction in which they are stacked, by the first plate 3 and the second plate 4 arranged opposite each other on both ends of the mixing body 2 in the stacking direction. In other words, first through holes 22 are blocked. Hence, fluid A within mixing body 2 is prevented from flowing from first through holes 22 of mixing elements 21*a* on both ends of mixing body 2 in the direction in which mixing elements 21*a* and 21*b* are stacked, and is, as shown in FIG. 3A, reliably passed within mixing body 2 in the direction in which mixing elements 21*a* and 21*b* extend. Thus, the direction in which mixing elements 21*a* and 21*b* are stacked is designed to cross the direction in which mixing elements 21*a* and 21*b* extend.

Therefore, fluid A is passed within mixing unit 1*a* from the inner circumferential portion to the outer circumferential portion or vise verse, that is, from the outer circumferential portion to the inner circumferential portion. As described above, a plurality of first through holes 22 are formed to communicate with each other such that fluid A may be passed between first through holes 22 in the direction in which mixing elements 21*a* and 21*b* extend.

In mixing unit 1*a* described above, for example, fluid A flows through the opening portion 41 of the second plate 4 into the hollow portion 24 with appropriate pressure, and then fluid A flows into mixing body 2 through first through holes 22 of mixing elements 21*a* and 21*b* which are open to the inner circumferential surface of the hollow portion 24. Then, fluid A is passed through other first through holes 22 that communicate with the above-mentioned first through holes 22, and is further passed through first through holes 22 that communicate with the above-mentioned other first through holes 22 whereby the division and combination of fluid A may be performed planarly. Finally, fluid A flows out of mixing body 2 through first through holes 22 of mixing elements 21*a* and 21*b* which are open to the outer circumferential surface of mixing body 2.

As described above, fluid A within mixing body 2 substantially radially flows through first through holes 22 communicating with each other within mixing body 2 from the inner circumferential portion to the outer circumferential portion.

A plurality of layers of flow paths along which fluid A flows are provided in the direction in which mixing elements 21*a* and 21*b* are stacked; in the example of FIG. 3B, two layers are provided. Since a plurality of flow paths that divide fluid A in the direction in which mixing elements 21*a* and 21*b* are stacked are provided, when fluid A passes through first through holes 22, as shown in FIG. 3B, fluid A is divided in the direction in which mixing elements 21*a* and 21*b* are stacked, and is thereafter combined. In other words, the flow of fluid A is performed not only two-dimensionally in the radial direction such that the division and combination are performed planarly but also three-dimensionally while extending in the direction in which mixing elements 21*a* and 21*b* are stacked.

While the flow described above is performed, fluid A is mixed by repeating dispersion, combination, reversal, turbulent flow, eddying flow, collision and the like.

Since first through holes 22 of mixing elements 21*a* and 21*b* are staggered, when the fluid flows from the above-mentioned first through holes 22 to other first through holes 22 on the upper and lower surfaces, the flow is easily divided or easily combined, and thus the fluid is efficiently mixed.

On the contrary to what has been described above, fluid A may be made to flow in through the outer circumferential portion of mixing body 2 of mixing elements 21*a* and 21*b* and flow out through the inner circumferential portion.

Hollow portion 24 is sufficiently larger in size than first through holes 22; second through holes 23 of mixing elements 21*a* and 21*b* constituting hollow portion 24 are substantially equal in inside diameter to each other, and are substantially concentric with each other. Hence, the flow resistance to fluid A flowing through hollow portion 24 is smaller than that of fluid A flowing within mixing body 2, and the loss of pressure is also smaller. Therefore, even when a large number of mixing elements 21*a* and 21*b* are stacked, fluid A substantially uniformly reaches the inner circumferential portion of mixing elements 21*a* and 21*b* regardless of the position in the direction in which mixing elements 21*a* and 21*b* are stacked, and substantially uniformly flows within mixing body 2 from the inner circumferential portion to the outer circumferential portion.

Since hollow portion 24 is provided, as compared with a case where there is no hollow portion 24, the fluid is more likely to enter mixing unit 1*a* and to be passed to first through holes 22. Likewise, the fluid entering mixing unit 1*a* through the outer circumferential side thereof and passing through first through holes 22 is made to smoothly flow out without being disturbed. If desired, hollow portion 24 in size may be same as or smaller than first through holes 22, or second through holes 23 constituting hollow portion 24 may be different in inside diameter to each other.

In first through holes 22 of mixing element 21*a* whose upper surface and lower surface are in contact with other mixing elements 21*b* respectively within mixing unit 1*a*, since fluid A flows out from the above-mentioned first through holes 22 to the above-mentioned other first through holes 22 on the upper and lower surfaces, fluid A is dispersed through the above-mentioned other first through holes 22 on the upper and lower surfaces. Moreover, since fluid A flows in from the above-mentioned other first through holes 22 on the upper and lower surfaces to the above-mentioned first through holes 22, fluid A from the above-mentioned other first through holes 22 on the upper and lower surfaces is combined. Therefore, significant mixing effects are acquired and fluid A is mixed.

In particular, when the flow rate is increased and thus the flow state is transferred to the turbulent flow, the effects of the turbulent flow and the eddying flow are increased, and thus the mixing effects of the fluid resulting from the dispersion and the combination described above are further increased. Even when the flow rate is low and thus the flow state is a laminar flow, the fluid is dispersed toward the upper and lower surfaces and is combined, with the result that the fluid is mixed.

Since first through holes 22 on both end surfaces in the stacking direction of mixing body 2 are blocked by the removable first plate 3 and second plate 4, it is possible to separately produce the individual members. For example, it is possible to produce a large number of mixing elements 21*a* and 21*b* for a short period of time by punching holes in a metal plate having a given thickness or the like. Hence, it is possible to easily and inexpensively produce mixing unit 1*a*.

Since mixing elements 21*a* and 21*b* and first plate 3 and second plate 4 may be divided into individual pieces, it is possible to easily perform a washing operation such as the removal of stuff and foreign matter left in first through holes 22 of mixing elements 21*a* and 21*b*. Since the first through holes are holes that penetrate in the direction of thickness, it is easy to clean first through holes 22 by the washing operation.

Since mixing elements 21*a* and 21*b*, first plate 3 and the second plate 4 have simple structures and may be made by plates or layers, it is possible to produce them with any applicable material such as ceramic, resins or the like. Thus, it is possible to apply mixing unit 1*a* to applications in which corrosion resistance and heat resistance are required, and to produce the mixing unit forming a single unit by 3D-printing.

Moreover, when first plate 3 and second plate 4 are appropriately held, it is possible to freely apply mixing unit 1*a* to various portions. Thus, it is possible to apply mixing unit 1*a* to various devices, and it is therefore possible to widely utilize its high mixing capability.

Thus, according to this first embodiment, there is provided a mixing unit including a mixing body including mixing elements that are stacked in a stacking direction and that extend in an extending direction; wherein the mixing elements have a plurality of first through holes to form a flow path therein, and the mixing elements are arranged such that part or all of the first through holes in one of the mixing elements, whose upper surface is in contact with another mixing element and whose lower surface is in contact with another mixing element, communicate with first through holes in the adjacent mixing elements to allow fluid to be passed in the extending direction in which the mixing element extends and to be divided as the fluid passes into the mixing elements.

Further there are provided a first layer and a second layer disposed opposite the first layer, wherein the mixing body is sandwiched between the first layer and the second layer. Though the first and second layers are respectively represented by first plate 3 and second plate 4, they may be any layers made of any applicable materials including sealant.

Second Embodiment

Figure 4A:
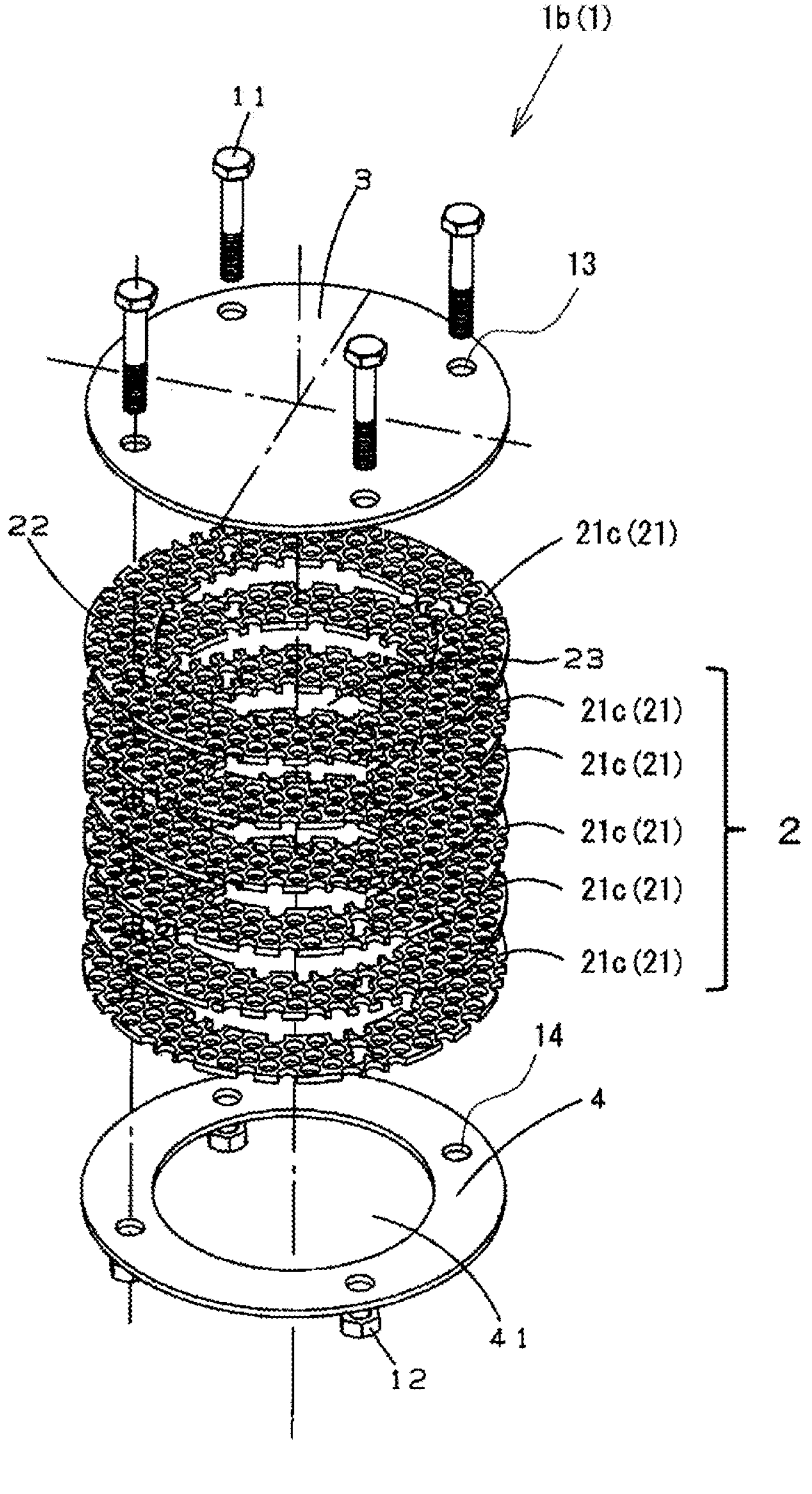
FIG. 4A is an exploded perspective view of a mixing unit in accordance with a second embodiment of the present invention.
Figure 4B:
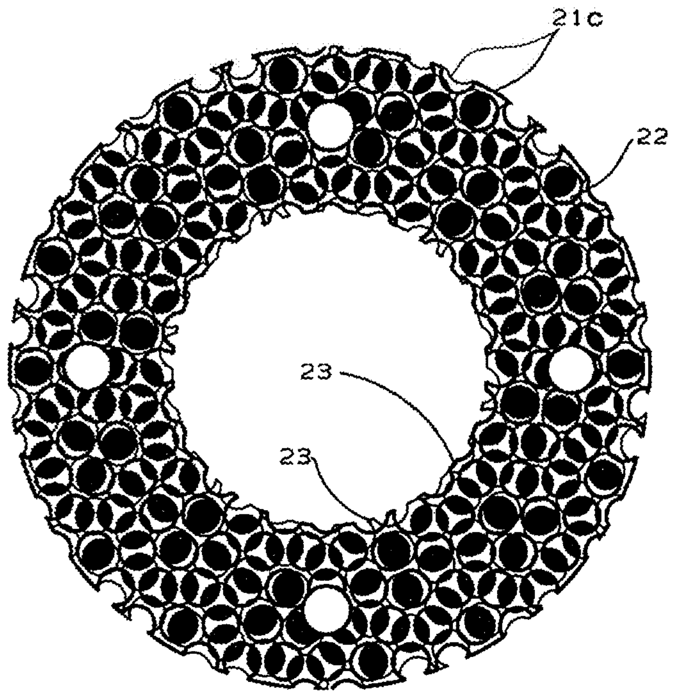
FIG. 4B is a plan view of mixing elements which are stacked to constitute the mixing unit of FIG. 4A.

FIG. 4A is an exploded perspective view of a mixing unit 1*b* including a plurality of mixing elements 21*c* which are designed to be stacked to constitute a mixing body 2 in which each mixing elements 21*c* has first through holes 22 and a second through hole 23 in its center portion in accordance with a second embodiment of the present invention. Mixing unit 1*b* further includes a first plate 3 and a second plate 4 having a circular opening portion 41 in a center portion between which mixing body 2 is sandwiched. FIG. 4B is a plan view of mixing elements 21*c* which are stacked to constitute mixing unit 1*b* of FIG. 4A and shows the overlapping of first through holes 22 in a stacked state of mixing elements 21*c* adjacent to the mixing element 21*c* in the direction in which mixing elements 21*c* are stacked. In FIG. 4B, in order for the overlapping of first through holes 22 to be clearly shown, the portions where first through holes 22 overlap each other are filled with black.

Mixing unit 1*b* of this second embodiment differs from mixing unit 1*a* of the first embodiment in that first through holes 22 are formed to be circular as seen in plan view and that the number of mixing elements 21*c* is changed from three to six. The inside diameter and the pitch of first through holes 22 are substantially equal to each other. As shown in FIG. 4B, parts of first through holes 22 are arranged such that they are displaced with respect to first through holes 22 of mixing elements 21*a* adjacent to each other and are partially overlapped, and spaces formed with first through holes 22 are made to communicate with each other in the direction in which mixing elements 21*a* extend.

Among first through holes 22, first through holes 22 on the inner circumferential edge are open to the inner circumferential surface of mixing elements 21*a*, and first through holes 22 on the outer circumferential edge are open to the outer circumferential surface of mixing elements 21*a*.

Even with the mixing unit 1*b* configured described above, fluid A made to flow into the mixing unit 1*b* with appropriate pressure flows into mixing body 2 through opening portion 41 of second plate 4 and first through holes 22 open to the inner circumferential surface of mixing elements 21*c*. Then, while fluid A is being passed radially within mixing body 2, fluid A is passed through first through holes 22 communicating with mixing elements 21*c*, with the result that fluid A is mixed.

In particular, since a larger number of mixing elements 21*c* are provided than three, a larger number of flow paths extending in the direction in which mixing elements 21*c* extend are provided than the two layers. Hence, a large number of flow paths that divide the fluid in the direction in which mixing elements 21*c* are stacked are obtained in the stacking direction, and the division and combination of fluid A is three-dimensionally performed in a wide area in the direction in which mixing elements 21*c* are stacked. Consequently, it is possible to obtain higher mixing effects. It is also possible to reduce the loss of pressure.

The other parts of the configuration of and the other effects of the mixing unit 1*b* of the second embodiment are the same as those of mixing unit 1*a* of the first embodiment.

Third Embodiment

Figure 5A:
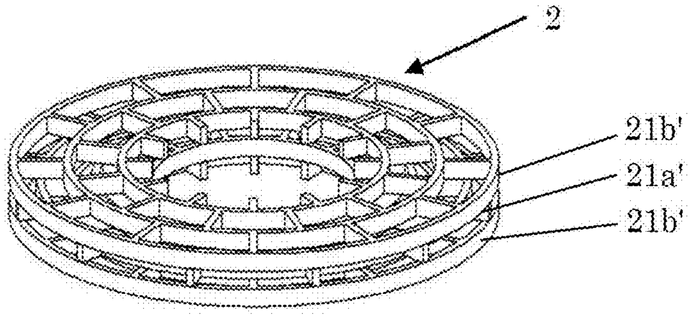
FIG. 5A is a perspective view of a mixing body in accordance with a third embodiment of the present invention.

FIG. 5A is a perspective view of a mixing body 2 in accordance with a third embodiment of the present invention, which may be employed in mixing unit 1*a* of FIG. 1 instead of mixing body 2. Mixing body 2 includes three layered portions 21*a*' and 21*b*' corresponding to mixing elements 21*a* and 21*b*, and has the same external configuration as that of mixing body 2 as shown in FIG. 3B to provide the same flow condition of fluid A in mixing body 2. Mixing body 2 is formed as a single member by 3D printing. Mixing body 2 with two layered portions with 21*a*' and 21*b*' is formed as a single member by die casting or 3D printing.

Figure 5B:
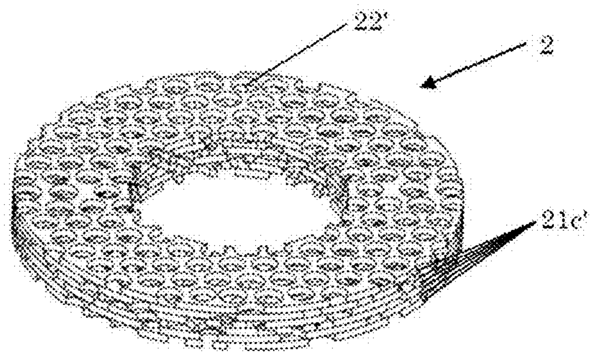
FIG. 5B a perspective view of a mixing body as one of modifications of the third embodiment.

FIG. 5B is a perspective view of a mixing body 2 which may be employed in mixing unit 1*b* of FIG. 4A instead of mixing body 2 as one of modifications of the third embodiment of the present invention. Mixing body 2 includes six layered portions each having different pattern of first through holes 22', which correspond to mixing elements 21*c* of FIG. 4A. First through holes 22' communicate in a direction crossing the extending direction with in random fashion, whereby fluid may be divided and combined in plural directions. Mixing body 2 is formed as a single member by 3D printing. If desired, first through holes 22' may be formed in a random fashion to provide a porous body.

Figure 5C:
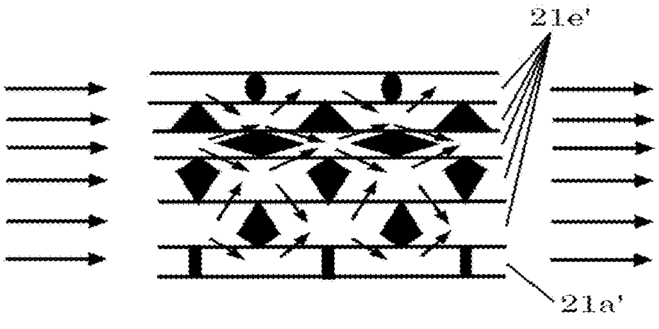
FIG. 5C is a partial schematic sectional view of a mixing unit as another modification of the third embodiment.

FIG. 5C is a partial schematic sectional view of a mixing unit employing opposing layers guiding fluid within a mixing body including a different pattern of layered portions 21*a*' (21*b*') and 21*e*' (21*f*') which correspond to mixing elements as shown in FIGS. 2, 16, 17 and 19 as another modification of the third embodiment. According to the mixing body of FIG. 5C, a fluid within the mixing body may be guided in favorite plural directions in which the fluid is divided and combined in accordance with the material of fluid. If desired, the mixing body may be formed by 3D printing.

In the third embodiment, the mixing body may provide division and combination of a fluid within the mixing body in three-dimensional plural directions. If desired, the mixing body of the third embodiment may be formed by die casting, 3D printing or other conventional way. Further, the mixing body may be employed in the mixing bodies as explained in other embodiments.

Fourth Embodiment

Figure 6A:
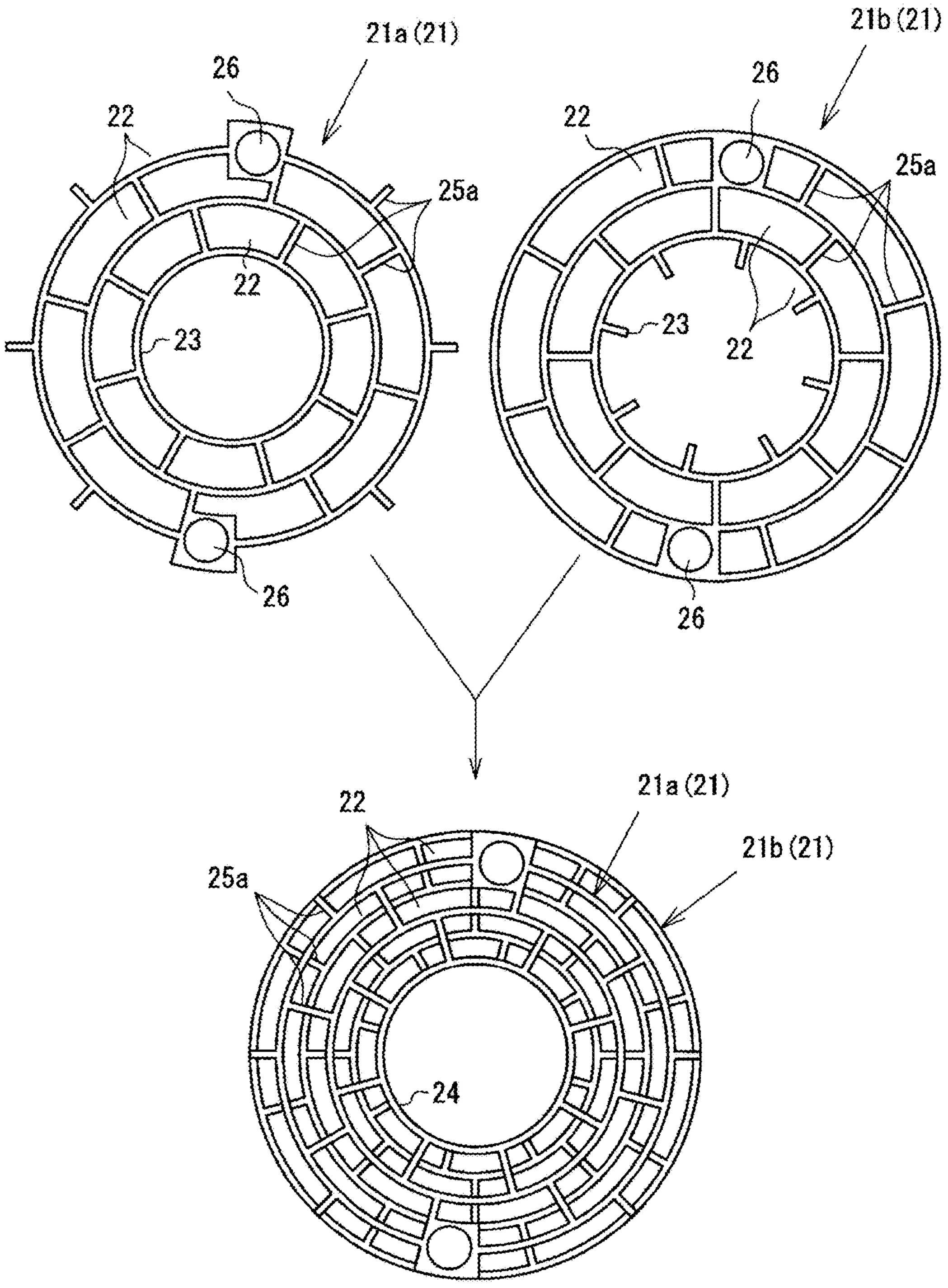
FIG. 6A is a plan view of mixing elements to constitute a mixing body in accordance with a fourth embodiment of the present invention.
Figure 6B:
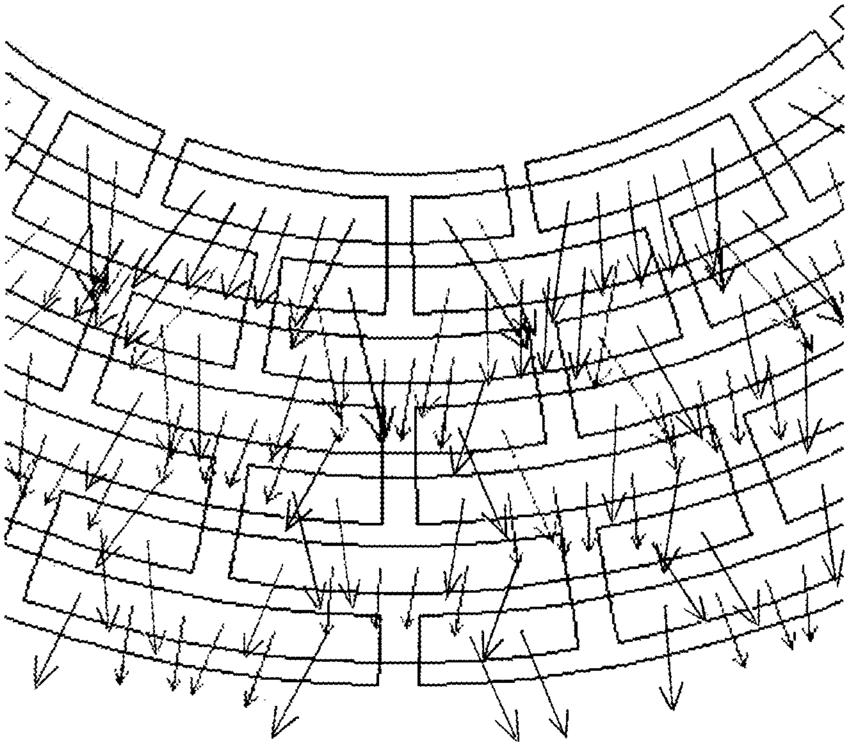
FIG. 6B is a partial plan view of the mixing elements stacked for showing a state of flow of the fluid within the mixing unit a computer analysis result.

FIG. 6A is a plan view of mixing elements 21*a* and 21*b* to constitute a mixing body and further a mixing unit in a similar manner as shown in FIG. 1 or 2 in accordance with a fourth embodiment of the present invention, and FIG. 6B is a partial plan view of mixing elements 21*a* and 21*b* stacked for showing a state of flow of the fluid within the mixing unit by a computer analysis result. Mixing elements 21*a* and 21*b* of this fourth embodiment differ from mixing elements 21*a* and 21*b* of the first embodiment in that, in the state of the two types of mixing elements 21*a* and 21*b* stacked, the area of a certain portion where first through holes 22 overlap each other is not equal in the circumferential direction to the area of another portion adjacent to the above-mentioned portion. According to one or more embodiments of the present invention, mixing elements 21*a* and 21*b* have substantially same external or internal configurations, but may have different diameters. That is, according to one or more embodiments of the present invention, the diameter of mixing element 21*a* may be smaller than the diameter of mixing element 21*b*, or vice versa.

In order to realize the configuration described above, the two types of mixing elements 21*a* and 21 *b* are configured such that, among the partition walls between first through holes 22, partition walls 25*a* extending in the radial direction are arranged at different angles with respect to an imaginary straight line passing through the center of mixing elements 21*a* and 21*b* and connecting bolt holes 26.

Even with the mixing unit including mixing elements 21*a* and 21*b* described above, the fluid is highly mixed as described above; in this case, in particular, the fluid passing through first through holes 22 is unevenly divided in the circumferential direction. Consequently, it is possible to further enhance the mixing efficiency.

FIG. 6B is a result obtained by analyzing, with a computer, a state of flow a fluid when the areas where first through holes 22 overlap each other are uneven in the circumferential direction (the structure in the fourth embodiment). As shown in FIG. 6B, it is found that the unevenness of the areas produces various types of flow of the fluid.

The other parts of the configuration of and the other effects of the mixing unit of this fourth embodiment are the same as those of mixing unit 1*a* of the first embodiment. According to this fourth embodiment, there may be provided a mixing body or a mixing unit including the mixing elements, wherein the mixing elements are arranged such that the first through hole in the one of the mixing elements overlaps the first through hole in the adjacent one of the mixing elements to allow the fluid to be unevenly divided in the extending direction.

Fifth Embodiment

Figure 7:
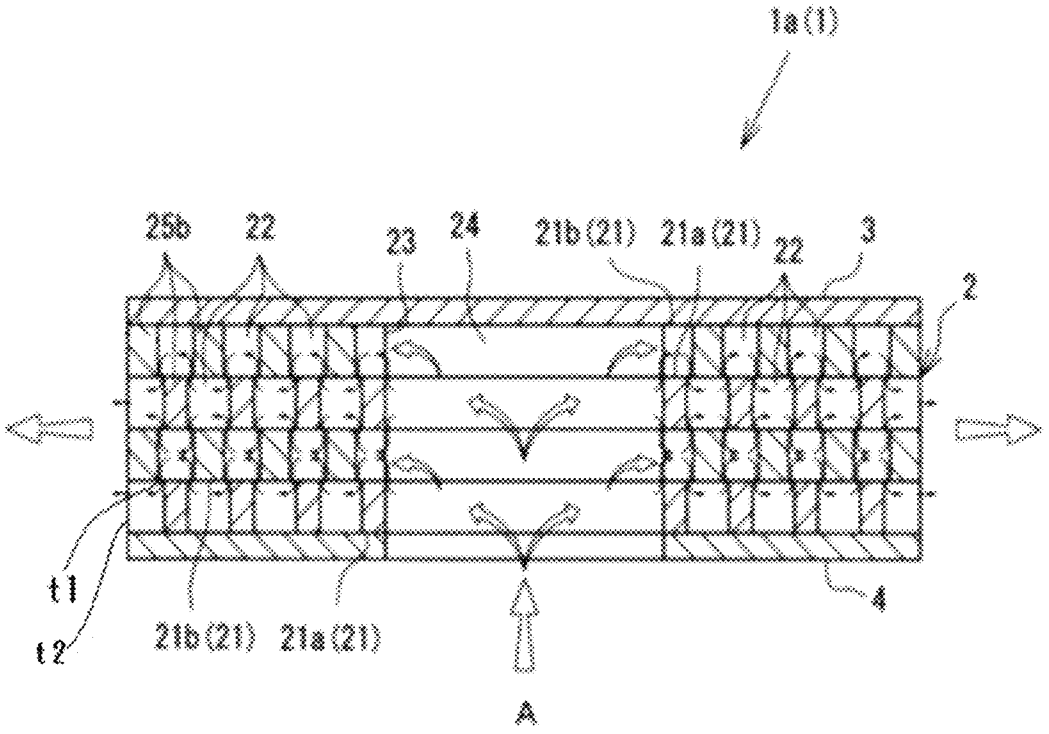
FIG. 7 is a side sectional side view of a mixing unit in accordance with a fifth embodiment of the present invention showing a state of flow of fluid within the mixing unit.

FIG. 7 is a side sectional side view of a mixing unit 1*a* including a first plate, a mixing body 2 having mixing elements 21*a* and 21*b* (here exemplary, four mixing elements), and a second plate 4 in accordance with a fifth embodiment of the present invention showing a state of flow of fluid A within mixing unit 1*a*. This mixing unit 1*a* differs from mixing unit 1*a* of the first embodiment in that, as shown in FIG. 7, a width t1 of a flow path, in the direction in which mixing elements 21*a* and 21*b* extend, that is formed in the portion where first through holes 22 overlap each other by the stacking of mixing elements 21*a* and 21*b* is narrower than a thickness t2 of a partition wall 25*b*, in the stacking direction, that is connected to the upstream side of the above-mentioned flow path and that is between the above-mentioned first through holes 22. In the example of FIG. 7, in particular, the width of the flow path is narrower than half of the thickness of partition wall 25*b*, and more specifically, is narrower than one-fourth thereof.

In mixing unit 1*a* configured as described above, when fluid A flows in the direction in which mixing elements 21*a* and 21*b* extend, fluid A likewise flows separately in the direction in which mixing elements 21*a* and 21*b* are stacked and in the direction along the extending surface extending in the direction of the extension. However, since a flow path along which fluid A flows from first through hole 22 of one mixing element 21*a* to first through hole 22 of mixing element 21*b* adjacent to the above-mentioned mixing element 21*a* is narrow, it is possible to provide a shearing force to the fluid, with the result that it is possible to enhance the degree of mixing of the fluid.

In the case where the width of the flow path is made narrower than one-fourth of the thickness of partition wall 25*b*, when the fluid flows through the flow path from one first through hole 22 into other two first through holes 22, each flow rate is increased to be twice or more as high as before, with the result that it is possible to further increase the effect of enhancing the degree of mixing of the fluid. The other parts of the configuration of and the other effects of mixing unit 1*a* of this fifth embodiment are the same as those of mixing unit 1*a* of the first embodiment.

Sixth Embodiment

Figure 8A:
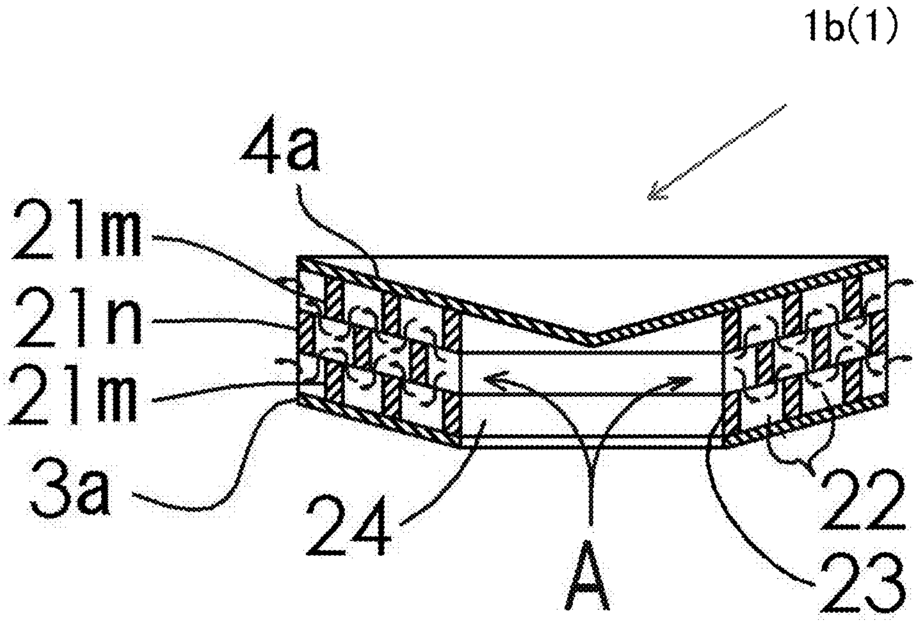
FIG. 8A is a side sectional side view of a mixing unit in accordance with a sixth embodiment of the present invention showing a state of flow of fluid within the mixing unit.

FIG. 8A is a side sectional side view of a mixing unit 1*b* in accordance with a sixth embodiment of the present invention showing a state of flow of a fluid A within mixing unit 1*b*. Mixing unit 1*b* includes a plurality of mixing elements 21*m* and 21*n* (here exemplary, three mixing elements) which are alternately stacked, a first plate 4*a*, and a second plate 3*a* having an opening portion 24. Mixing elements 21*m* and 21*n* have first through holes 22 and 23 and second through holes 24 in their center portions, in two types respectively, to provide flow paths for passing fluid A entering into second through holes 24 to outwards from an outer circumferential side of the mixing elements 21*m* and 21*n* as shown in FIG. 8A. Each of mixing elements 21*m* and 21*n* is configured to be a plate in a conical shape. The other parts of the configuration of and the other effects of the mixing unit of this sixth embodiment are the same as those of mixing unit 1*a* of the first embodiment.

Figure 8B:
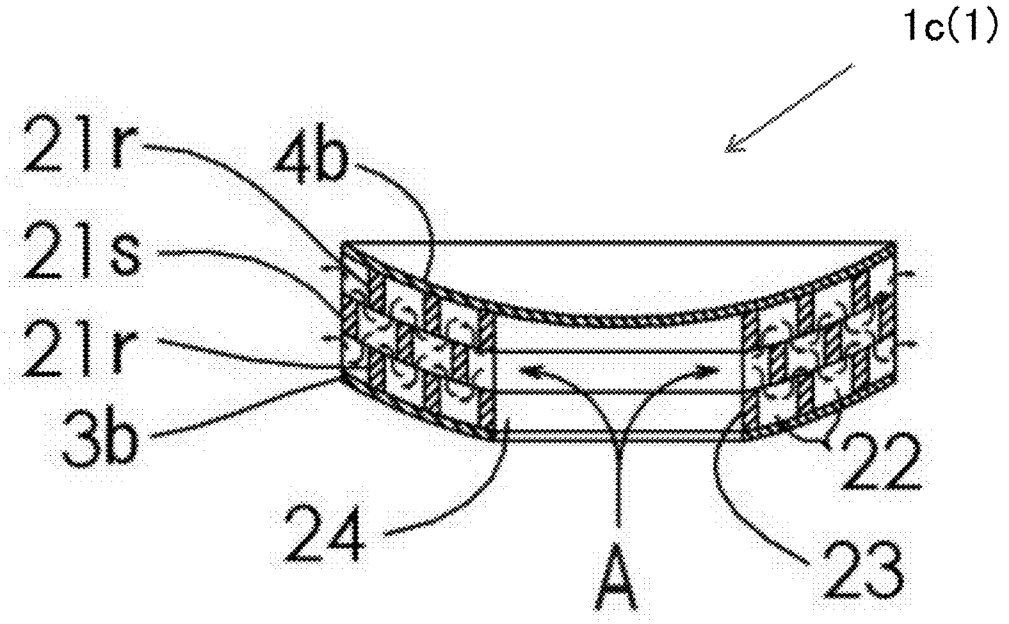
FIG. 8B is a sectional side view of a mixing unit modified from the mixing unit of FIG. 8A.

FIG. 8B is a sectional side view of a mixing unit 1*c* modified from mixing unit 1*b* of FIG. 8A, which includes a plurality of mixing elements 21*r* and 21*s* which are alternately stacked, a first plate 4*b*, and a second plate 3*b* having an opening portion 24. Mixing elements 21*r* and 21*s* have first through holes 22 and 23, and second through holes 24 in their center portions, in two types respectively, and are configured to be a plate in a partial ball shape. The other parts of the configuration of and the other effects of the mixing unit 1*c* of this sixth embodiment are the same as those of the mixing unit of the fifth or first embodiment.

Seventh Embodiment

Figure 9A:
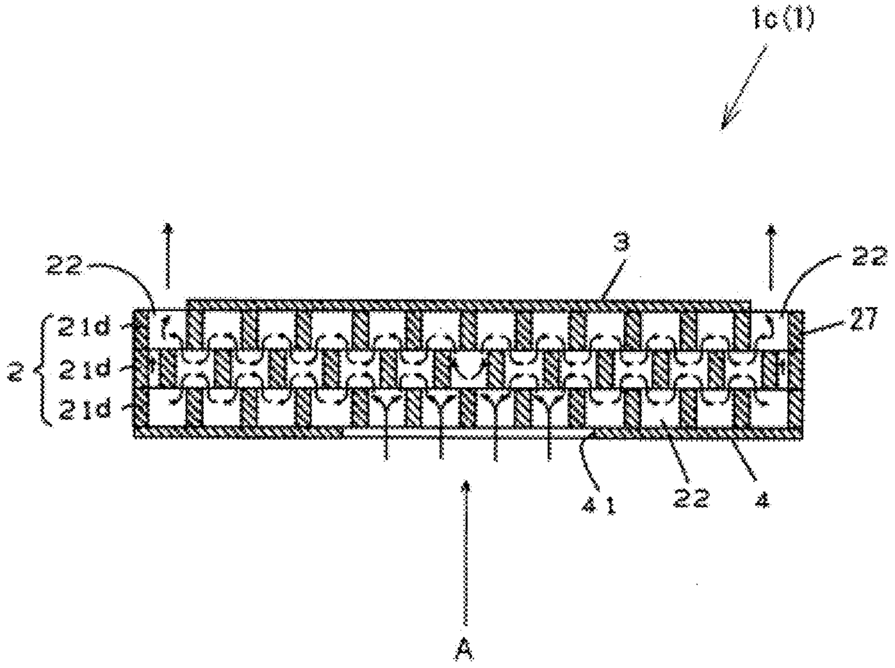
FIG. 9A is a sectional side view of a mixing unit in accordance with a seventh embodiment of the present invention showing a state of flow of fluid within the mixing unit.
Figure 9B:
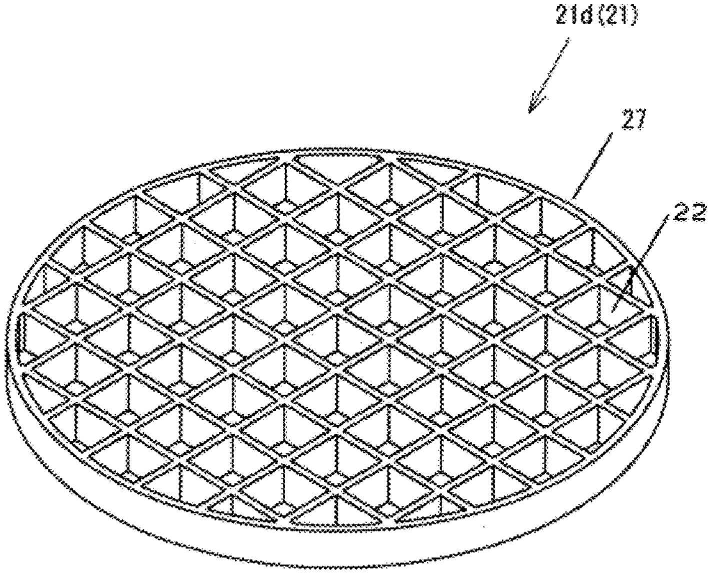
FIG. 9B is a perspective view of a mixing element employed in the mixing unit of FIG. 9A.
Figure 10A:
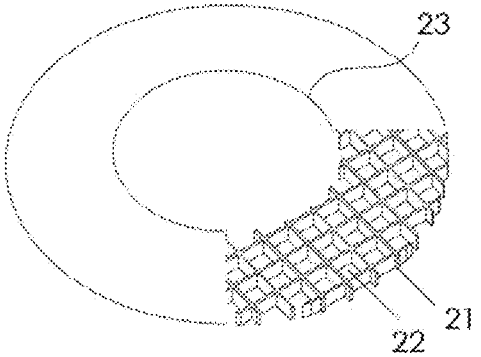
FIGS. 10A to 10D are perspective views of mixing elements as first modifications of the mixing element of FIG. 9B.
Figure 10B:
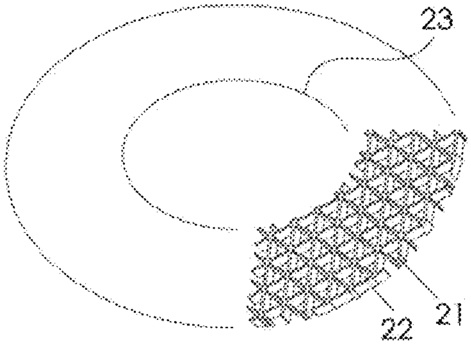
Figure 10C:
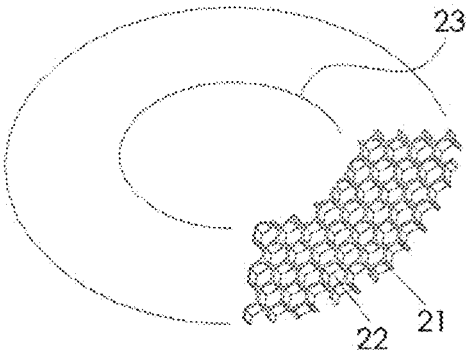
Figure 10D:
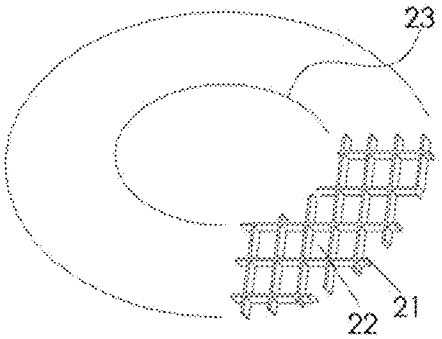

FIG. 9A is a cross-sectional view of a mixing unit 1*c* including a first plate 3, a mixing body 2 having a plurality of mixing elements 21*d* (here, three plates), and a second plate 4 in accordance with a seventh embodiment of the present invention showing how fluid A flows within mixing unit 1*c*, and FIG. 9B is a perspective view of mixing element 21*d*.

This mixing unit 1*c* differs from mixing unit 1*a* of the first embodiment in that, as shown in FIGS. 9A and 9B, a plurality of mixing elements 21*d* have first through holes 22 over the entire surface without the provision of the second through holes 23 in the center portion and a frame portion 27 (see FIG. 9B) that prevents first through holes 22 from being open to the outer circumferential portion. Each of first through holes 22 is formed in the shape of a quadrangle (see FIG. 9(*b*)). Furthermore, the diameter of first plate 3 in the outer circumferential shape is smaller than the diameter of mixing elements 21*d* (see FIG. 9A) such that first through holes 22 in the outer circumferential portion of mixing elements 21*d* stacked on first plate 3 are open.

Even with the mixing unit 1*c* configured as described above, fluid A made to flow into the mixing unit 1*c* with appropriate pressure flows into mixing body 2 through the opening portion 41 of the second plate 4. The fluid entering mixing body 2 is passed radially within mixing body 2 and is passed through first through holes 22 with which mixing elements 21*d* communicate. Here, since the flow is performed in the direction in which the mixing element 21*d* extends, and fluid A is repeatedly divided and combined while extending in the direction in which mixing elements 21*d* are stacked, fluid A is mixed. Finally, fluid A flows out through first through holes 22 that are open to the outer circumferential portion of first plate 3 arranged on one end of mixing body 2.

As described above, since, in mixing unit 1*c* of this seventh embodiment, first through holes 22 are formed over the entire surface of the mixing element 21*d*, it is unnecessary to provide the second through hole 23 in the center portion, with the result that it is easy to produce the mixing unit 1*c*.

The other parts of the configuration of and the other effects of the mixing unit 1*c* of this seventh embodiment are the same as those of mixing unit 1*a* of the first embodiment.

Mixing unit 1 of the present invention is not limited to those described in the first to seventh embodiments; many variations are possible.

(First Variation of Mixing Unit)

For example, first through holes 22 of mixing element 21 is not limited to be circular nor rectangular. As shown in FIGS. 10A to 10D, first through holes 22 of mixing element 21 as shown in FIGS. 1 and 2 may be formed in the shape of a polygon such as a square, a triangle, a hexagon or a rectangle. By forming first through holes 22 in the shape of a rectangle or a polygon to increase the aperture ratio of mixing element 21, it is possible to reduce the flow resistance of mixing unit 1 although the pitches between first through holes 22 of mixing elements 21*a* are substantially equal to each other, the present invention is not limited to this configuration. As shown in mixing elements 21*a* and 21*b* of FIG. 2, the size of and the pitch between first through holes 22 may be increased as the mixing element extends from the inner circumferential portion to the outer circumferential portion.

Although the outer circumferential shape of mixing elements 21 is substantially circular and the outer circumferential shape of first plate 3 and the second plate 4 is circular as shown in FIGS. 1 and 2, the present invention is not limited to this configuration. Any other shape that achieves the equivalent function may be employed. Although the second through holes 23 of mixing elements 21 are substantially circular and opening portion 41 of second plate 4 is circular as shown in FIG. 1, the present invention is not limited to this configuration. Any other shape that achieves the similar function may be employed. Although mixing elements 21 have the second through holes 23 in the center portion, second plate 4 has the opening portion 41 in the center portion and second through hole 23 and opening portion 41 are substantially equal in diameter to each other and are substantially concentric with each other, the present invention is not limited to this configuration, and any other shape that achieves the similar function may be employed.

Mixing unit 1 may be formed as follows. Mixing elements 21 having a plurality of first through holes 22 arranged in the same positions and having the same shape are used; first through holes 22 are displaced such that first through holes 22 overlap each other in the radial direction and the circumferential direction.

Two types of mixing elements having different inside and outside diameters are used, and thus first through holes 22 in the inner circumferential portion and the outer portion may be open.

(Second Variation of the Mixing Unit)

Figure 11A:
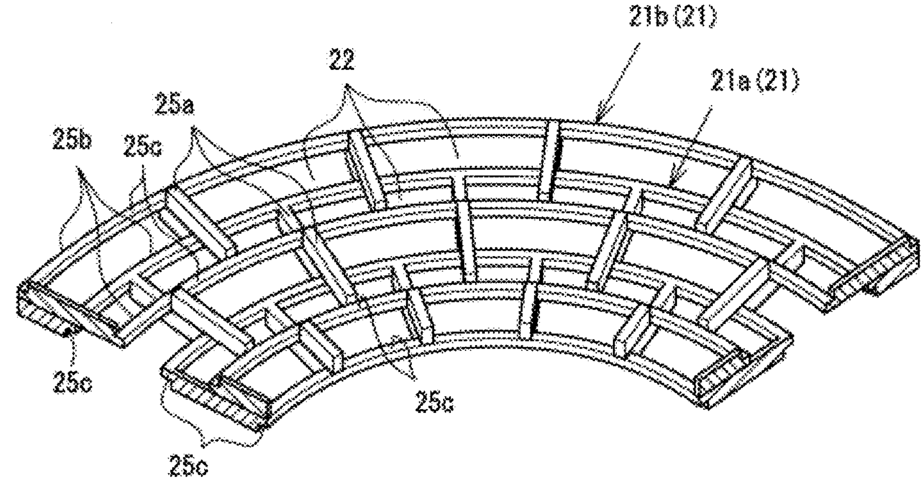
FIG. 11A a perspective view of a main portion of a pair of mixing elements as a second modification of the mixing element of FIG. 9B.
Figure 11B:
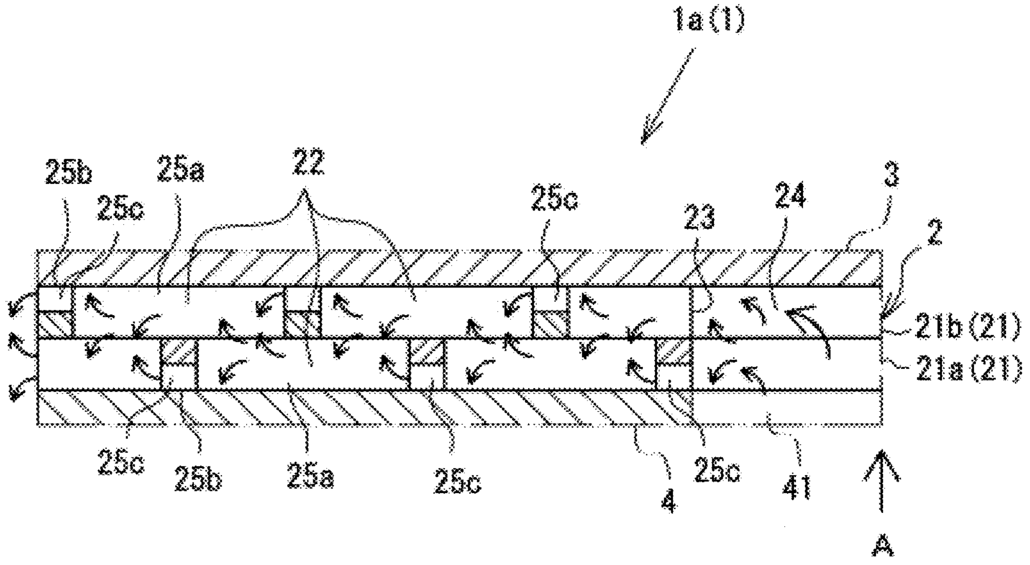
FIG. 11B is a cross-sectional view of a mixing unit employing the mixing elements of FIG. 11A showing a state of flow of fluid within the mixing unit.

FIG. 11A is a perspective view of a main portion in a state where one mixing element 21*a* and one mixing element 21*b* of the two types of mixing elements 21*a* and 21*b* are stacked, and FIG. 11B is a cross-sectional view showing the state of fluid A flowing within mixing elements 21*a* and 21*b*.

Even when only two mixing elements 21 and 21*b* are stacked, in these mixing elements 21*a* and 21*b*, two or more layers of the flow paths aligned in the stacking direction are provided.

Specifically, among the partition walls between first through holes 22 of mixing elements 21*a* and 21*b*, in the partition walls 25*b* extending in the direction intersecting the direction in which mixing elements 21*a* and 21*b* extend, cut portions 25*c* whose height is lower than that of the partition walls 25*a* extending in the radial direction of mixing elements 21*a* and 21*b* are formed. When the two mixing elements are stacked, mixing elements 21*a* and 21*b* are stacked with the sides where the cut portions 25*c* are not present in mixing elements 21*a* and 21*b* arranged to face the contact surface.

The shape of first through holes 22 of mixing elements 21*a* and 21*b*, that is, the shape of the partition walls, is the same as in the first embodiment of the mixing unit shown in FIGS. 1, 2 and 3. Among first through holes 22 of mixing elements 21*b* shown on the upper side of the figure, first through holes 22 on the inner circumferential edge are open to the inner circumference; among first through holes 22 of mixing elements 21*a* shown on the lower side of the figure, first through holes 22 on the outer circumferential edge are open to the outer circumference. Hence, partition walls 25*b* extending in the circumferential direction, which is the direction intersecting the direction in which mixing elements 21*a* and 21*b* extend, are displaced between stacked mixing elements 21*a* and 21*b* in the circumferential direction.

That is, in partition walls 25*b* extending in the circumferential direction, the position in the circumferential direction differs from the position in the stacking direction. In other words, each of the two types of mixing elements 21*a* and 21*b* stacked has a flow path that divides the fluid in the direction in which mixing elements 21*a* are stacked. Hence, unlike the case where one flow path that divides the fluid in the direction in which mixing elements 21*a* are stacked is present as shown in FIG. 3B, two flow paths may be formed by each mixing element having two layers of flow paths as shown in FIG. 11B.

In the configuration described above, even when a small number of mixing elements 21*a* and 21*b* stacked are provided, it is possible to provide a multilayer structure where two or more layers of the flow paths along which fluid A flows, with the result that it is possible to obtain a high mixing capability.

Although, in FIGS. 11A and 11B, the example where cut portions 25*c* are formed over partition walls 25*b* extending in the direction intersecting the direction in which mixing elements 21*a* and 21*b* extend has been shown, cut portions 25*c* may be formed partially or intermittently. Mixing elements 21*a* and 21*b* may be stacked such that partition walls 25*b* extending in the direction intersecting the direction in which mixing elements 21*a* and 21*b* where cut portions 25*c* of stacked mixing elements 21*a* and 21*b* are formed extend are in contact with each other. Even in this case, it is possible to form at least one flow path that divides the fluid in the direction in which mixing elements 21*a* and 21*b* are stacked because two mixing elements 21*a* and 21*b* provide four layers of flow paths (each mixing element provides two layers of flow paths) each having an unique pattern of first through holes 22. Furthermore, three or more mixing elements 21*a* and 21*b* as described above may be stacked.

Thus, according to this second variation of the mixing unit, there is provided a mixing unit including mixing elements, wherein each of the mixing elements has a partition wall between the first through holes, and the partition wall is disposed such that each of the mixing element is formed to have two layers of flow paths.

(Third Variation of the Mixing Unit)

Figure 12:
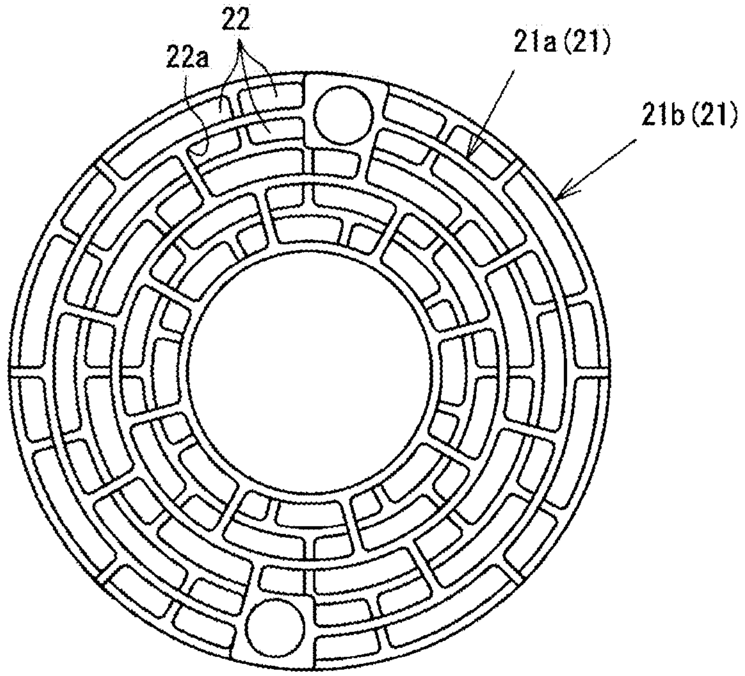
FIG. 12 is a plan view of mixing elements which are stacked as a third modification of the mixing element of FIG. 9B.

FIG. 12 is a plan view in a state where the two types of mixing elements 21*a* and 21*b* are stacked. In these mixing elements 21*a* and 21*b*, in the corner portions of the substantially rectangular first through hole 22 rounded corner portions 22*a* are formed.

When rounded corner portions 22*a* are provided as described above, the fluid is unlikely to be left in the corner portions. Consequently, the leaving of the fluid in the mixing element is reduced, and thus it is possible to perform satisfactory mixing and washing.

(Fourth Variation of the Mixing Unit)

Mixing element 21, first plate 3, second plate 4 and the like may be divided into separate structures of various shapes. In this case, it is possible to easily produce even large mixing unit 1.

Figure 13A:
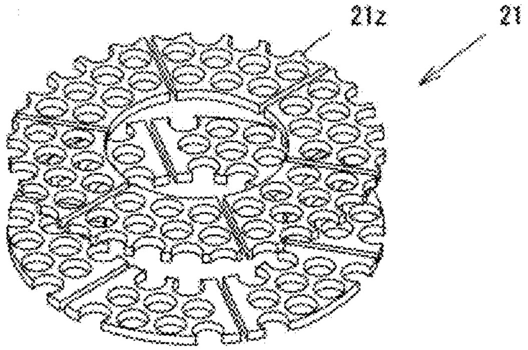
FIGS. 13A to 13C are plan views of mixing elements to be stacked as a fourth modification of the mixing element of FIG. 9B.
Figure 13B:
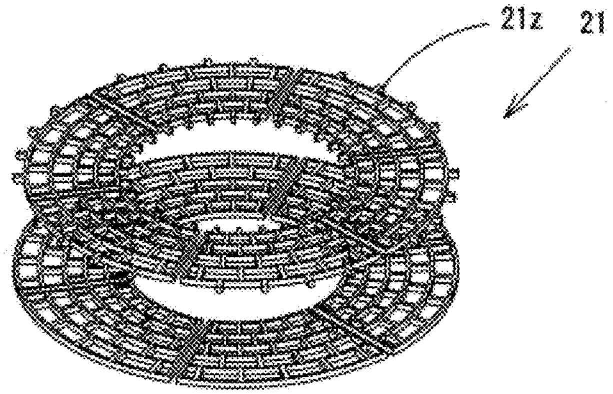
Figure 13C:
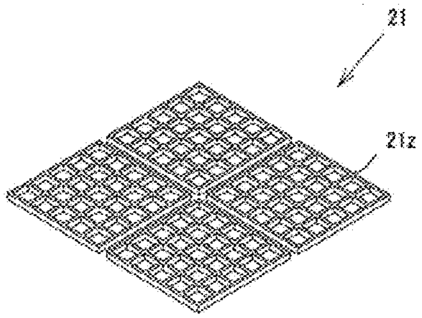

As shown in FIGS. 13A and 13B, as mixing element 21 has an annular shape, mixing element 21 may be divided into separate structures, each composed of a sector-shaped divided member 21*z*. When mixing element 21 is formed in the shape of a quadrangle as shown in FIG. 13C, mixing element 21 may be divided into separate structures, each composed of a rectangular divided member 21*z*.

(Fifth Variation of the Mixing Unit)

Figure 14:
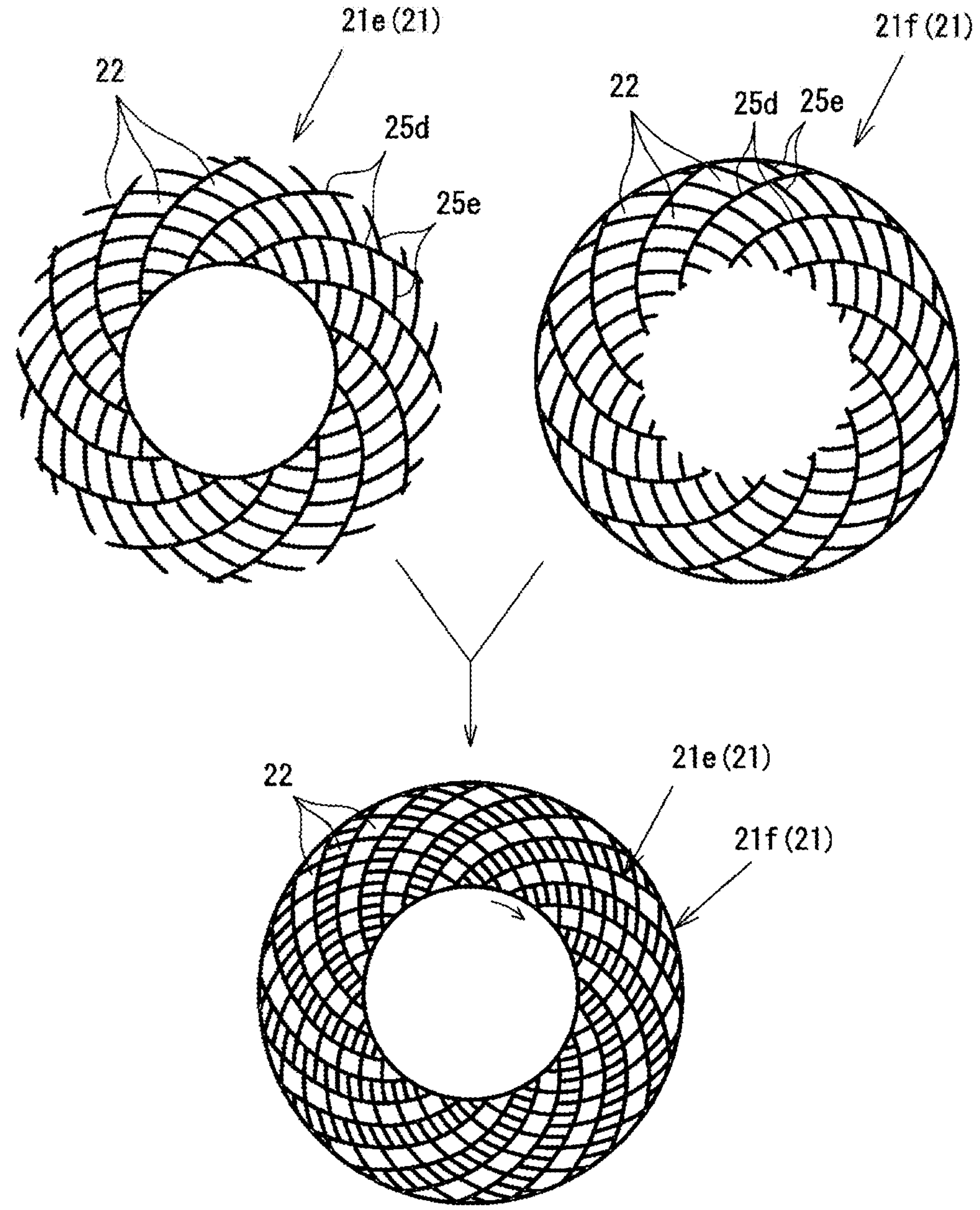
FIG. 14 shows plan views of a pair of mixing elements and their stacked mixing elements as a fifth modification of the mixing element of FIG. 9B.
Figure 15:
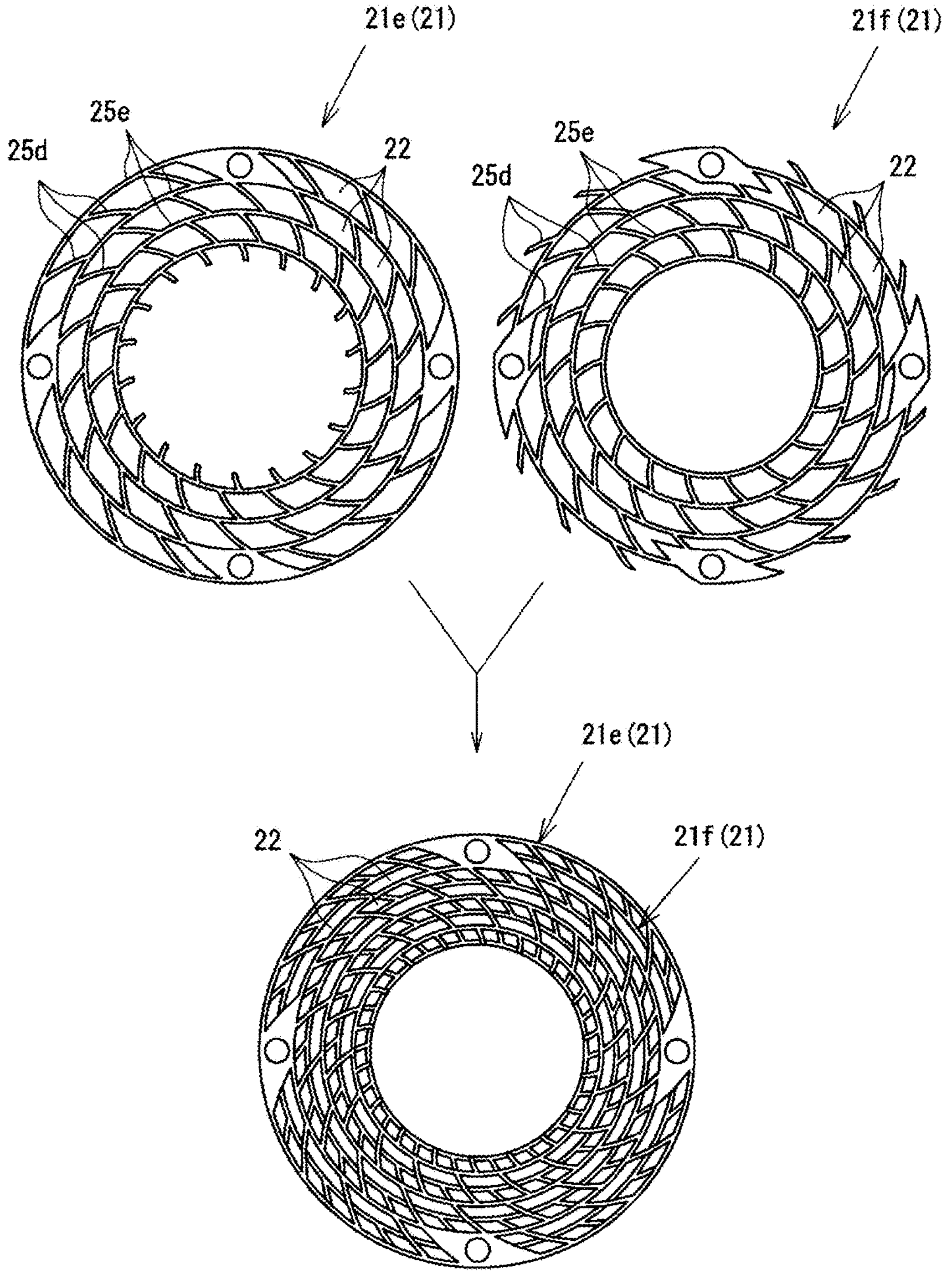
FIG. 15 shows plan views of a pair of mixing elements and their stacked mixing elements as a modification of the mixing element of FIG. 14.

As shown in FIGS. 14 and 15, first through holes 22 of mixing elements 21 may be non-linearly arranged in the direction in which mixing elements 21 extend.

FIG. 14 is a plan view showing the two types of mixing elements 21*e* and 21*f* and shows a state of mixing elements 21*e* and 21*f* stacked.

As shown in FIG. 14, first through holes 22 are non-linearly arranged from the center side of mixing elements 21*e* and 21*f* to the outer circumference. Specifically, among the partition walls between first through holes 22, partition walls 25*d* continuous from the center portion to the outer circumference extend in the form of a curve curving to one direction; more specifically, partition walls 25*d* extend substantially in the form of an involute curve. According to one or more embodiments of the present invention, "substantially in the form of an involute curve" means that an involute curve is included.

In addition to partition walls 25*d*, partition walls 25*e* that substantially perpendicularly interest partition walls 25*d* and that extend so as to connect partition walls 25*d* are provided.

The arrangements of partition walls 25*d* and 25*e* are made to differ between the two types of mixing elements 21*e* and 21*f*; among the partition walls, the positions of the partition walls extending in the direction intersecting the direction in which mixing elements 21*e* and 21*f* extend, that is, partition walls 25*d* and 25*e*, are displaced between the adjacent mixing elements 21*e* and 21*f*; the fluid is passed by being made to sequentially pass through first through holes 22 of the adjacent mixing elements 21*e* and 21*f* in the direction in which mixing elements 21*e* and 21*f* extend First through holes 22 are non-linearly arranged as described above, and thus it is possible to increase the path length of fluid As compared with the case where first through holes 22 are linearly arranged. In other words, since the number of times the fluid passes through first through holes 22 may be increased, it is possible to satisfactorily mix the fluid.

Even when mixing elements 21*e* and 21*f* are small, it is possible to increase the path length and obtain high mixing effects, with the result that it is possible to reduce the size of the mixing unit.

As the non-linear configuration, a configuration where the curvature of a curve is increased toward the direction in which the mixing element extends or the like may be employed as necessary. In the direction in which mixing elements 21*e* and 21*f* extend, first through holes 22 may be spaced regularly along the same direction in the form of a substantially same curve or an involute curve; moreover, mixing elements 21*e* and 21*f* may be spaced irregularly.

FIG. 15 is a plan view showing the two types of mixing elements 21*e* and 21*f* and the state of mixing elements 21*e* and 21*f* stacked.

In mixing elements 21*e* and 21*f* shown in FIG. 15, among the partition walls between first through holes 22, partition walls 25*d* continuous from the center portion to the outer circumference extend substantially in the form of an involute curve curving to one direction, and partition walls 25*d* are coupled by partition walls 25*e* extending in the circumferential direction. Partition walls 25*e* extending in the circumferential direction are formed concentrically with respect to the center point of mixing elements.

In mixing elements 21*e* and 21*f* described above, it is possible to perform satisfactory mixing as described above; in particular, when the mixing unit is actively rotated to perform mixing, since a rotational force may be efficiently transmitted to the fluid, it is possible to enhance the mixing effects. Thus, according to this fifth variation of the mixing unit, there is provided a mixing body or mixing unit including mixing elements each having plurality of first through holes that are stacked in a stacking direction and each of the mixing element which are to form a flow path therein, wherein the first through holes in each of mixing elements are non-linearly arranged in the extending direction.

(Sixth Variation of the Mixing Unit)

The partition walls between first through holes 22 in the mixing element 21 described above may be formed in a shape other than a square as seen in cross section.

Figure 16A:
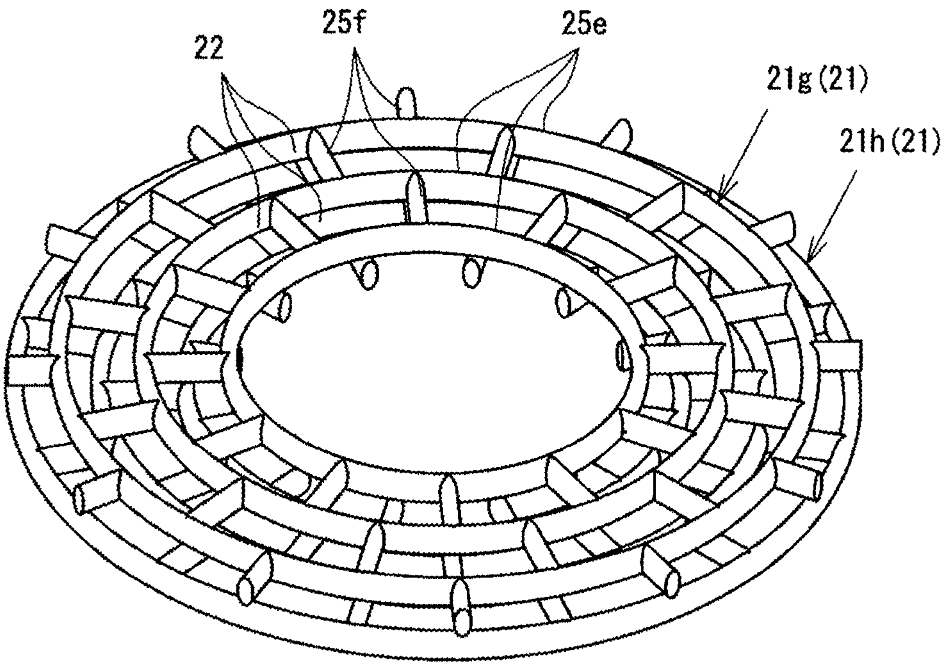
FIG. 16A is a perspective view of mixing elements which are stacked as a sixth modification of the mixing element of FIG. 9B.
Figure 16B:
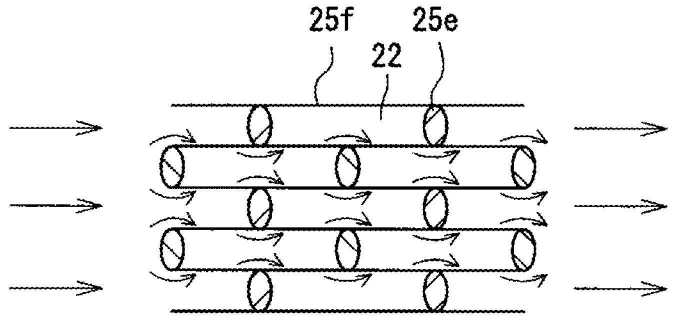
FIG. 16B is a partial cross-sectional schematic view of a mixing unit employing the mixing elements of FIG. 16A showing a state of flow of fluid within the mixing unit.

FIG. 16A is a perspective view in a state where two types of mixing elements 21*g* and 21*h* are stacked, and FIG. 16B is an illustrative diagram showing a state where the fluid flows within mixing elements 21*g* and 21*h*.

As shown in FIG. 16A, in mixing elements 21*g* and 21*h*, the cross-sectional shape of partition walls 25*f* extending in the radial direction and partition walls 25*e* extending in the circumferential direction is formed substantially in the shape of a vertically long ellipse. According to one or more embodiments of the present invention, "substantially in the shape of an ellipse" described above means that an ellipse is included.

The flow of the fluid within mixing elements 21*g* and 21*h* having partition walls 25*e* and 25*f* shaped as described above is the same as in, for example, the first embodiment of the mixing unit; as compared with partition walls whose end surfaces rise steeply, an impact at the time of collision with the fluid is reduced, and thus it is possible to make the fluid flow smoothly. This type of flow is suitable for a fermentation process that deals with yeast or the like.

The partition walls between first through holes 22 in mixing elements 21 may have a cross-sectional shape including a chamfered portion as seen in cross section.

Figure 17A:
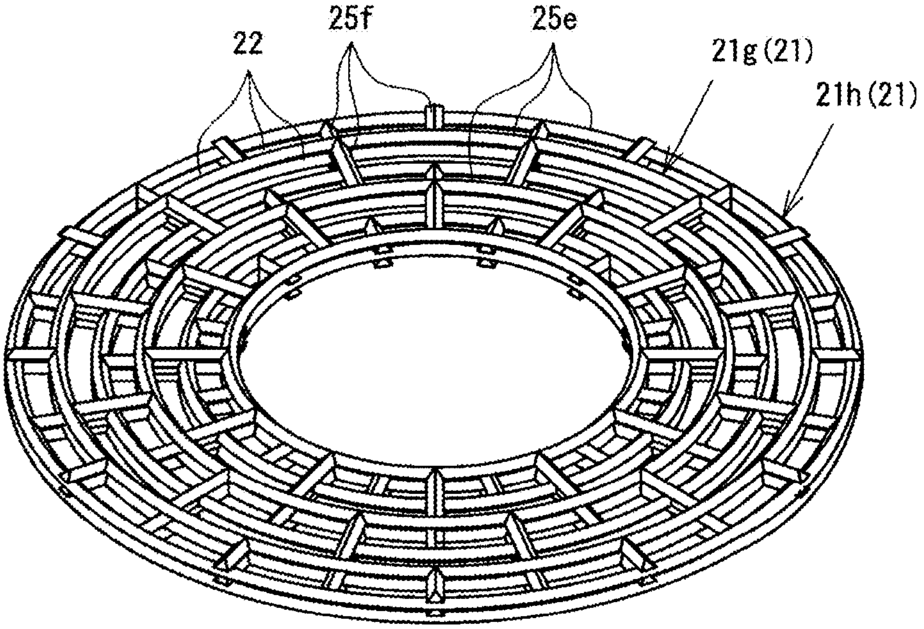
FIG. 17A is a perspective view of mixing elements which are stacked.
Figure 17B:
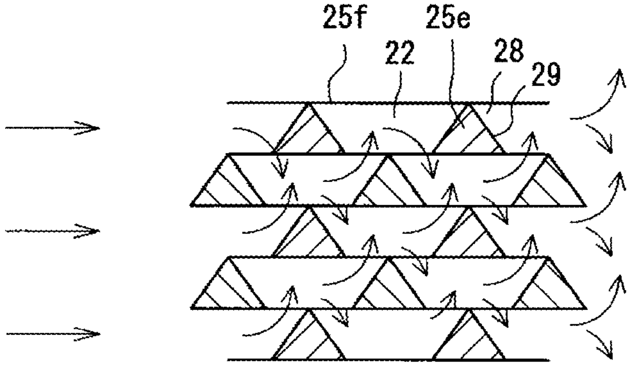
FIG. 17B is a partial cross-sectional schematic view of a mixing unit employing the mixing elements of FIG. 17A showing a state of flow of fluid within the mixing unit.

FIG. 17A is a perspective view in a state where the two types of mixing elements 21*g* and 21*h* are stacked, and FIG. 17B is an illustrative diagram showing a state where the fluid flows within mixing elements 21*g* and 21*h*.

As shown in FIG. 17A, in mixing elements 21*g* and 21*h*, the cross-sectional shape of partition walls 25*f* extending in the radial direction and partition walls 25*e* extending in the circumferential direction is formed in the shape of a triangle where the width of its upper portion is narrow and the width of its lower portion is wide. Hence, the surface opposite the direction in which mixing elements 21*g* and 21*h* extend is inclined in such a direction that, as the surface extends upwardly, the thickness of partition walls 25*e* and 25*f* is decreased. The inclined portion described above is the chamfered portion 28, and forms inclined surfaces 29.

In the flow of the fluid within mixing elements 21*g* and 21*h* having partition walls 25*e* and 25*f* shaped as described above, since the chamfered portions 28 are provided, as compared with partition walls whose end surfaces rise steeply, an impact at the time of collision with the fluid is reduced. Thus, it is possible to make the fluid flow smoothly.

Figure 18A:
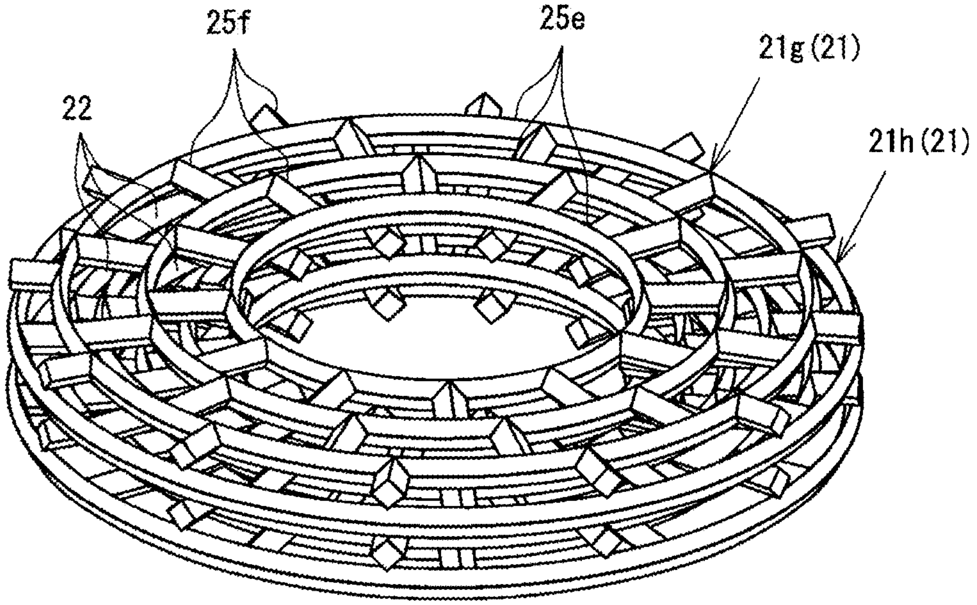
FIG. 18A is a perspective view of mixing elements which are stacked as a modification of the mixing elements of FIG. 17A.
Figure 18B:
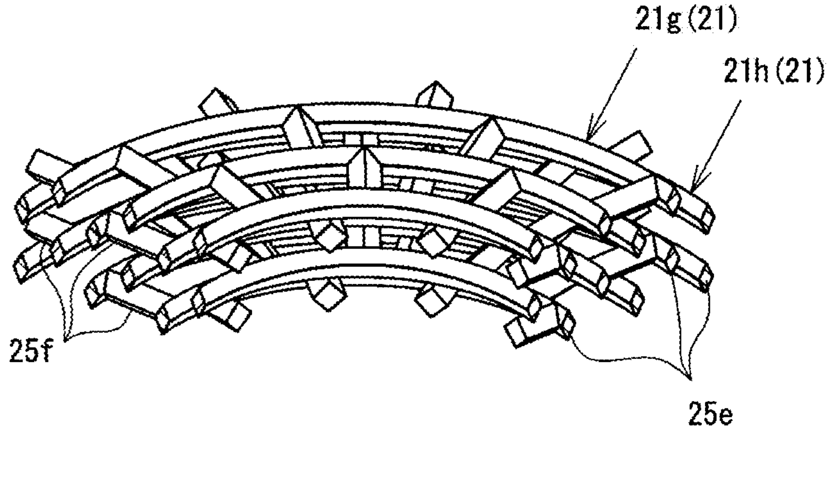
FIG. 18B is a partial enlarged perspective view of the stacked mixing elements of FIG. 18A showing its cross-sectional shape.
Figure 19A:
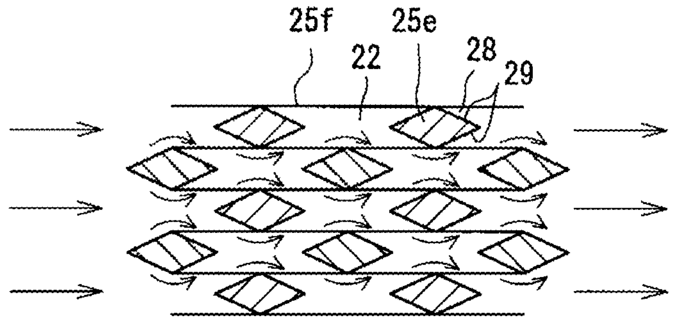
FIGS. 19A, 19B and 19C are cross-sectional schematic views showing states of flow of fluid within mixing units as further modifications the mixing unit of the FIG. 17B.

FIG. 18A is a perspective view in a state where the two types of mixing elements 21*g* and 21*h* are stacked, and FIG. 18B is a perspective view showing the cross-sectional shape of mixing elements 21*g* and 21*h*. FIG. 19A is an illustrative diagram showing a state where the fluid flows within mixing elements 21*g* and 21*h*.

As shown in FIG. 18A, in mixing elements 21*g* and 21*h*, the cross-sectional shape of partition walls 25*f* extending in the radial direction and partition walls 25*e* extending in the circumferential direction is formed substantially in the shape of a rhombus where corners are present in upper, lower, left and right portions. According to one or more embodiments of the present invention, "substantially in the shape of a rhombus" means that a rhombus is included.

Hence, the surface opposite the direction in which mixing elements 21*g* and 21*h* extend is inclined in such a direction that, as the surface extends upwardly or downwardly, the thickness of partition walls 25*e* and 25*f* is decreased. The inclined portion described above is the chamfered portion 28, and forms inclined surfaces 29.

In the flow of the fluid within mixing elements 21*g* and 21*h* having partition walls 25*e* and 25*f* shaped as described above, since the chamfered portions 28 are provided as shown in FIG. 19A, as compared with partition walls whose end surfaces rise steeply, an impact at the time of collision with the fluid is reduced. Thus, it is possible to make the fluid flow smoothly.

The angle of inclined surfaces 29 is set as necessary, and thus it is possible to adjust and control the direction in which the fluid flows.

Figure 19B:
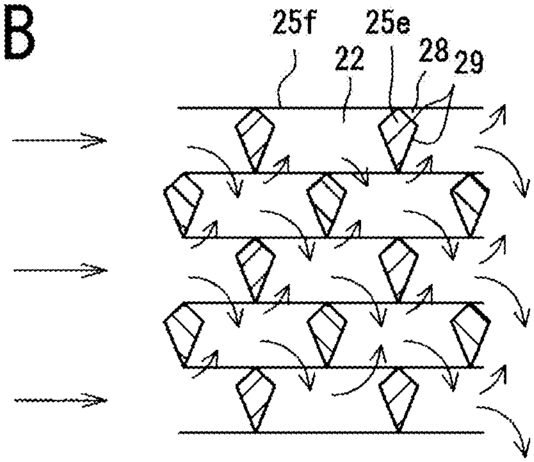
Figure 19C:
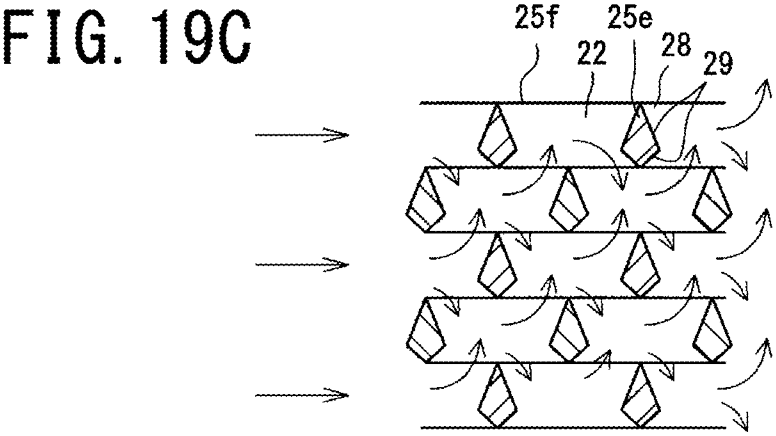

As shown in FIGS. 19B and 19C the angles of the upper and lower inclined surface 29 are made to differ from each other, and thus it is possible to increase and decrease the magnitude of the flow of the fluid in the up/down direction (the stacking direction), with the result that it is possible to change the entire flow. For example, with consideration given to a direction in which satisfactory mixing may be performed and the like, the angle of the inclined surfaces 29, the distance between partition walls 25*e* and 25*f* and the like are set as necessary, and thus it is possible to realize desired mixing.

The control of the direction in which the fluid flows may be performed such as by setting the cross-sectional shape of partition walls 25*e* and 25*f* as necessary, inclining partition walls 25*e* and 25*f* of the cross-sectional shape as in the example described above or twisting partition walls 25*e* and 25*f*.

Figure 20A:
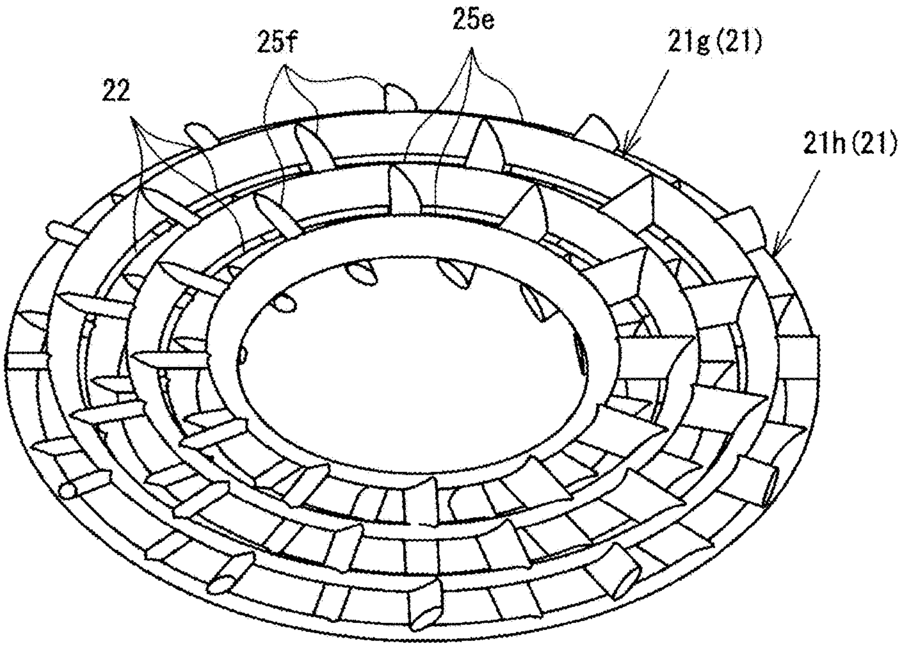
FIG. 20A is a perspective view of mixing elements which are stacked as a further modification of the mixing elements of FIG. 18A.
Figure 20B:
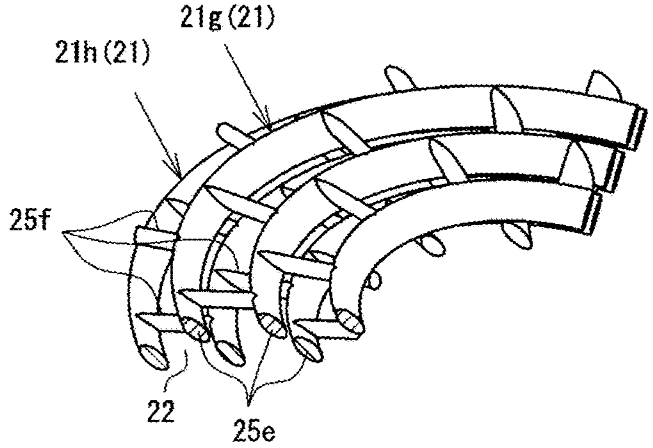
FIG. 20B is a partial enlarged perspective view of the stacked mixing elements of FIG. 20A showing its cross-sectional shape.

FIG. 20A is a perspective view in a state where the two types of mixing elements 21*g* and 21*h* are stacked, and FIG. 20B is a partial perspective view showing the cross-sectional shape of mixing elements 21*g* and 21*h*.

As shown in FIGS. 20A and 20B, the cross-sectional shape of partition walls 25*f* extending in the radial direction and partition walls 25*e* extending in the circumferential direction is formed substantially in the shape of an ellipse; partition walls 25*e* are inclined with respect to the stacking direction so as to extend circumferentially; partition walls 25*f* extending in the radial direction are inclined to one of the leftward and rightward directions.

As mixing elements 21*g* and 21*h* are relatively moved, differences in the resistance between partition walls 25*e* and 25*f* are made, and thus directivity is given to the fluid within mixing elements 21*g* and 21*h* having partition walls 25*e* and 25*f* shaped as described above. Since the fluid is made to flow easily in the circumferential direction along partition walls 25*e* by partition walls 25*f* inclined to the circumferential direction and extending in the radial direction, it is possible to obtain spiral flow shown conceptually in FIG. 21 especially for use as an agitation impeller.

When the cross-sectional shape of partition walls 25*e* and 25*f* is formed in the shape of a rhombus, among the partition walls, the resistance of the partition walls extending from the center portion of mixing elements to the outer circumference to fluid and the resistance of the other partition walls to fluid are made to differ from each other, and thus it is possible to likewise achieve spiral flow.

Figure 22:
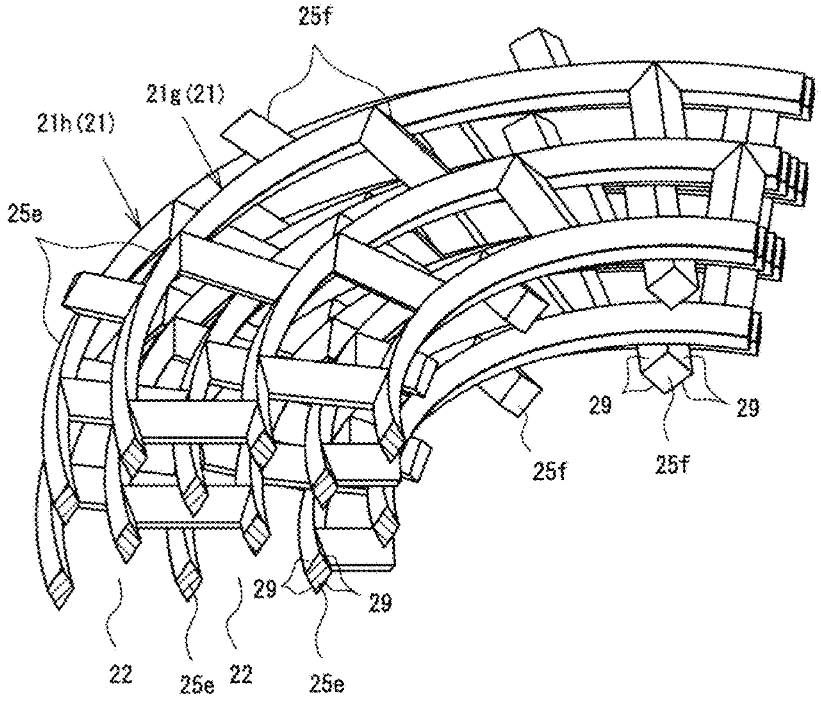
FIG. 22 is a partial cross-sectional perspective view showing a cross-sectional shape of mixing elements as a modification of the mixing elements of FIG. 20A.

FIG. 22 is a partial perspective view showing a cross-sectional shape of two types of mixing elements 21*g* and 21*h* in a state which the elements are stacked.

As shown in FIG. 22, partition walls 25*e* and 25*f* between first through holes 22 in mixing elements 21*g* and 21*h* have the inclined surfaces 29 whose upper and/or lower ends are narrower in width, and, with respect to the inclination angle of the inclined surfaces 29 described above, among the partition walls, the inclination angle of partition walls 25*f* extending in the radial direction from the center portion of mixing elements to the outer circumference is smaller than that of the inclination surface of the cross-sectional shape of the other partition walls 25*e* extending in the circumferential direction.

Figure 21:
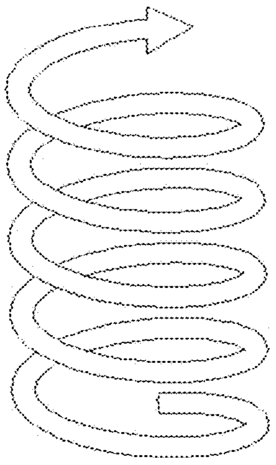
FIG. 21 is a conceptual diagram showing states of spiral flow of fluid mixed by the mixing unit of FIG. 20A.

In the fluid within mixing elements 21*g* and 21*h* having partition walls 25*e* and 25*f* shaped as described above, the flow in the circumferential direction is promoted more than in the radial direction, and resistance is given to the flow of the fluid in the radial direction by partition walls 25*e* in the circumferential direction, with the result that it is possible to produce spiral flow as shown in FIG. 21.

Thus, according to this sixth variation of the mixing unit, there is provided a mixing body or mixing unit including mixing elements each of which has a plurality of first through holes and a partition wall between the first through holes, wherein the partition wall is disposed in each of the mixing elements so as to produce a spiral flow.

(Seventh Variation of the Mixing Unit)

Figure 23A:
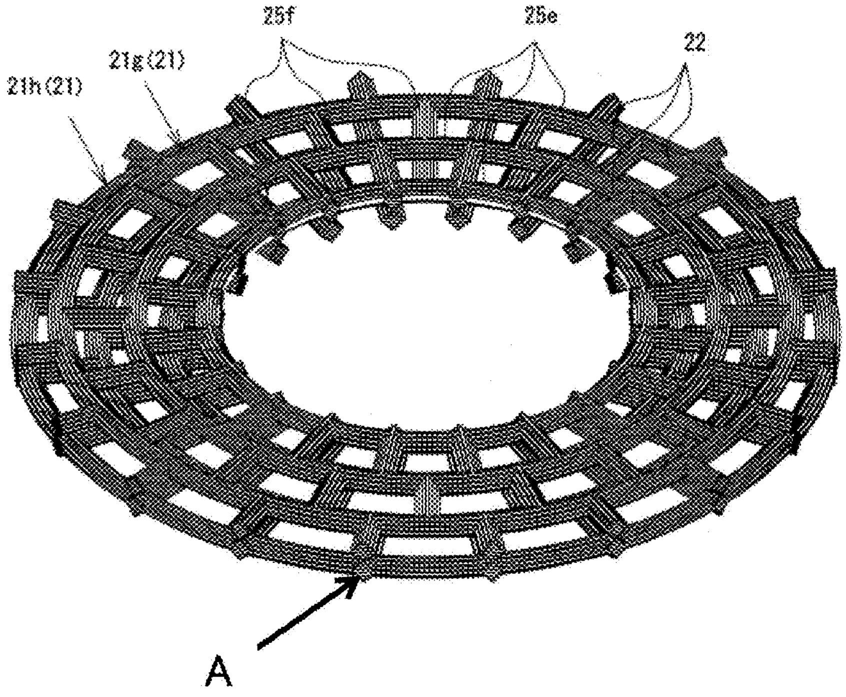
FIG. 23A is a perspective view of mixing elements of a mixing unit as a seventh modification of the mixing elements of FIG. 20A.

Since mixing elements 21 may be formed to have various cross-sectional shapes as described above, as necessary, a plurality of members may be stacked. FIG. 23A is a perspective view of mixing elements 21*g* and 21*h* which are stacked, and FIG. 23B is a partial enlarged vertical cross-sectional view of a partition wall of the elements 21 (21*g* and 21*h*).

As shown in FIG. 23A, mixing elements 21*g* and 21*h* include partition walls 25*e* and 25*f* whose cross-sectional outline is substantially rhombic. As shown in FIG. 23B, partition walls 25*e* and 25*f* are configured by stacking a plurality of plate members (here, seven plate members) having different width dimensions. The plate members are fixed to each other such as by adhesion or welding as necessary.

By stacking a plurality of plate member as described above, it is possible to freely obtain mixing elements 21*g* and 21*h* having various cross-sectional shapes that cannot be formed by pressing or the like.

Figure 23B:
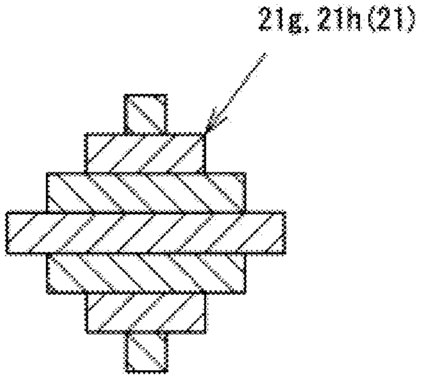
FIG. 23B is its partial cross-sectional view.

Although partition walls 25*e* and 25*f* shown in FIGS. 23A and 23B have ladder-shaped steps, it is possible to provide the partition wall having the inclined surfaces by chambering the plate members.

Eighth Embodiment

Figure 24A:
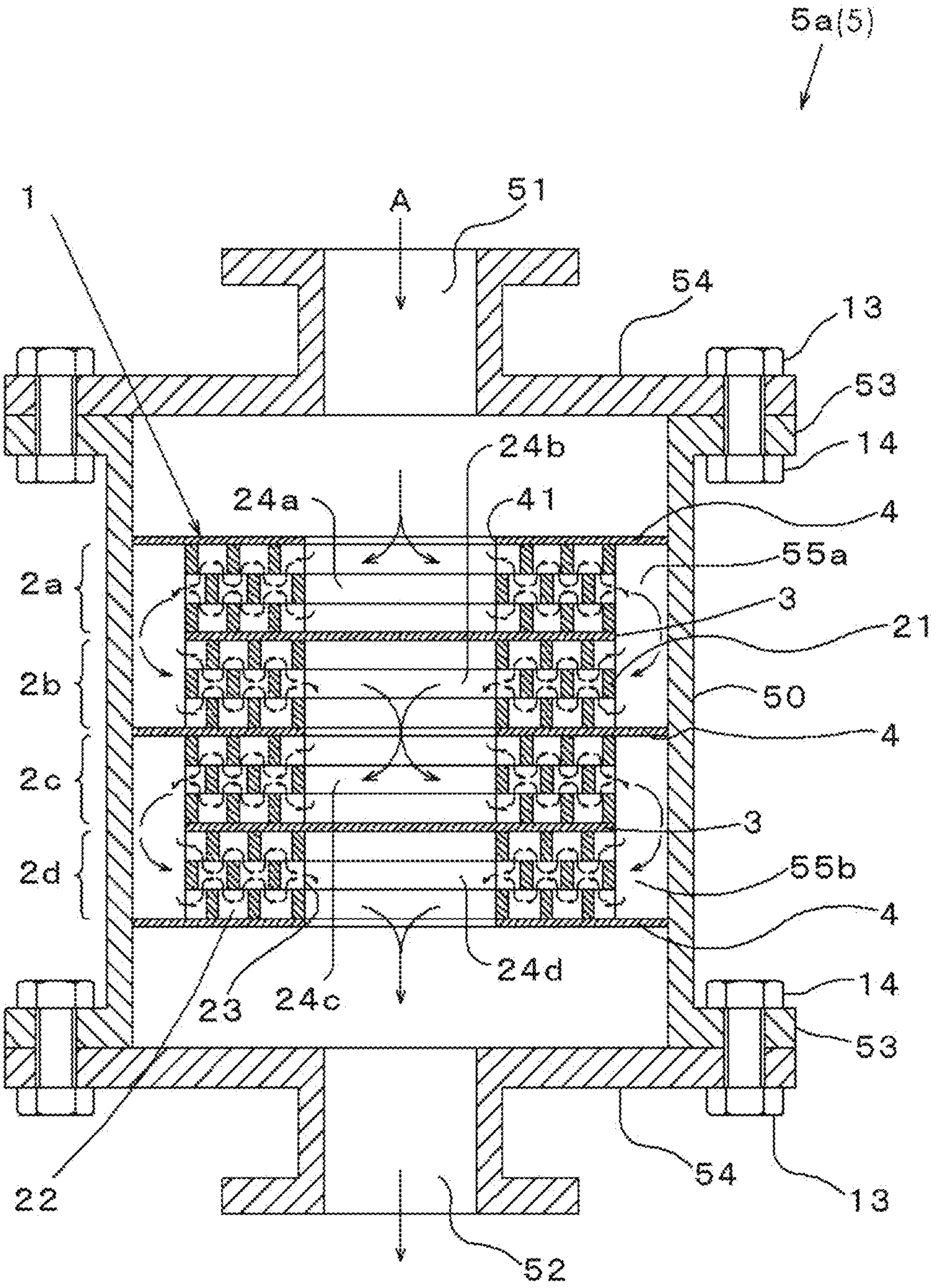
FIG. 24A is a cross-sectional view of a mixing device in accordance with an eighth embodiment of the present invention showing a state of flow of fluid within the mixing device.

FIG. 24A is a cross-sectional view of a mixing device 5*a* showing how fluid A flows within mixing device 5*a* in accordance with an eighth embodiment of the present invention.

In FIG. 24A, mixing device 5*a* includes flanges 54 having an inlet 51 and an outlet 52 and formed in the shape of an outer circumferential disc, a casing 50 having a flange 53 and formed in the shape of a cylinder to which flanges 54 are removably mounted, and a mixing unit 1 within casing 50. Mixing unit 1 includes four mixing bodies 2*a*, 2*b*, 2*c* and 2*d* in which a plurality of mixing elements 21 (here, three mixing elements) composed of discs described above are stacked.

In the side of inlet 51 of casing 50, a second plate 4 having an opening portion 41 in the center portion and an outside diameter substantially equal to the inside diameter of the casing 50 is provided, and first mixing body 2*a* having mixing elements 21 is provided on a bottom surface of second plate 4. On a bottom surface of first mixing body 2*a*, a first plate 3 having an outside diameter substantially equal to the outside diameter of mixing elements 21 is provided. Then, second mixing body 2*b*, second plate 4, third mixing body 2*c*, first plate 3, fourth mixing body 2*d* and second plate 4 are sequentially disposed.

In mixing device 5*a* shown in FIG. 24A, mixing unit 1 may be fixed within casing 50 with fixing units such as bolts and nuts.

Each of mixing elements 21 has a plurality of first through holes 22 and a substantially circular second through hole 23 in the center portion. The inside diameters of second through holes 23 of mixing elements 21 are substantially equal to the inside diameter of the opening portion 41 of second plates 4. Second through holes 23 are substantially concentric with opening portions 41 of second plates 4. Mixing elements 21 are stacked, and thus second through holes 23 constitute a first hollow portion 24*a*, a second hollow portion 24*b*, a third hollow portion 24*c* and a fourth hollow portion 24*d*, which are hollow space portions. Hollow portions 24*a* to 24*d* are hollow portions corresponding to mixing bodies 2*a* to 2*d*, respectively.

A first annular space portion 55*a* is formed between an inner circumferential portion of casing 50 and the outer circumferential portion of first mixing body 2*a* and second mixing body 2*b*. A second annular space portion 55*b* is formed between an inner circumferential portion of casing 50 and the outer circumferential portion of third mixing body 2*c* and fourth mixing body 2*d*.

Within mixing bodies 2*a* to 2*d*, first through holes 22 communicate with each other in a direction in which mixing element 21 extends, and part thereof are open to the inner circumferential surface and the outer circumferential surface of mixing elements 21.

First plate 3 and second plate 4 arranged on both end portions of each of the mixing bodies 2*a* to 2*d* and opposite each other close first through holes 22 in both end portions of each of mixing bodies 2*a* to 2*d* in the stacking direction. This prevents fluid A within mixing body 2 from flowing out through first through holes 22 in both end portions of each of mixing bodies 2*a* to 2*d* in the stacking direction. Fluid A is reliably passed within mixing bodies 2*a* to 2*d* in the direction in which each of mixing elements 21 extends.

In mixing device 5*a* configured as described above, for example, fluid A flows in through inlet 51 with appropriate pressure, and flows into first hollow portion 24*a*. Then, fluid A flows into first mixing body 2*a* through first through holes 22 open to inner circumferential surface of first hollow portion 24*a*, and is passed in the outer circumferential direction through first through holes 22 communicating with each other. Then, fluid A flows out through first through holes 22 open to the outer circumferential surface of first mixing body 2*a*, and flows into first annular space portion 55*a*.

Then, fluid A flows into second mixing body 2*b* through first through holes 22 open to the outer circumferential surface of second mixing body 2*b*, and is passed in the inner circumferential direction through first through holes 22 communicating with each other. Then, fluid A flows out through first through holes 22 open to the inner circumferential surface of second hollow portion 24*b*, and flows into second hollow portion 24*b*.

Thereafter, fluid A flows from third hollow portion 24*c* to third mixing body 2*c* to second annular space portion 55*b* to fourth mixing body 2*d* and to fourth hollow portion 24*d*, and flows out through outlet 52.

As described above, fluid A is passed through holes 22 communicating with each other while flowing within mixing bodies 2*a* to 2*d* from the inner circumferential portion to the outer circumferential portion or from the outer circumferential portion to the inner circumferential portion in a meandering manner, with the result that fluid A is highly mixed. In this way, fluid A flows in through inlet 51 of mixing device 5*a*, is highly mixed and flows out through outlet 52.

In mixing device 5*a* described above, first plate 3 and second plate 4 are arranged on both end portions of each of mixing bodies 2*a* to 2*d* and opposite each other to allow the direction in which fluid A flows within mixing body 2 to be changed from the inner circumferential portion to the outer circumferential portion or vice versa, that is, from the outer circumferential portion to the inner circumferential portion. Thus, fluid A is passed through a larger number of first through holes 22 communicating with each other, with the result that the degree of mixing may be further increased.

Even in mixing device 5, each of the hollow portions 24*a* to 24*d* is sufficiently larger in size than first through holes 22, and second through holes 23 of mixing elements 21 constituting hollow portion 24 are substantially equal in inside diameter to each other, and are substantially concentric with each other. Hence, the flow resistance to fluid A flowing through hollow portions 24*a* to 24*d* is smaller than that of fluid A flowing through mixing bodies 2*a* to 2*d*, and so the loss of pressure is also smaller. Therefore, even when a large number of mixing elements 21 are stacked, fluid A substantially uniformly reaches the inner circumferential portions of mixing elements 21 regardless of the position in the mixing direction, and substantially uniformly flows within mixing bodies 2*a* to 2*d* from the inner circumferential portion to the outer circumferential portion or vice versa, that is, from the outer circumferential portion to the inner circumferential portion.

Fluid A flows from annular space portions 55*a* and 55*b* into mixing bodies 2*b* and 2*d* in the same manner as hollow portions 24*a* and 24*d* described above.

Furthermore, since, in mixing device 5*a* described above, fluid A may be mixed within casing 50 having inlet 51 and outlet 52, it is possible to use mixing device 5*a* as an in-line static mixing device and mix fluid A continuously.

Moreover, since the outer circumferential shapes of mixing element 21 first plate 3 and second plate 4 are circular and thus casing 50 may be cylindrical, it is possible to increase the pressure resistance of casing 50. Thus, it is possible to mix fluid A at a high pressure.

Instead of mixing unit 1, mixing elements 21*d* of FIG. 9B in which second through holes are not provided as in mixing unit 1*c* of FIG. 9*c* may be used.

Figure 24B:
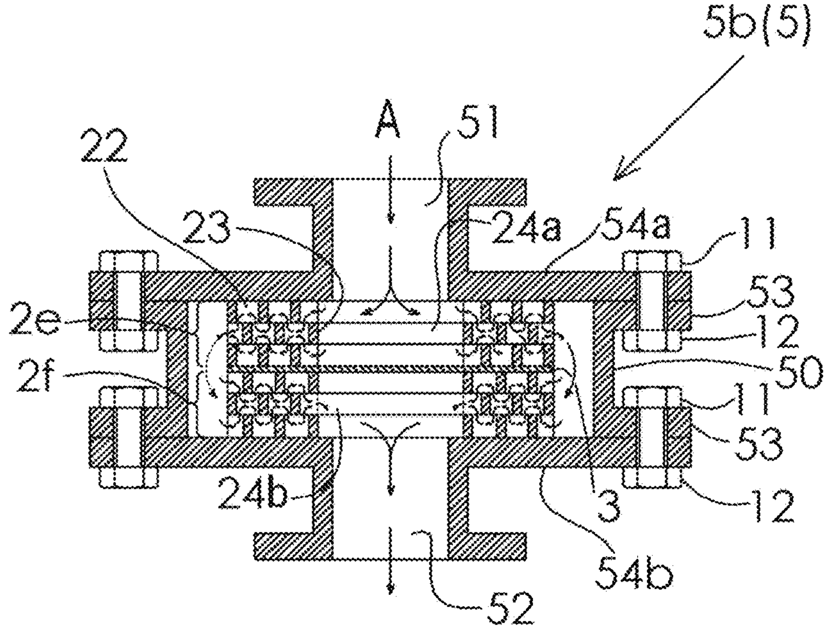
FIGS. 24B and 24C are cross-sectional views of the mixing devices as modifications of the device of FIG. 24A.

FIG. 24B is a cross-sectional view of a mixing device 5*b* wherein each of flanges 54*a* and 54*b* serves as a second plate, and shows how fluid A flows within mixing device 5*b* as a modification of this eighth embodiment of the present invention. Mixing device 5*b* includes a first plate 3, and a pair of mixing bodies 2*e* and 2*f* which are stacked to sandwich first plate. Opposite surfaces of mixing bodies 2*e* and 2*f* contacting first plate 3 are in contact with inner surfaces of flange 54*a* and 54*b* respectively. An inlet 51 disposed on flange 54*a* communicates with a hollow portion 24*a* of stacked unit 2*e*, and an outlet 52 disposed on flange 54*b* communicates with a hollow portion 24*b* of stacked unit 2*f*.

Figure 24C:
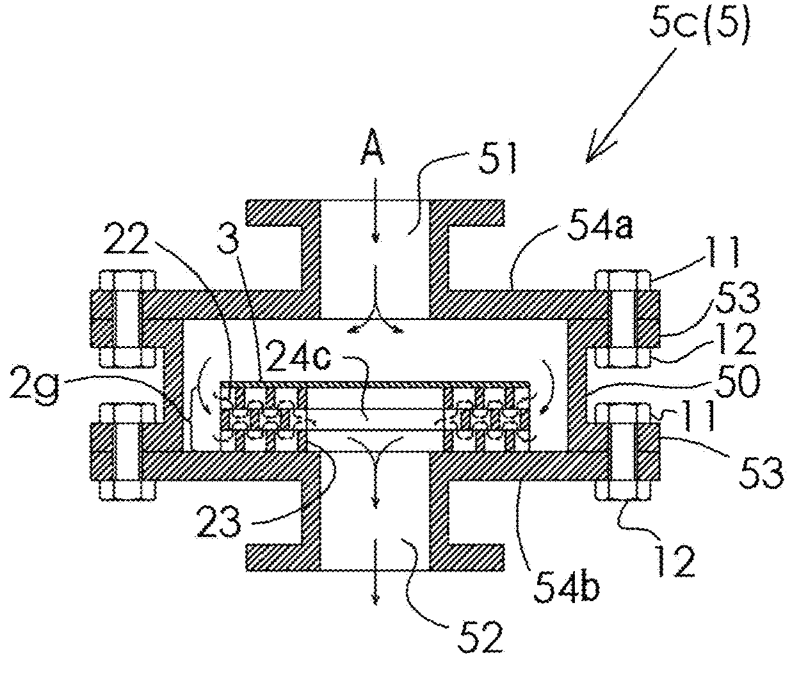

FIG. 24C is a cross-sectional view of a mixing device 5*c* as a further modification of the eighth embodiment of the present invention. Mixing device 5*c* includes a casing 50, a pair of flanges 54*a* and 54*b*, a mixing body 2*g*, and a first plate 3 disposed on one surface of mixing body 2*g*. Other opposite surface of mixing body 2*g* comes in contact with an inner surface of flange 54*b*, and outlet 52 communicates with a hollow portion 24*c* of mixing body 2*g*.

In the above described mixing devices 5*b* and 5*c* of FIGS. 24B and 24C, flanges 54*a* and 54*b* serve same components as second plates 4, whereby fluid A flows within mixing bodies 2*e* to 2*g* from the inner circumferential portion to the outer circumferential portion or vice versa, that is, from the outer circumferential portion to the inner circumferential portion, and is mixed by passing through first through holes 22.

As in the variations of the mixing unit, mixing device 5 (5*a* to 5*c*) according to the present invention is not limited to the embodiments of the mixing devices described above. Variations are possible within the scope of the present invention, and it is possible to practice variations.

Ninth Embodiment

Figure 25A:
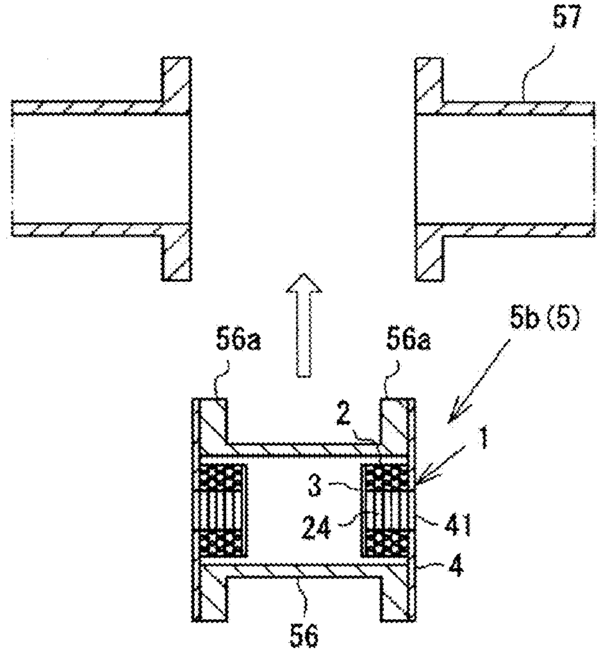
FIG. 25A is a cross-sectional view of a mixing device in accordance with a ninth embodiment of the present invention.
Figure 25B:
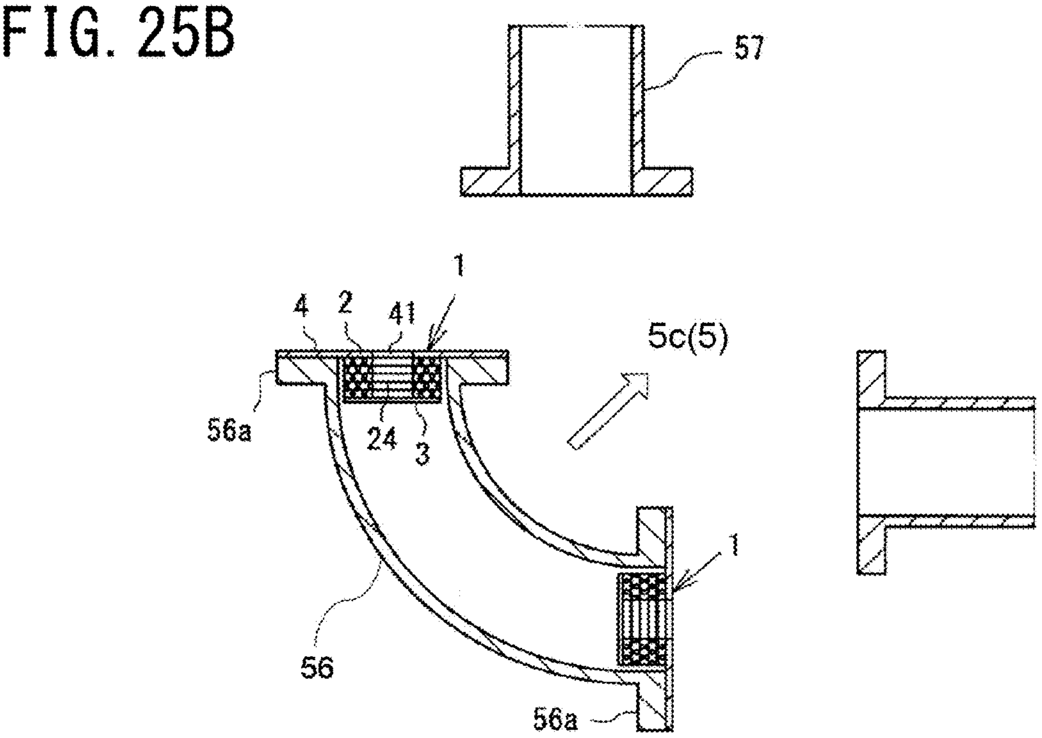
FIG. 25B is a cross-sectional view of a mixing device as a modification of the mixing device of FIG. 25A.
Figure 25C:
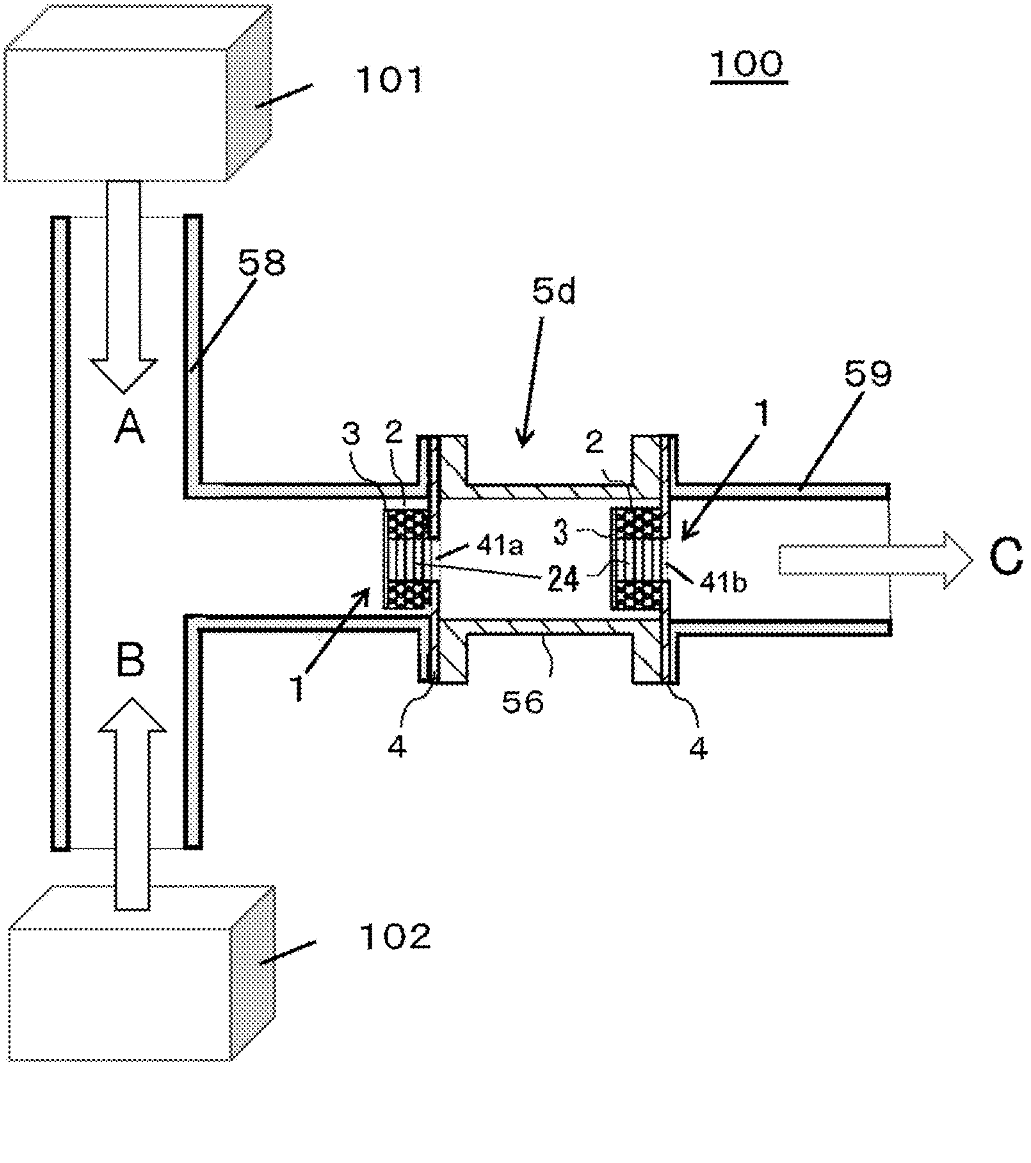
FIG. 25*c* is a cross-sectional view of a mixing system as another modification of the device of FIG. 25A

FIG. 25A is a cross-sectional view of a mixing device 5*b* having a pair of mixing units 1 disposed within a tube member 56 through which a fluid flows in accordance with a ninth embodiment of the present invention. FIG. 25B is a cross-sectional view of a mixing device 5*c* having a pair of mixing units 1 disposed within a tube member 56 as a modification of this embodiment, and FIG. 25C is a schematic view of a mixing system 100 employing a mixing device 5*d* as another modification of this ninth embodiment of the present invention.

FIG. 25A shows a linear type of mixing device 5*b*, and FIG. 25B shows a curved type of mixing device 5*c*. In each of mixing devices 5*b* and 5*c*, mixing unit 1 is provided within tube member 56 at both ends thereof connected to a pipe line 57 so as not to protrude in the longitudinal direction of tube member 56. In other words, a first plate 3 of the mixing unit 1 is formed to have the same size as the outer circumference of a mixing body 2, and a second plate 4 is formed to have a size corresponding to a flange 56*a* of tube member 56. An opening portion 41 of a second plate 4 is equal in size to a hollow portion 24 of mixing body 2.

In order for mixing unit 1 to be fixed to tube member 56, first plate 3 of mixing unit 1 is inserted into tube member 56, and second plate 4 is joined to the outer side surface of flange 56*a*.

Mixing unit 1 is provided at each end of tube member 56 in FIGS. 25A and 25B. If desired, one unit of mixing unit 1 may be provided at one end, or in an intermediate portion of tube member 56 in the longitudinal direction.

Since in mixing device 5*b* configured as described above, the mixing unit 1 does not protrude in the longitudinal direction of tube member 56, mixing device 5*b* may be used by being attached to the pipe line 57 that has been already provided. Thus, it is possible to mix fluid within a piping system as necessary. It is also easy to perform maintenance.

Since mixing unit 1 has mixing effects as described above, it is possible to sufficiently perform mixing, it is not necessary to provide a mixing device separately and it is also possible to save space.

In addition to the example described above, mixing device 5 (5*b*, 5*c*) of the present invention may be configured as follows.

The outer circumferential shapes of mixing element 21, first plate 3 and second plate 4 are not limited to be circular. This is because, even if the outer circumferential shapes are not circular, there is no problem at all in practicing the invention.

Returning to FIG. 25C, there is shown mixing system 100 including mixing device 5*d* modified from mixing device 5*b* of FIG. 25A by disposing mixing units 1 in the same direction, a fluid supplying unit 101 for supplying a fluid A, a fluid supplying unit 102 for supplying a fluid B, a pipe 58 as a guide member connecting mixing device 5*d* with fluid supplying units 101 and 102, and a pipe 59 a guide member for exhausting mixed fluid mixed by mixing device 5*d*.

Fluid supplying units 101 and 102 may be any device or system for supplying fluids A and B to mixing device 5*d* with driving means (not shown in drawings) so that fluids A and B flow into one mixing unit 1 to be mixed thereby by avoiding a first plate 3 and passing through a mixing body 2, a hollow portion 24 and an opening portion 41*a* of a second plate 4.

Fluids A and B mixed by the one mixing unit 1 pass through within tube member 56 to be blocked by a first plate 3 of another mixing unit 1 but further mixed by another mixing body 2, and pass through another hollow portion and an opening 41*b* of another second plate to be fed out to an external device (not shown) or externally through pipe 59 as a mixed fluid C.

A pair of mixing units 1 are employed in FIG. 25C. If desired, one unit of mixing unit 1 may be provided at one end, or in an intermediate portion of tube member 56 in the longitudinal direction. The mixing unit 1 may be disposed in the opposite direction. More than two mixing units 1 may be disposed within tube member 56 or a pipe representing pipe 58, tube member 56 and pipe 59 as a guide member. Pipe 58 may be modified to any guide member including a coaxial double pipe having an internal pipe for fluid A and an external pipe for fluid B, and more than two supplying units 101 and 12 may be employed to mix more than two fluids A and B as needed. Thus, a desired number of fluids can be mixed by a desired number of supplying units. Accordingly, there is provided a mixing device including a mixing unit, a fluid supplying unit, and a guide member connected between the fluid supplying unit and the mixing unit to allow fluid to pass into the mixing unit through the guide member and pass out therefrom.

A fluid that is mixed is not limited to a gas or a liquid; it may be a solid mixture consisting of a liquid and a powder and granular material or the like.

With respect to applications, in addition to an application for making the concentration of a fluid uniform, for example, the mixing device can also be used for mixing the same type of fluid having different temperatures so that the fluid has a uniform temperature.

Mixing unit 1 or mixing device 5 may be used in a place, such as a diesel automobile, an exhaust gas line, or any device or system demanding high degree mixing.

Tenth Embodiment

Figure 26A:
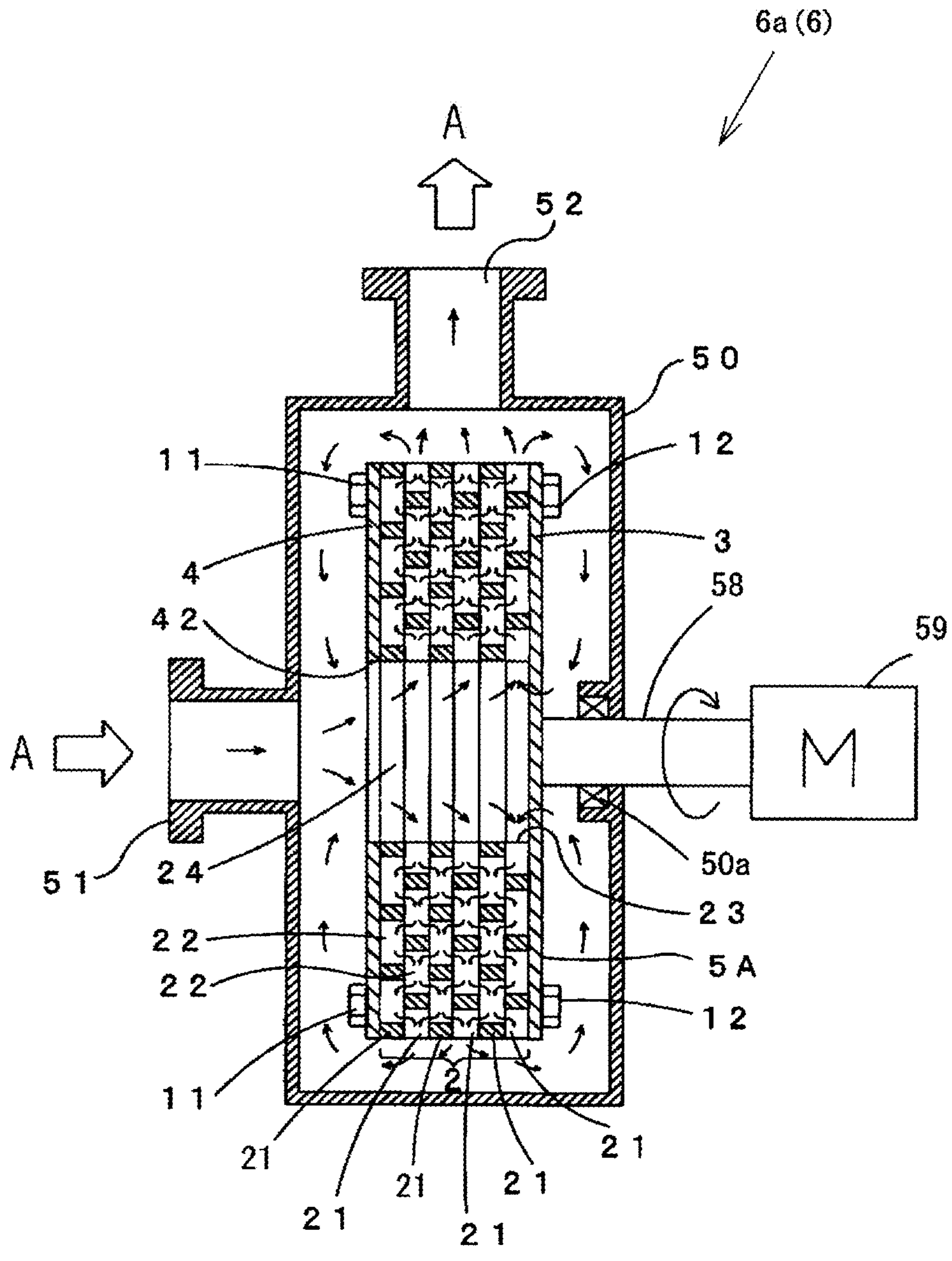
FIG. 26A is a cross-sectional view of a pump mixture in accordance with a tenth embodiment of the present invention.

FIG. 26A is a cross-sectional view showing a mixer as a pump mixer 6*a* in accordance with a tenth embodiment of the present invention, showing flow of fluid A within the pump mixer.

As shown in FIG. 26A, pump mixer 6*a* includes a mixing unit 1 having a cylindrical external shape, a cylindrical casing 50, a rotation shaft 58 and an electric motor 59 serving as a drive source. Electric motor 59 drives and rotates mixing unit 1; in this tenth embodiment, electric motor 59 is driven to rotate by the supply of electric power from an unillustrated power supply. While rotation shaft 58 is coupled to electric motor 59, rotation shaft 58 supports mixing unit 1*a* and a seal member 50*a* is provided to a portion in which rotation shaft 58 slides with respect to casing 50 so as to prevent the leakage of fluid A within pump mixer 6*a*.

Casing 50 has an inlet 51 serving as a suction port and an outlet 52 serving as a discharge port formed in the shape of a flange; fluid A is sucked into pump mixer 6*a* through inlet 51 and is discharged through outlet 52.

Figure 26B:
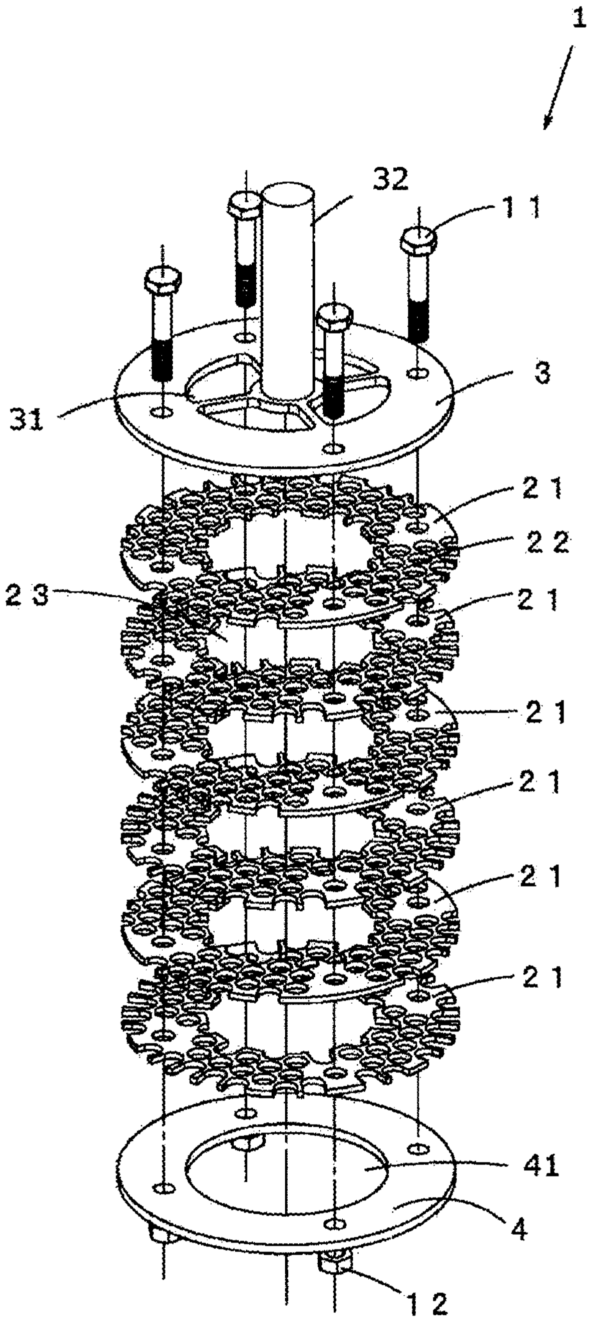
FIG. 26B is an exploded perspective view the mixing unit employed in the pump mixture of FIG. 26A.

As shown in FIG. 26B, mixing unit 1 has an axis portion 32 connected to the rotation shaft 58. Axis portion 32 is provided at the center of first plate 3; an opening portion 31 is formed around axis portion 32. As with opening portion 41 of second plate 4, opening portion 31 is a portion through which the fluid flows. Mixing unit 1 is configured as described above.

As the mixing unit 1 is driven to rotate by electric motor 59, fluid A sucked through inlet 51 of pump mixer 6*a* flows into hollow portion 24 having a cylindrical shaped hole through opening portions 31 of first plate 3 and opening portion 41 of second plate 4 of mixing unit 1. Then, fluid A flows into mixing body 2 through first through holes 22 in mixing elements 21 open to the inner circumferential portion of hollow portion 24.

A force acting outwardly in a radial direction resulting from the centrifugal force is applied to fluid A that has flowed into mixing body 2. Fluid A receiving the force is radially passed through first through holes 22 communicating with each other within mixing body 2 from the inner circumferential portion to the outer circumferential portion, and is discharged outwardly from the outer circumferential portion of mixing body 2 through first through holes 22 open to the outer circumferential portion. Fluid A that has flowed out is discharged from pump mixer 6*a* through outlet 52.

Part of fluid A that has flowed out of mixing unit 1 flows again into hollow portion 24 through the opening portion 31 of first plate 3 and opening portion 41 of second plate 4, further flows into mixing body 2 and flows out from the outer circumferential portion of mixing body 2, with the result that fluid A circulates within mixing body 2 of mixing unit 1.

Then, while fluid A substantially radially flows through first through holes 22 communicating with each other within mixing body 2 from the inner circumferential portion to the outer circumferential portion, the fluid is repeatedly dispersed, combined, reversed and subjected to turbulent flow, eddying flow, collision and the like, and thus the fluid is highly mixed.

Although, in tenth embodiment, casing 50 is cylindrical, the present invention is not limited to this configuration. The opening portion 31 may be omitted in first plate 3.

When the required degree of mixing is low, the clearance between mixing unit 1 and inlet 51 is reduced as in a conventional centrifugal pump and thus the flow rate of fluid A circulating within the pump mixer 6*a* may be reduced.

Figure 26C:
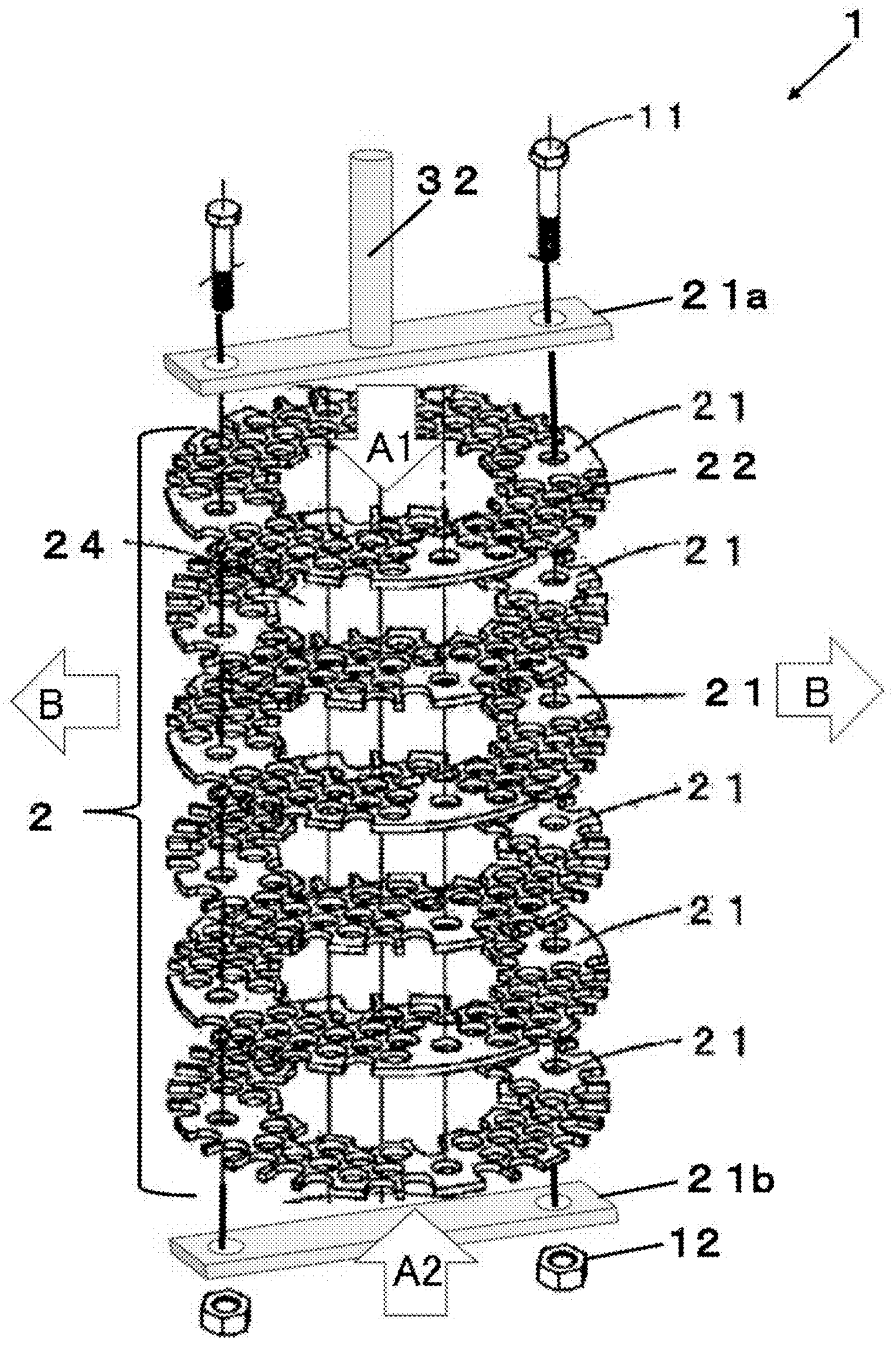
FIG. 26C is an exploded perspective view a mixing unit which may be employed in the pump mixture of FIG. 26A as a modification of FIG. 26B.

FIG. 26C is a perspective view of a mixing unit 1 modified from the mixing unit 1 of FIG. 26B, which can be applied to the pump mixer of FIG. 26A as a modification of this embodiment. The modified mixing unit 1 includes an upper attachment part 21*a* having axis portion 32, mixing body 2, and a lower attachment part 21*b*. Mixing body 2 includes mixing elements 21 sandwiched by attachment parts 21*a* and 21*b* which are fixed with bolts 11 and nuts 12.

Figure 32:
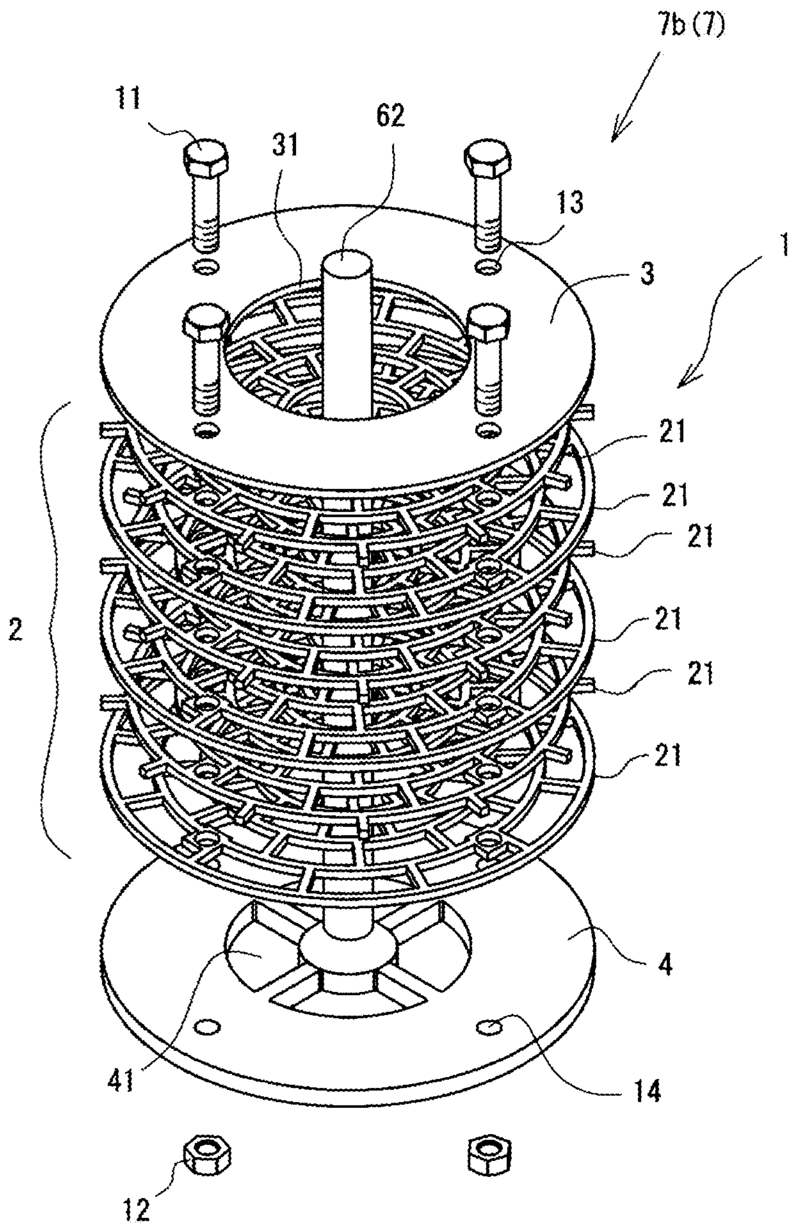
FIG. 32 is an exploded perspective view of an agitation impeller as a modification of the agitation impeller of FIG. 30.

In this modification, first plates 3 and second plate 4 of FIG. 26B are replaced with attachment parts 21*a* and 21*b*, whereby the same fluid movements as those of FIG. 26B can be performed. The lower attachment part 21*b* may be omitted as necessary. If desired, the upper attachment part 21*a* may be omitted by connecting attachment part 21*b* with axis portion 32 to support mixing body 2 as shown in FIG. 32.

As the mixing unit 1 is driven to rotate through axis portion 32 by electric motor 59 (FIG. 26A), fluids A1 and A2 from fluid A sucked through inlet 51 of pump mixer 6*a* (FIG. 26A) flow into hollow portion 24, and further into mixing body 2 through first through holes 22 in mixing elements 21 open to the inner circumferential portion of hollow portion 24.

A force acting outwardly in a radial direction resulting from the centrifugal force is applied to fluids A1 and A2 that have flowed into mixing body 2. Fluids A1 and A2 receiving the force are radially passed through first through holes 22 communicating with each other within mixing body 2 for mixing from the inner circumferential portion to the outer circumferential portion, and are discharged outwardly from the outer circumferential portion of mixing body 2 through first through holes 22 open to the outer circumferential portion as mixed fluid B. Its subsequent fluid movements are same as above-described fluid movements in FIGS. 26A and 26B with the same mixing advantages.

Mixing elements 21 may be replaced with mixing elements of the foregoing embodiments including mixing elements having concentric circular partitions like mixing elements 21 of FIG. 2. If desired, mixing body 2 may be made by pressing a plurality of mixing elements each having an engaging part or 3D printing with forming a single unit without bolts 11.

According to mixing units of FIGS. 26B and 26C, there is provided a mixing unit or a mixing body including mixing elements that are stacked in a stacking direction and that extend in an extending direction wherein the mixing elements have a plurality of first through holes to form a flow path therein, and the mixing elements are arranged such that part or all of the first through holes in one of the mixing elements communicate with first through holes in the adjacent mixing elements to allow fluid to be passed in the extending direction in which the mixing element extends and to be divided as the fluid passes into the mixing elements. The mixing unit without first and second plates of FIG. 26C can be applied to other embodiments of the present invention for rotation use of the mixing unit, including the mixing system of FIG. 29.

Figure 27A:
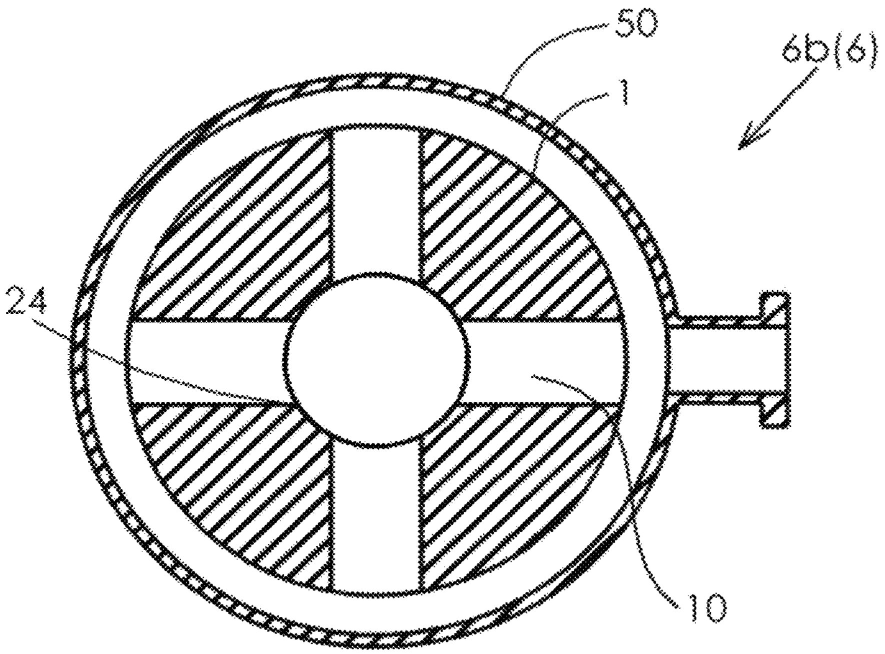
FIG. 27A shows a sectional plan view of a pump mixture as a modification of the pump mixture of FIG. 26A and its cross sectional view.
Figure 27A:
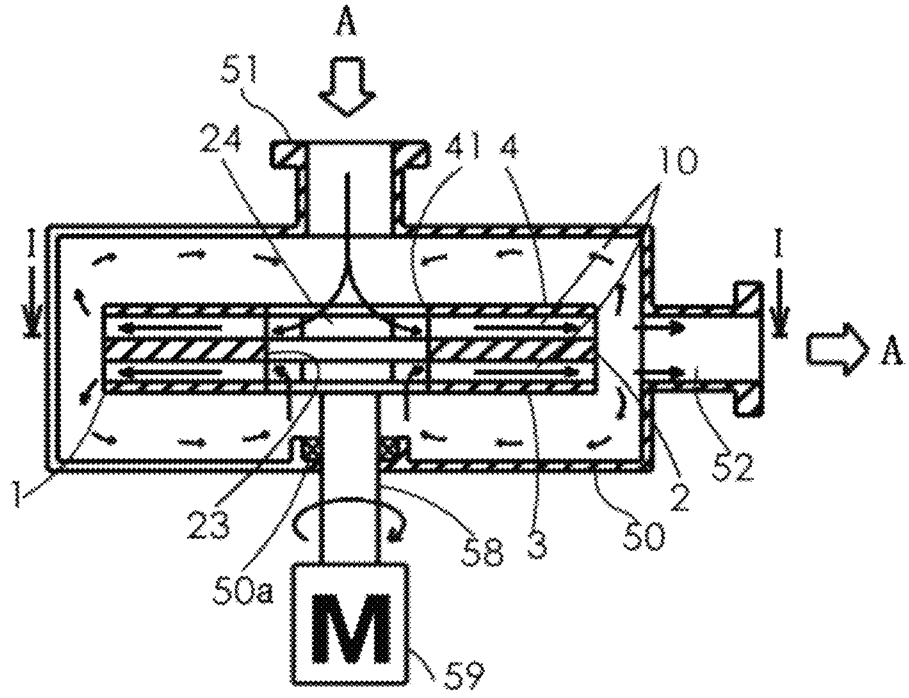

FIG. 27A shows a plan sectional view and a cross sectional view of a mixing device as a pump mixer 6*b* as a modification of pump mixer 6*a* of FIG. 26A. Pump mixer 6*b* includes a casing 50 and a mixing unit 1 disposed within casing 50*a*. Mixing unit 1 includes a cylindrical shaped hollow portion 24 passing through in a coaxial (vertical) direction of mixing unit 1, and four flow paths 10 in two layers radially expanding from hollow portion 24 to circumferential direction thereof which are closed by first layer or plate 3 and second layer or plate 4.

In pump mixer 6*b*, fluid A taken into mixing unit 1 from an inlet 51 by rotation of mixing unit 1 is mixed by passing flow paths 10 from hollow portion 24 of mixing unit 1 to the external circumferential portion. A part of fluid A passing out from the external circumferential portion of mixing unit 1 re-enters into hollow portion 24 to be re-circulated, and remaining part of fluid A is fed out through outlet 52 outwardly.

Figure 27B:
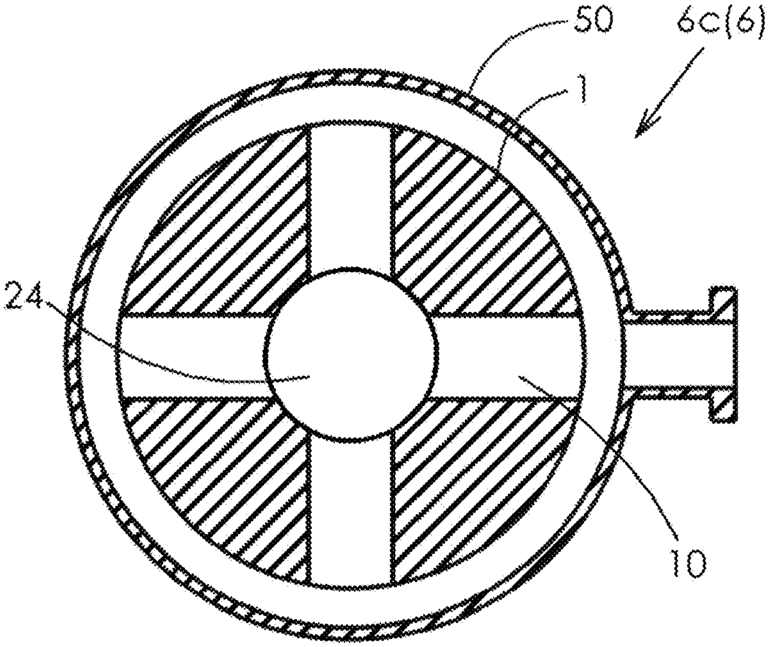
FIG. 27B shows a sectional plan view of a pump mixture as another modification of the pump mixture of FIG. 26A and its cross sectional view.
Figure 27B:
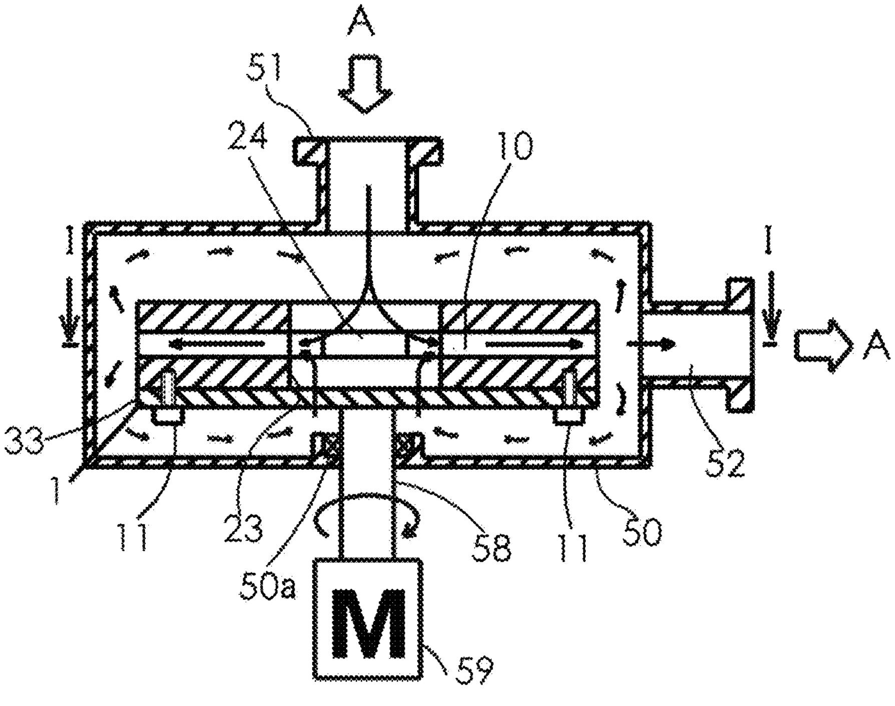

FIG. 27B shows a plan sectional view and a cross sectional view of a pump mixer 6*c* as another modification of pump mixer 6*a* of FIG. 26A. Pump mixer 6*c* includes casing 50 and mixing unit 1, but mixing unit 1 has four flow paths 10 in a single layer. Mixing unit 1 may be a mixing body formed by 3-D printing as a single unit.

Figure 28A:
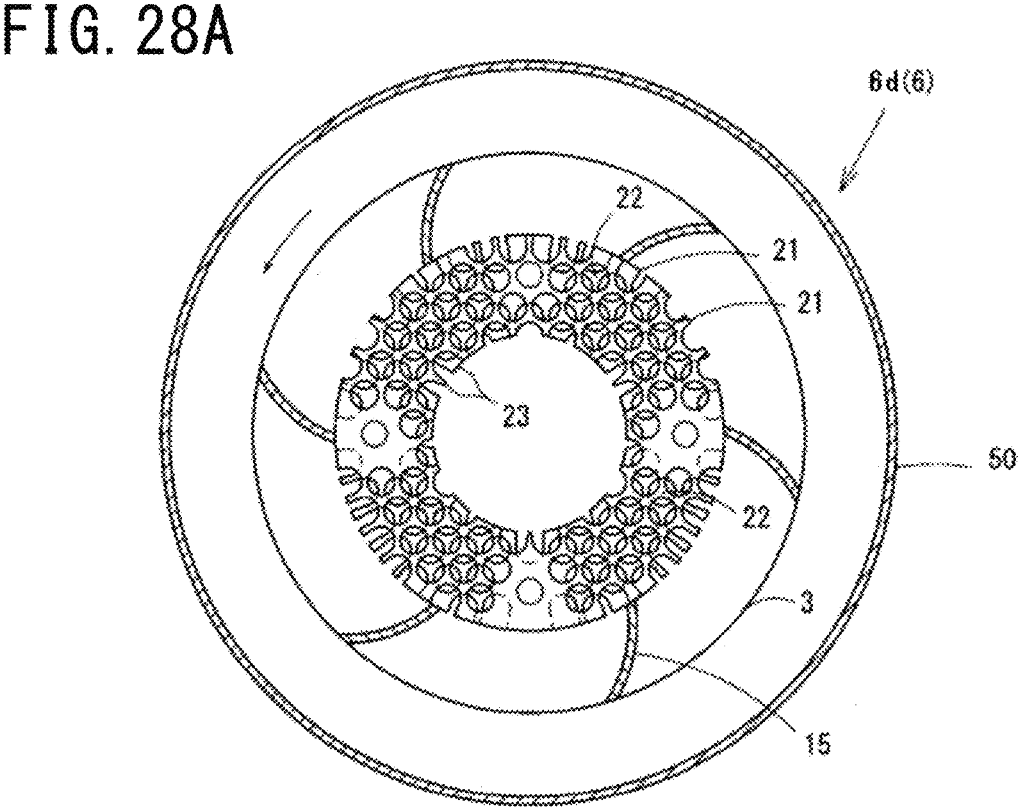
FIG. 28A is a cross-sectional plane view of a pump mixer as a modification of a tenth embodiment of the present invention.
Figure 28B:
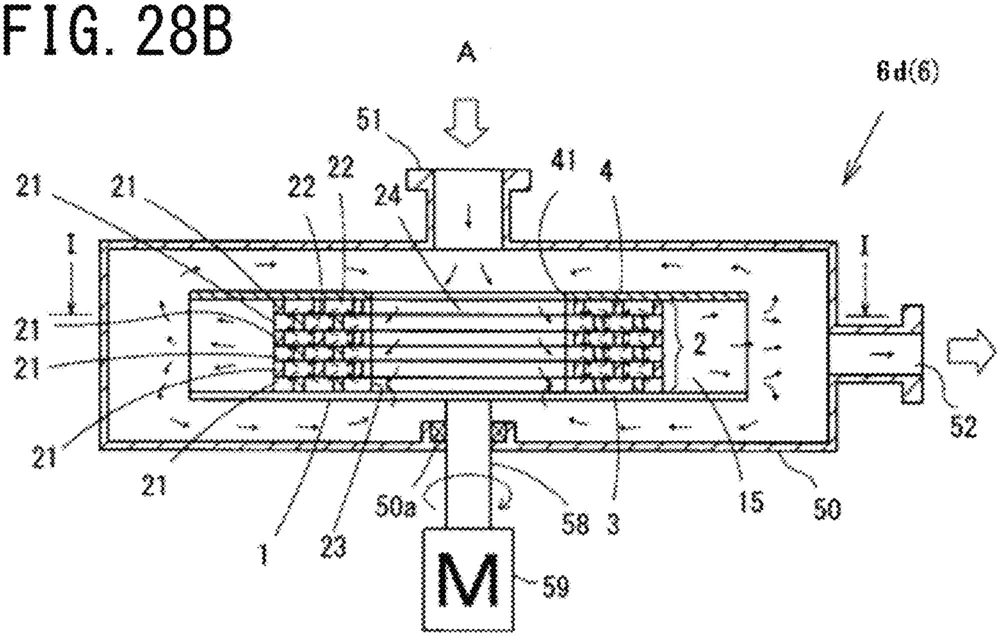
FIG. 28B is a cross-sectional view of the pump mixer of FIG. 28A showing how a fluid flows within the pump mixer.

FIGS. 28A and 28B are diagrams showing a pump mixer 6*d* as still another modification of the tenth embodiment of the present invention. FIG. 28A is a cross-sectional view taken along line I-I of FIG. 28B which is a cross-sectional view showing how fluid A flows within the pump mixer 6*d*.

The pump mixer 6*d* differs from the pump mixer 6*a* of FIG. 26A in that the outer circumferential shape of first plate 3 and second plate 4 is larger than that of mixing elements 21, and that blades 15 (here, six blades) extending in the direction in which mixing elements 21 are stacked are provided in the outer circumferential portion of mixing body 2, that is, in a space formed by first plate 3 and the second plate 4.

As mixing unit 1 rotates, fluid A that has flowed out of the outer circumferential portion of mixing body 2 flows out of the mixing unit 1 by receiving a force from blades 15. Since the ends of blades 15 are closed by first plate 3 and second plate 4, fluid A that has flowed out of the outer circumferential portion of mixing body 2 efficiently receives the force from blades 15, and thus it is possible to increase the pressure of fluid A discharged from pump mixer 6*d*.

As mixing elements of the mixing unit 1, mixing elements 21*e* and 21*f* shown in FIG. 15 may be used, and thus fluid A is mixed and receives the force efficiently.

Although blades 15 are provided in the space formed by first plate 3 and second plate 4, the present invention is not limited to this configuration. For example, another disc may be attached to mixing unit 1 to fix blades 15. Although blades 15 are provided to extend in a direction perpendicular to the direction in which mixing elements 21 extend, the present invention is not limited to this configuration. Blades 15 may be inclined as long as the effects of the present invention are achieved. The shape of blades 15 may be formed to other shape as necessary.

The other parts of the configuration of and the other effects of pump mixer 6*d* according to this modification of the pump mixer 6 are the same as those of pump mixer 6*a* of FIG. 26A according to the tenth embodiment. According to one or more embodiments of the present invention, two or more number of inlets (51) may be employed in that respectively intake different external flows A. The mixers of this tenth embodiment can be used not only as a pump mixer but also as other mixing device having a rotating mixing unit.

According to this tenth embodiment, there is provided a mixer including, a casing having a suction port that sucks fluid, and a discharge port that discharges fluid mixed within the casing, a mixing unit supported by the casing for a rotatable movement around a rotational axis within and relative to the casing, and having a hollow part provided with an opening port around the rotational axis; and a flow path disposed within the mixing unit communicating the hollow part with a periphery of the mixing unit, wherein the casing sucks the fluid through the suction port from an outside of the casing into an inside of the casing, mixes the fluid within the casing, and discharges the fluid through the discharge port to the outside of the casing.

Eleventh Embodiment

Figure 29:
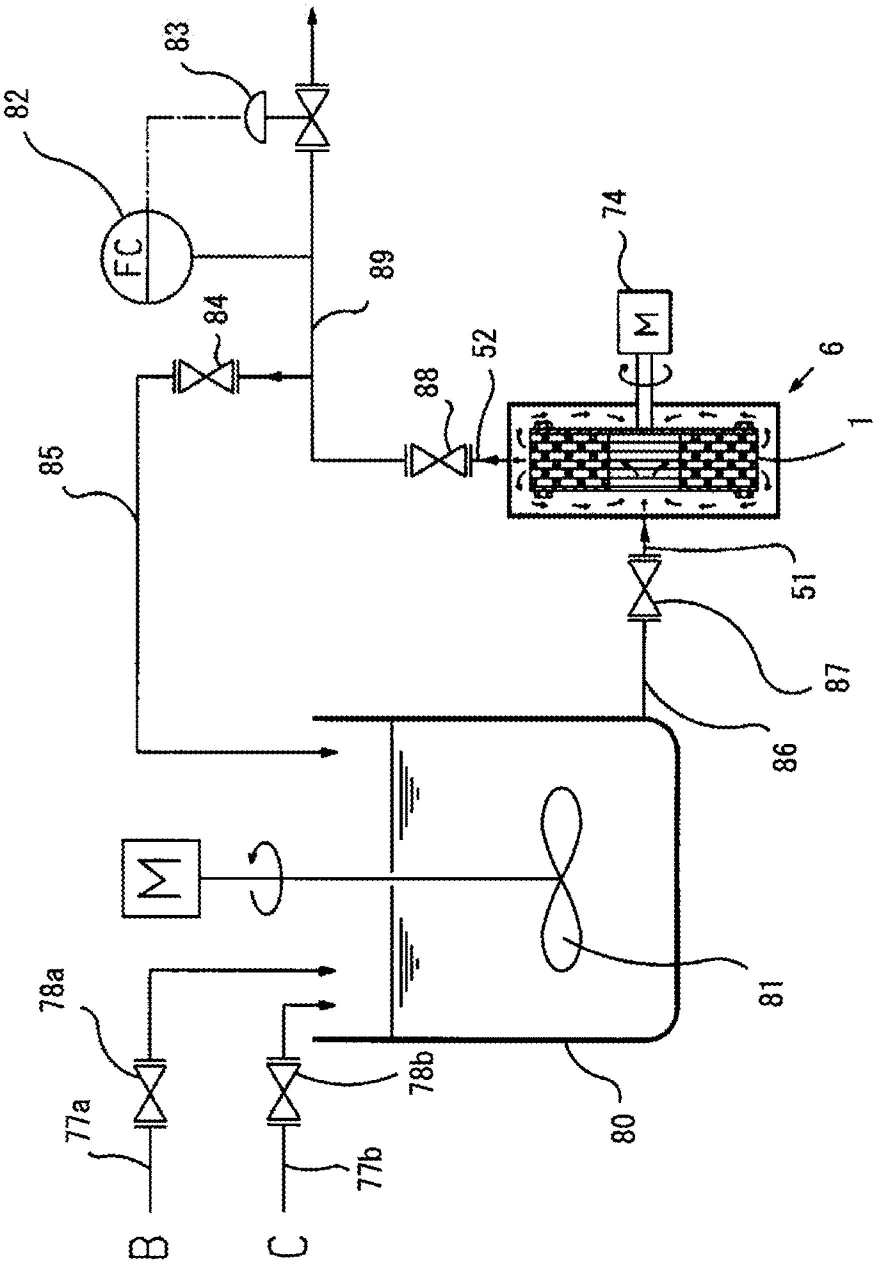
FIG. 29 is a schematic diagram showing a configuration of a mixing system in accordance with an eleventh embodiment of the present invention.

FIG. 29 is a diagram showing a configuration of a mixing system for mixing fluid with a pump mixer 6 in accordance with an eleventh embodiment of the present invention. In this example of use, the fluid is continuously mixed by pump mixer 6 and is fed out.

A fluid B and a fluid C are fed to a fluid storage vessel 80 from pipe lines 77*a* and 77*b* through valves 78*a* and 78*b*, respectively. Fluid storage vessel 80 is provided with an agitation impeller 81 for agitating fluids B and C somewhat uniformly. A nozzle 86 is provided on a lower portion of fluid storage vessel 80, and is connected to inlet 51 serving as a suction port of pump mixer 6 through a valve 87. Outlet 52 serving as a discharge port of pump mixer 6 is connected to a feed-out line 89 through a valve 88. Feed-out line 89 branches off to a circulation line 85 communicating with fluid storage vessel 80. Circulation line 85 is provided with a valve 84 for controlling the flow rate of circulated fluid.

In this example of use, in order for the mixing to be performed on fluids B and C, fluids B and C are stored in fluid storage vessel 80, and are somewhat uniformly agitated by agitation impeller 81. Then, electric motor 74 is driven to rotate mixing unit 1, and fluids B and C are sucked from inlet 51 by the pump action resulting from the rotation.

Within pump mixer 6, the sucked fluids B and C are radially passed through first through holes 22 communicating with each other within mixing body 2 constituting mixing unit 1 from the inner circumferential portion to the outer circumferential portion, with the result that fluids B and C are mixed. Mixed fluids B and C are discharged from outlet 52 of pump mixer 6, are controlled by a flow rate controller 82 and a flow rate control valve 83 and are fed out of the system through feed-out line 89.

Feed-out line 89 branches off to the circulation line 85 communicating with the fluid storage vessel 80, and part of the fluids B and C discharged from the pump mixer 6 is returned to the fluid storage vessel 80. Since the circulation line 85 is provided in this way and thus the fluids B and C are returned from the fluid storage vessel 80 to the pump mixer 6 where the fluids B and C are repeatedly mixed, the degree of mixing of the fluids B and C is increased, and the fluids B and C may be fed out of the system.

Since the degree of opening of outlet valve 88 arranged in outlet 52 of pump mixer 6 is adjusted and thus it is possible to adjust the flow rate of fluid circulating within mixing body 2 of mixing unit 1 within pump mixer 6, it is possible to adjust the degree of mixing of fluids B and C by pump mixer 6.

Moreover, since the degree of opening of valve 84 arranged in circulation line 85 is adjusted and thus it is possible to adjust the flow rate of fluid circulating through the circulation system including fluid storage vessel 80 and pump mixer 6, it is also possible to adjust the degree of mixing of fluids B and C. In this case, valve 88 and valve 84 may be automatically controlled valves.

Thus, according to this eleventh embodiment, there is provided a mixing system including a mixer which includes a casing or housing having a suction port that sucks fluid, and a discharge port that discharges fluid mixed within the casing; a mixing unit supported by the casing for a rotatable movement around a rotational axis within and relative to the casing, and having a hollow part provided with an opening port around the rotational axis; and a flow path disposed within the mixing unit communicating the hollow part with a periphery of the mixing unit, wherein the casing sucks the fluid through the suction port from an outside of the casing into an inside of the casing, mixes the fluid within the casing, and discharges the fluid through the discharge port to the outside of the casing; and a fluid circulating path communicating between the discharge port to the suction port of the mixer to allow the fluid to flow from the discharge port to the suction port for a circulation movement.

Twelfth Embodiment

Returning to FIG. 30, there is shown a perspective exploded view of an agitation impeller 7*a* in accordance with a twelfth embodiment of the present invention. FIG. 31 is a cross-sectional view of an agitation device 60 including a mixing vessel 63 and agitation impeller 7*a* of FIG. 30 arranged within mixing vessel 63, showing how fluid A circulates within agitation impeller 7*a* and a mixing vessel 63.

Figure 30:
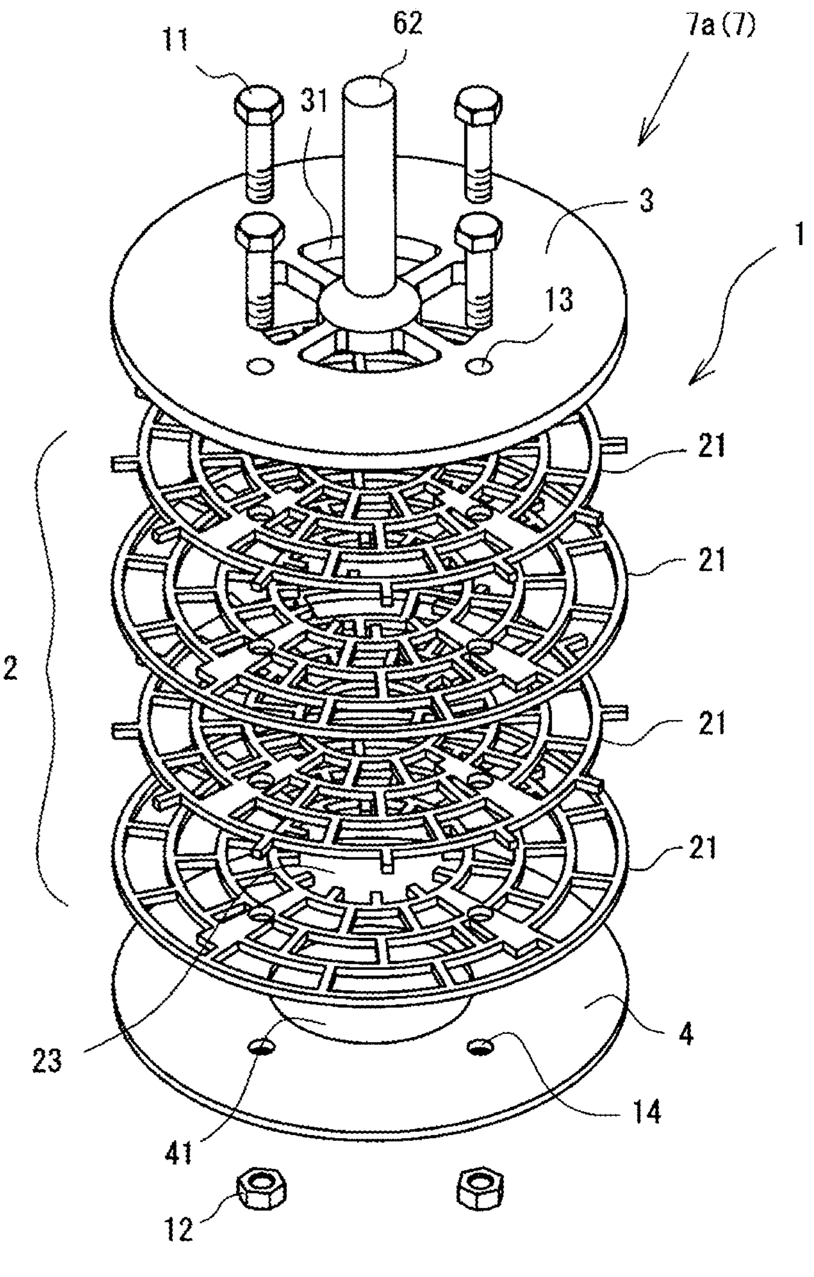
FIG. 30 is an exploded perspective view of an agitation impeller in accordance with a twelfth embodiment of the present invention.

As shown in FIG. 30, agitation impeller 7*a* has the mixing unit 1, and mixing unit 1 is configured by sandwiching mixing body 2, in which a plurality of substantially disc-shaped mixing elements are stacked, between first layer or plate 3 and second layer or plate 4 with fastening members composed of four bolts 11 and nuts 12 appropriately arranged.

First plate 3 is a disc that has holes 13 for the bolts and four opening portions 31 through which fluid A flows in, and has a rotation shaft 62 fitted thereto. Second plate 4 has holes 14 for the bolts and a circular opening portion 41 in the center portion through which fluid A flows out. First plate 3 and second plate 4 are substantially equal in outside diameter to mixing elements 21.

Mixing elements 21 have a plurality of first through holes 22, and have substantially circular second through holes 23 in the center portion through which fluid A circulating within mixing vessel 63 flows in. Second through holes 23 in mixing elements 21 are substantially equal in inside diameter to and are substantially concentric with the opening portion 41 in the second plate 4. Mixing elements 21 are stacked, and thus second through holes 23 form hollow portion 24.

The other parts of the configuration of mixing unit 1 of agitation impeller 7*a* are the same as those of mixing unit 1*a* or 1*b* according to the foregoing embodiments of the mixing unit.

Figure 31A:
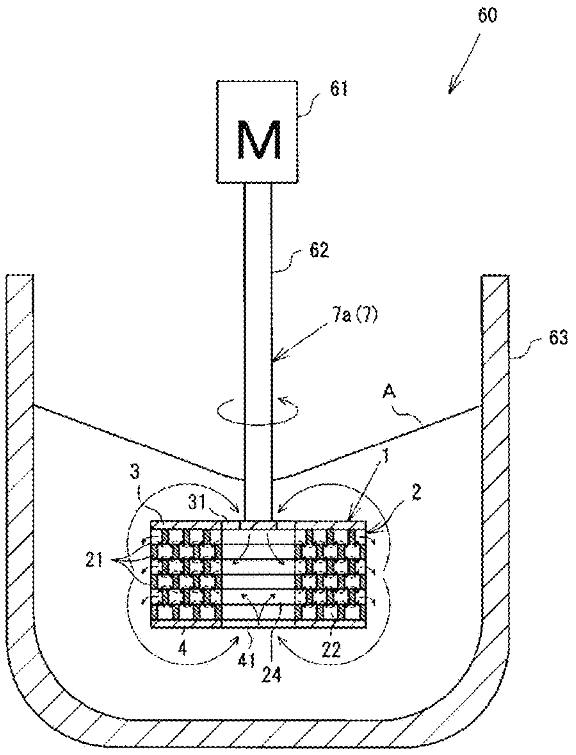
FIG. 31A is a cross-sectional view of an agitation device employing the impeller of FIG. 30 in a used state.

As shown in FIG. 31A, when agitation impeller 7*a*, that is, mixing unit 1 fitted to rotation shaft 62 is driven to rotate by a drive motor 61 to which electric power is supplied from an unillustrated power supply, a force acting outwardly in a radial direction resulting from the centrifugal force is applied to fluid A within mixing body 2 of mixing unit 1. Fluid A receiving the force is substantially radially passed through first through holes 22 communicating with each other within mixing body 2 from the inner circumferential portion to the outer circumferential portion, and is discharged outwardly from first through holes 22 open to the outer circumferential surface.

On the other hand, fluid A within mixing vessel 63 is sucked into hollow portion 24 within mixing body 2 through opening portion 41 in second plate 4 on the lower end of and four opening portions 31 in first plate 3 on the upper end of mixing unit 1. The sucked fluid A flows into mixing body 2 through first through holes 22 open to the inner circumferential surface of hollow portion 24. Then, a force acting outwardly in a radial direction due to the centrifugal force resulting from the rotation operation of mixing unit 1 is applied to sucked-fluid A, and sucked-fluid A is discharged outwardly from first through holes 22 open to the outer circumferential surface.

Then, when fluid A substantially radially flows within mixing body 2 from the inner circumferential portion to the outer circumferential portion, fluid A is passed through first through holes 22 communicating with each other, with the result that fluid A is highly mixed.

Since the fluid may be mixed by being sucked from the upper and lower portions of agitation impeller 7*a*, it is possible to expect to effectively perform mixing.

In agitation impeller 7*a* described above, since the number of mixing elements 21 stacked is increased to increase the number of through holes 22 within mixing unit 1 through which the fluid is passed and which communicate with each other, it is possible to reduce a time period during which the fluid is mixed within mixing vessel 63.

Agitation impeller 7 of the present invention is not limited to the configuration described above.

(Variations of the Agitation Impeller)

Figure 31B:
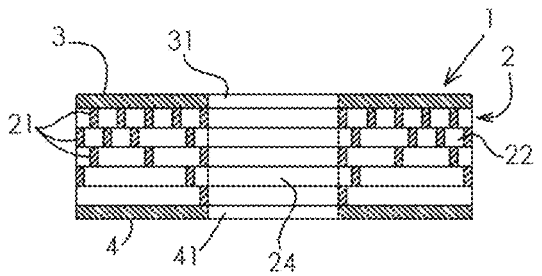
FIGS. 31B and 31C are side sectional views of mixing units as modifications of mixing elements as shown FIG. 31A.
Figure 31C:
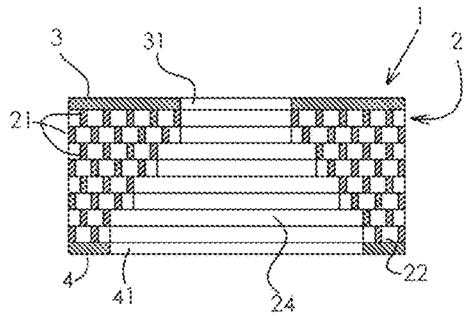

FIGS. 31B and 31C are side sectional views of mixing units 1 as modifications of mixing elements 21 of FIG. 31A. In FIG. 31B, a mixing body 2 sandwiched by first layer 3 having an opening 31 and a second layer 4 having an opening 41 consists of a plurality of mixing elements 21 each having first through holes 22 and a second through hole 24 providing a cylindrical hollow (24) communicating with openings 31 and 41. The number of partition walls extending in the circumferential direction of each mixing element 21 providing first through holes 22 in a higher position is designed to be larger than that in a lower position where diameter of each second through hole 24 is designed to be equal to those of openings 31 and 41 as shown in FIG. 31B. The resistance against fluid flowing in the radial direction of fluid increase as the number of partition walls in the circumferential direction of each mixing element 21 increases. Thus designed mixing elements 21 may decrease the volume of flowing in an upper position of mixing unit 1 but increase it in a lower position, whereby, for example, the volume of circulating fluid flowing in upper and lower portion of an agitation device circulating may be controlled when mixing unit 1 is employed in the agitation device. Mixing unit 1 of FIG. 31C differs from mixing unit 1 of FIG. 31B in that the diameter of second through hole 24 (inner hole) of each mixing element 21 is designed to be different, narrower than that in a lower position, but other construction is same as that of FIG. 31B. As shown in FIGS. 31B and 31C, each mixing element 21 has partition walls extending around the hollow portion 24, and a number of partition walls is different for each of the mixing elements 21.

In FIG. 32, there is shown an agitation impeller 7*b* including a rotation shaft 62 which may be provided on an end side of a mixing unit 1, that is, on second plate 4 as a variation of the agitation impeller shown in FIG. 30. In thus configured agitation impeller 7*b*, it is possible to suck a larger amount of fluid in the upper portion of the mixing vessel than the fluid in the lower portion of the mixing vessel.

Figure 33A:
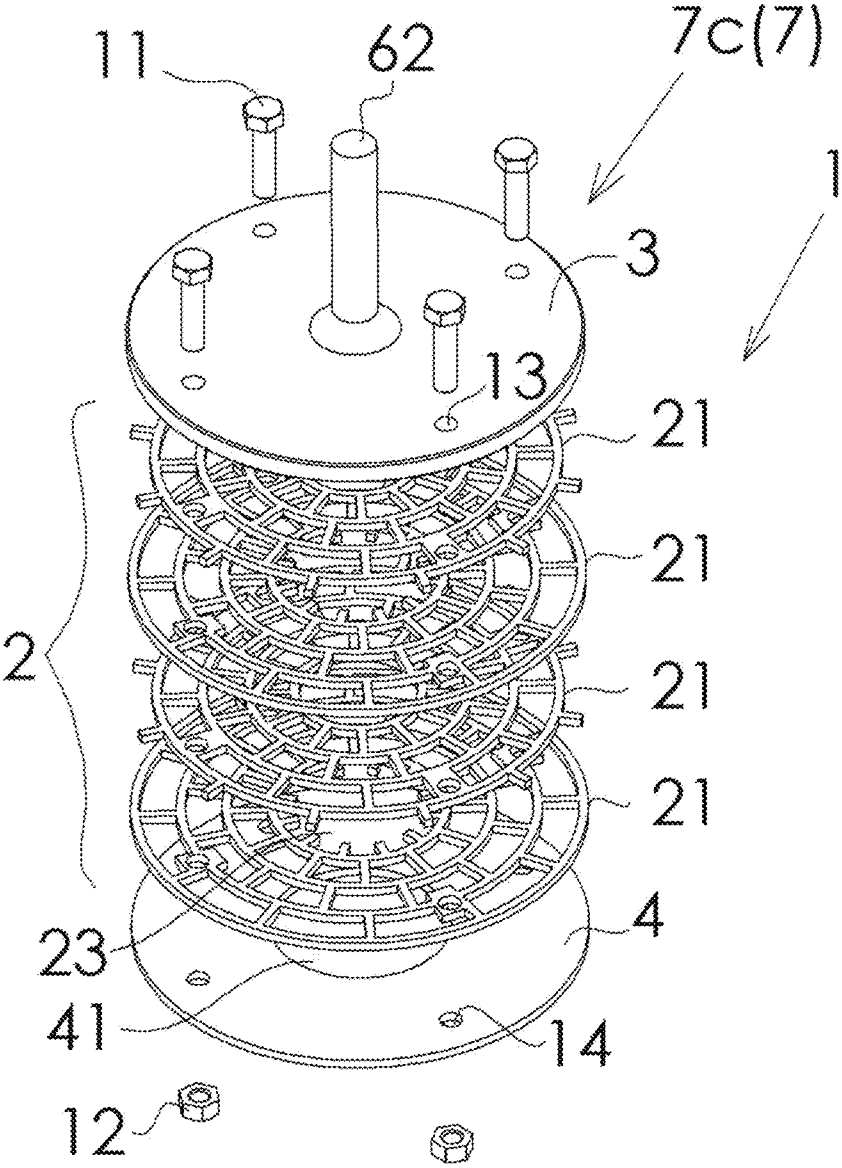
FIG. 33A is a cross-sectional view of an agitation device employing an agitation impeller modified from the agitation impeller of FIG. 30.
Figure 33B:
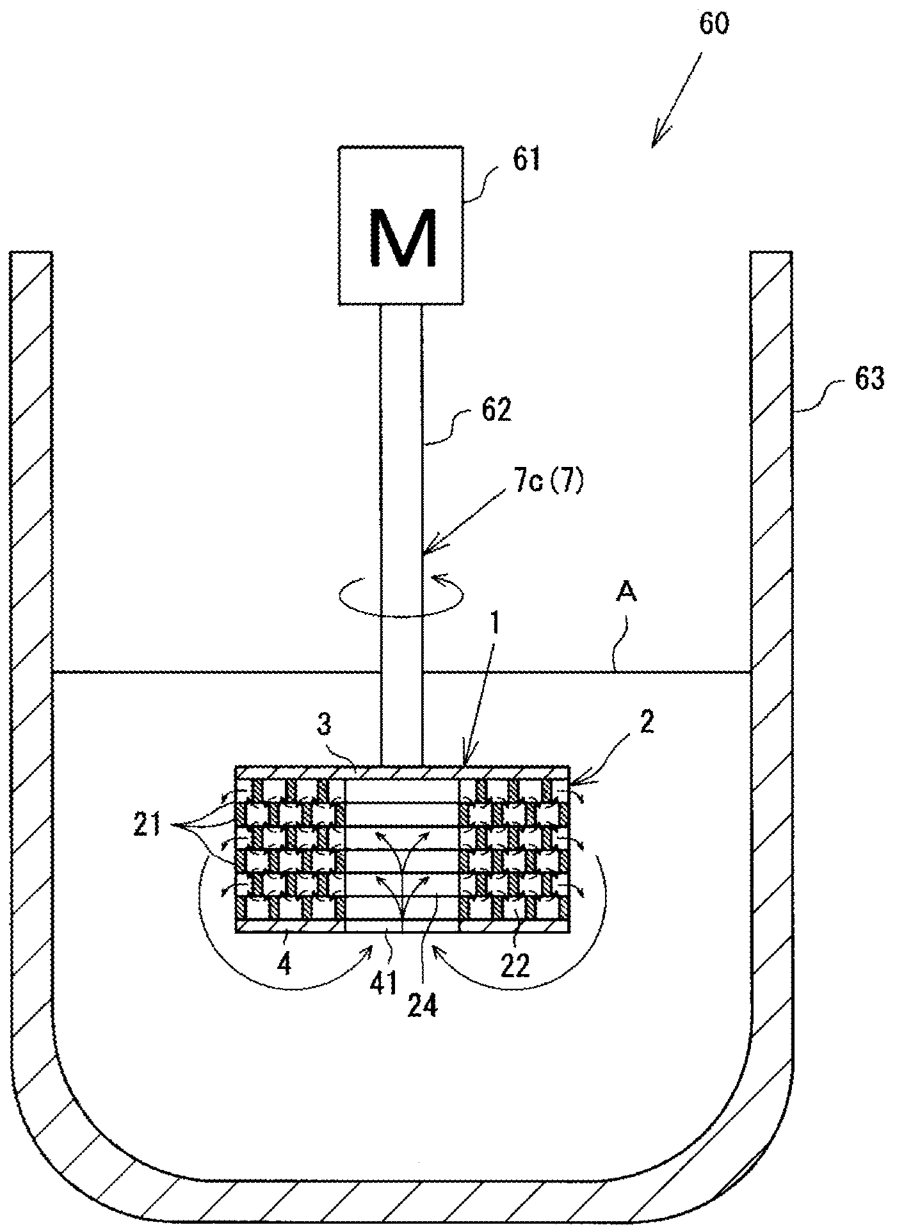
FIG. 33B is a cross-sectional view of an agitation device employing the agitation impeller of FIG. 33A.

Agitation impeller 7*b* may be modified as shown in FIG. 33A. In FIG. 33A, there is shown an agitation impeller 7*c* in which any opening portion may not be formed in first plate 3 of mixing unit 1, that is, first plate 3 may be closed. In other words, first plate 3 present near the fluid surface is closed. FIG. 33B is a cross-sectional view of an agitation device 60 including a mixing vessel 63 and agitation impeller 7*a* of FIG. 33A arranged within mixing vessel 63, showing how fluid A circulates within agitation impeller 7*c* and mixing vessel 63.

In this configuration, since the fluid flows in only from below at the time of the rotation, it is possible to mix the fluid by raising up particles and the like deposited within mixing vessel 63. The surface of fluid A within mixing vessel 63 is unlikely to be frothed. When a fluid, such as a paint, in which bubbles are desired to be prevented from being mixed at the time of agitation is agitated, this configuration is suitably used.

Figure 34:
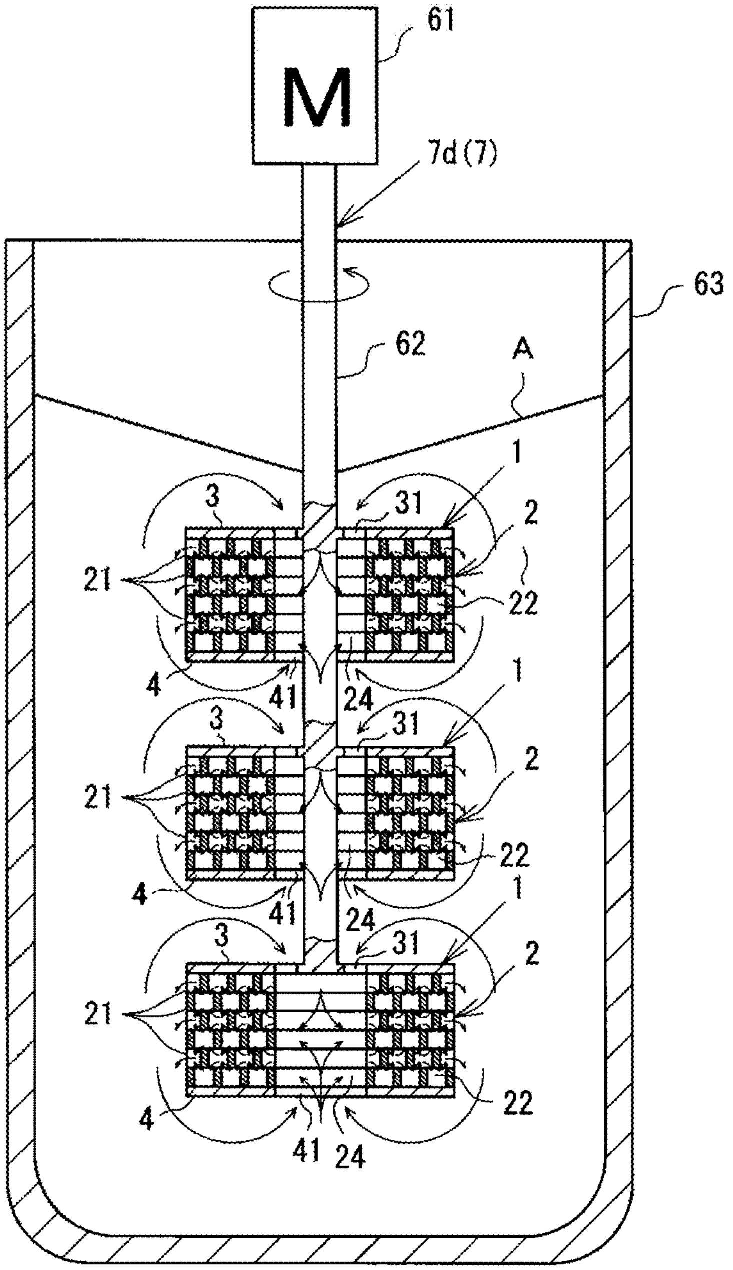
FIG. 34 is a cross-sectional view of an agitation device as a modification of the agitation device of FIG. 33B.

FIG. 34 is a cross-sectional view of an agitation device 60 including a mixing vessel 63 and a further modified agitation impeller 7*d* as another modification of agitation device. Agitation impeller 7*d* includes a rotation shaft 62 which is provided with a plurality of mixing units 1, and an appropriate space is provided between mixing units 1.

Since agitation impeller 7*d* configured as described above has a plurality of mixing units 1, it is possible to suck the fluid from the upper and lower portions of each of mixing units 1. Hence, it is possible to perform agitation even when mixing vessel 63 is deep.

Figure 35A:
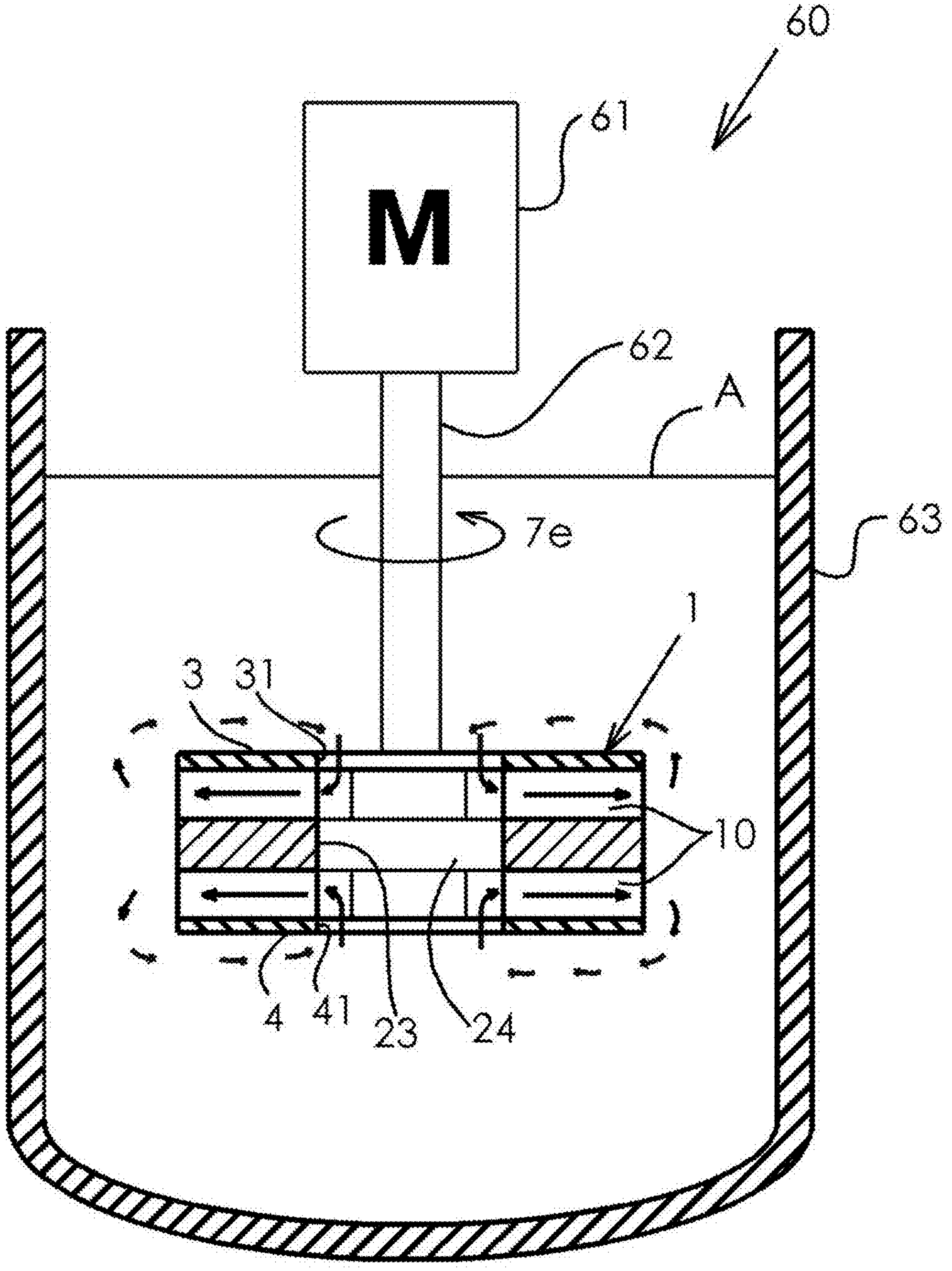
FIG. 35A is a sectional view of an agitation device including an agitation impeller which is modified from agitation impeller of FIG. 30.
Figure 35B:
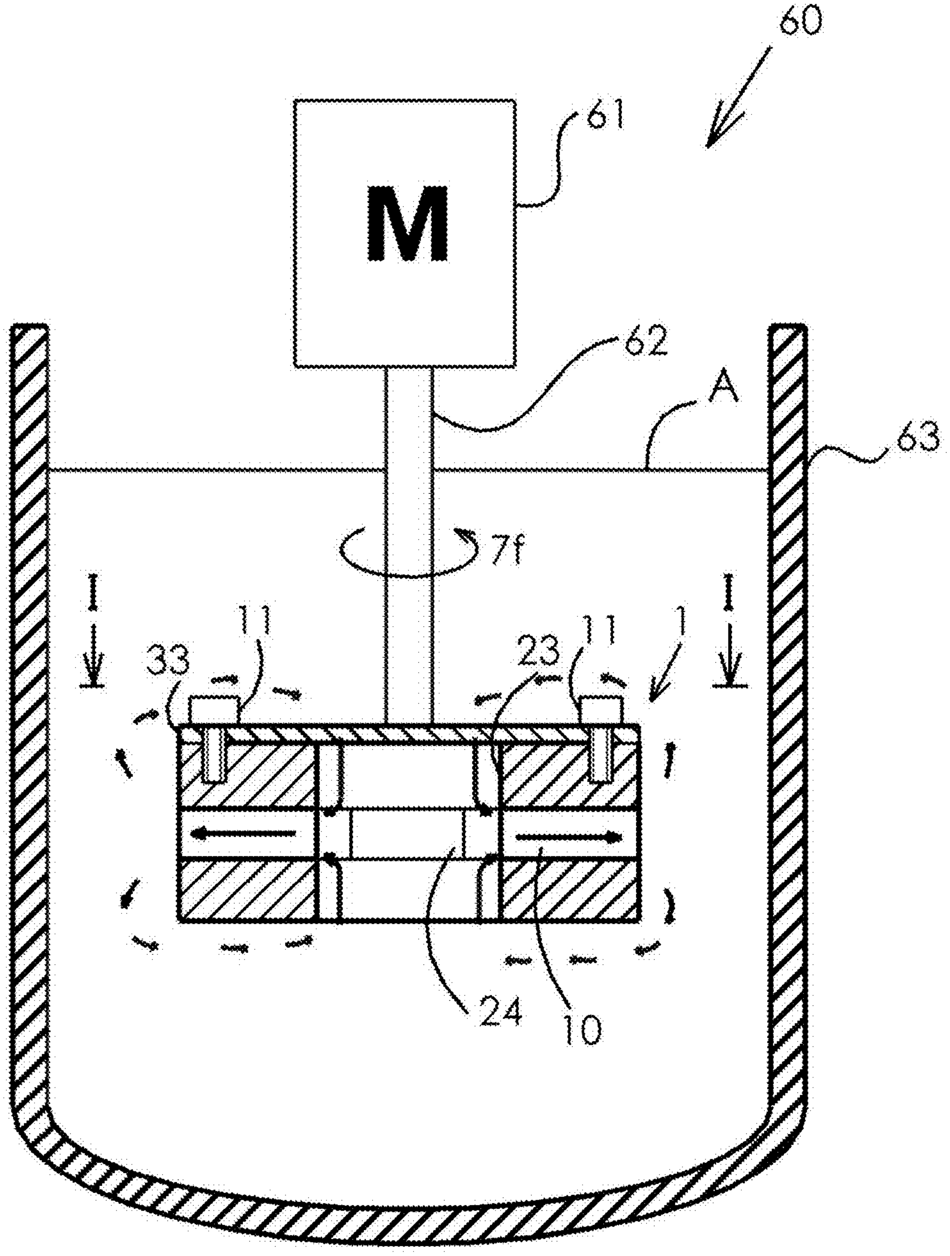
FIG. 35B is a sectional side view of an agitation device modified from the agitation device of FIG. 35A.

FIGS. 35A and 35B show further modifications of agitation impellers which may be used in agitation devices. FIG. 35A shows a cross sectional view of an agitation device 60 including an agitation impeller 7*e* which has a different configuration from that of FIG. 30 but a mixing unit 1 similar to that of FIG. 27A. Mixing unit 1 of FIG. 35A includes a cylindrical shaped hollow portion 24 at its center location passing through in a coaxial (vertical) direction of mixing unit 1, and four flow paths 10 crossing in each of two layers radially expanding from hollow portion 24 to circumferential direction thereof which are formed by a member 23, and closed by first plate 3 having a first through hole 31 and a second plate 4 having a second through hole.

Even in agitation impeller having this simplified configuration, a fluid A sucked into mixing unit 1 through a through hole 41 of second plate 4 by rotation of mixing unit 1 is mixed by passing flow paths 10 from hollow portion 24 of mixing unit 1 to the external circumferential portion. A part of fluid A passing out from the external circumferential portion of mixing unit 1 re-enters into hollow portion 24 through first and second through holes to be re-circulated.

According to one or more embodiments of the present invention, mixing unit 1 may be a single unit drilled to provide flow paths 10, through holes 31 and 41, and hollow portion 24.

FIG. 35B shows a cross sectional view of an agitation device 60 including an agitation impeller 7*f* which is modified from that of FIG. 35A, in which a mixing unit 1 similar to that of FIG. 27B. Mixing unit 1 of FIG. 35B differs from unit 1 of FIG. 35A in that four crossing flow paths 10 are disposed in a single layer in a middle of mixing unit 1. Other components or functions are same as those of FIG. 25A.

Figure 36A:
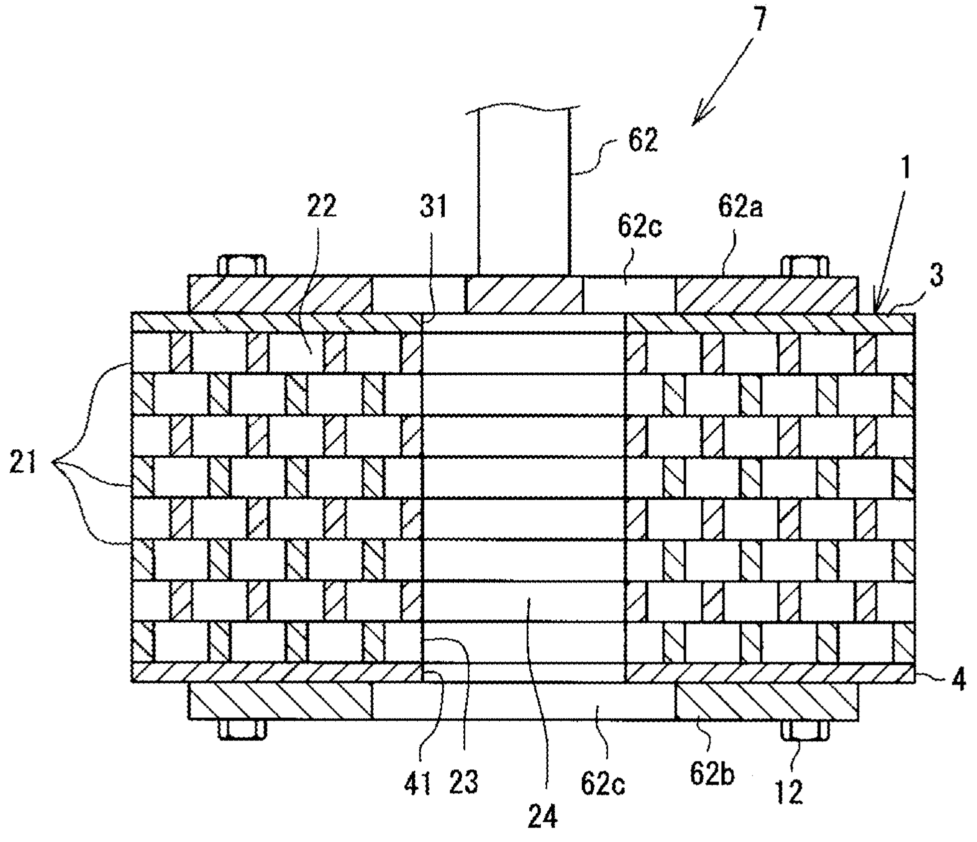
FIG. 36A is a cross sectional view of an agitation impeller as another modification.

FIG. 36A is a cross-sectional view showing the portions of a mixing unit 1 of an agitation impeller 7 as another modification of the above-described agitation impellers. In this mixing unit 1, agitation impeller 7 is configured not by providing a rotation shaft 62 directly on a first plate 3 but by using a fixing plate 62*a* provided an end of rotation shaft 62 and an auxiliary plate 62*b* which forms a pair with fixing plate 62*a* to sandwich mixing unit 1 and which is fixed with bolts 11 and nuts 12.

Opening portions 62*c* are formed in positions corresponding to second through holes 23 of mixing elements 21 in fixing plate 62*a* and auxiliary plate 62*b*. Likewise, opening portions 41 and 31 are formed in positions corresponding to second through holes 23 of mixing elements 21 in first plate 3 and second plate 4.

In agitation impeller 7 configured as described above, since first plate 3 and second plate 4 close through holes 22 at both ends of mixing body 2 in the stacking direction to form one unit, one type of rotation shaft 62 having fixing plate 62*a* and auxiliary plate 62*b* is provided, and thus it is possible to obtain agitation impeller 7 that corresponds to mixing units 1 having different sizes and structures.

Figure 36B:
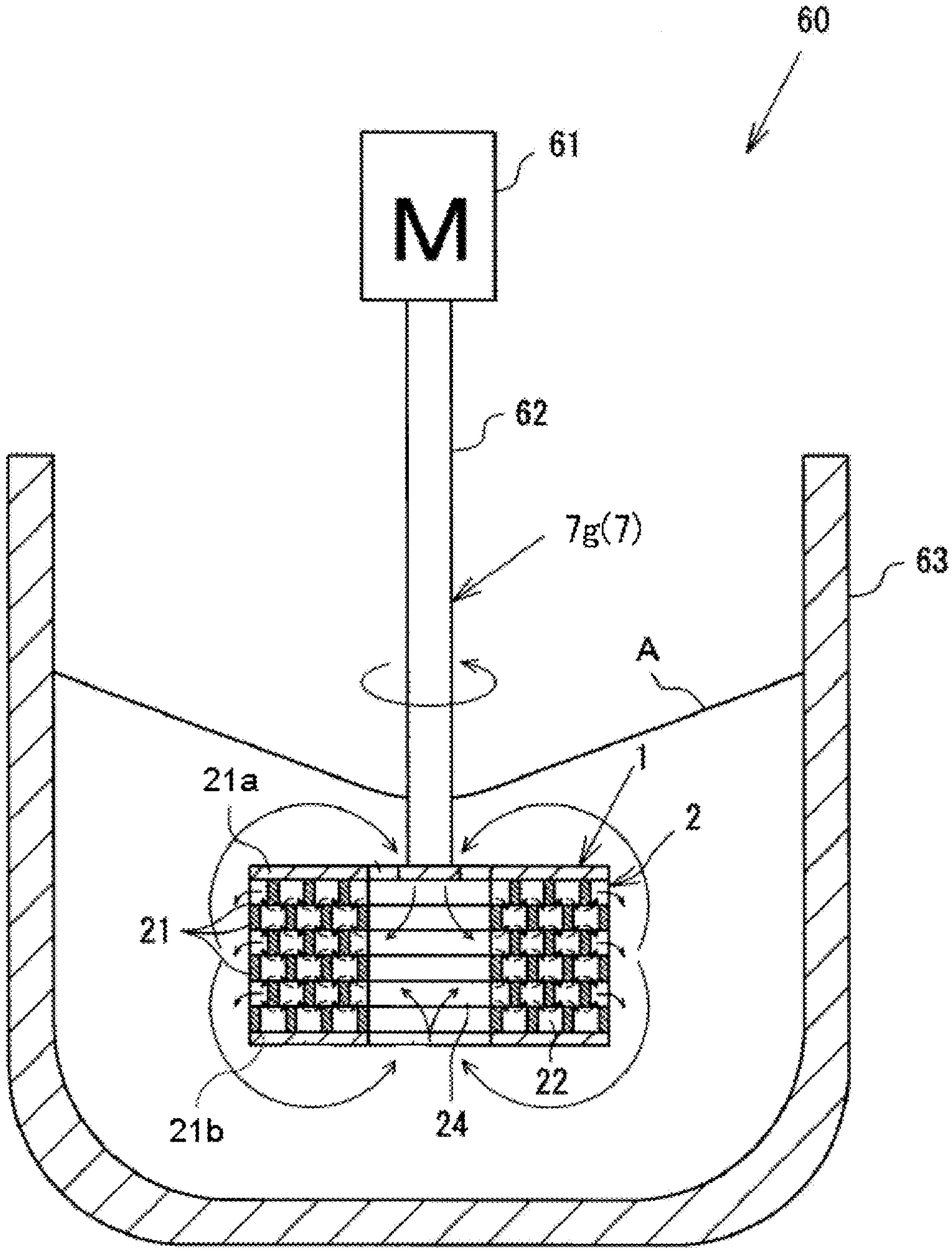
FIG. 36B is a cross-sectional view of an agitation device modified from the agitation device of FIG. 31A as still another modification.

FIG. 36B is a cross-sectional view of an agitation device 60 including a mixing vessel 63 and a modified agitation impeller 7*g* modified from the agitation device 60 of FIG. 31A as still another modification of the above-described agitation impellers. Impeller 7*g* includes a modified mixing unit 1 having a same structure as that of the mixing unit 1 of FIG. 26C includes an upper attachment part 21*a* having a rotation shaft 62 fitted thereto, mixing body 2, and a lower attachment part 21*b*. Mixing body 2 includes mixing elements 21 having first through holes 22 which are fixed between plates 21*a* and 21*b*.

In this modification, the same fluid movements as those of FIG. 31A can be performed without first plates 3 and second plate 4 of FIG. 31A. As described in the mixing unit of FIG. 26C, upper attachment part 21*a* or lower C attachment part 21*a* may be omitted as necessary.

According to foregoing modifications of this twelfth embodiment, there is provided an agitation impeller having a mixing unit or a mixing body including mixing elements that are stacked in a stacking direction and that extend in an extending direction wherein the mixing elements have a plurality of first through holes to form a flow path therein, and the mixing elements are arranged such that part or all of the first through holes in one of the mixing elements communicate with first through holes in the adjacent mixing elements to allow fluid to be passed in the extending direction in which the mixing element extends and to be divided as the fluid passes into the mixing elements.

Figure 36C:
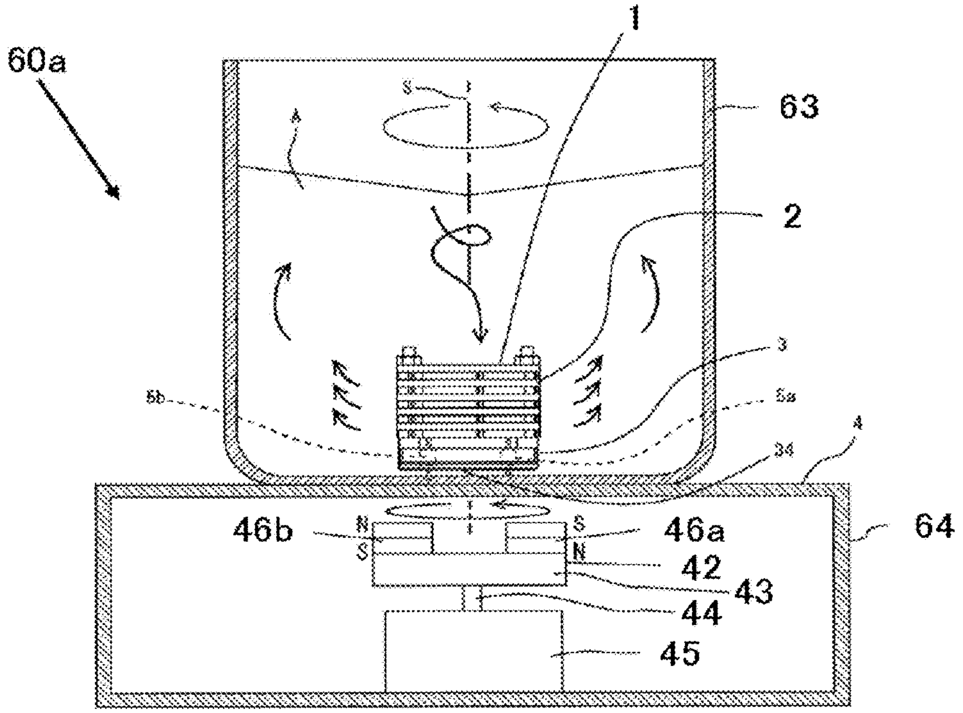
FIG. 36C is a cross-sectional view of an agitation device as still another modification.
Figure 36D:
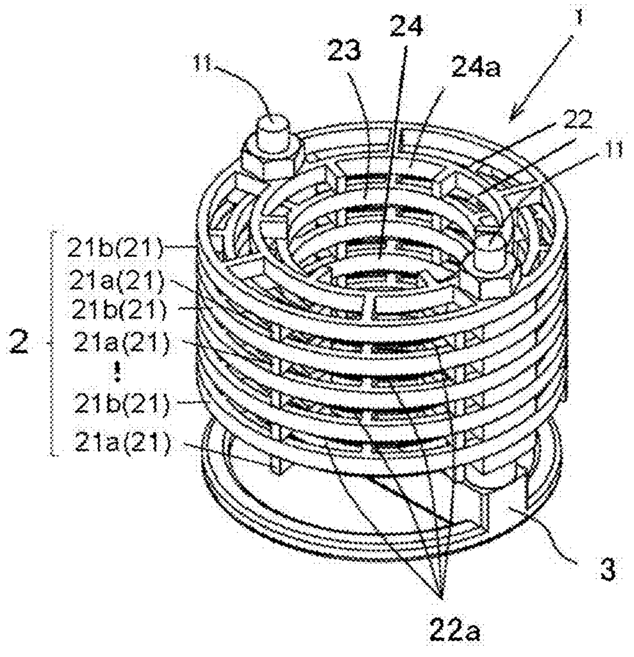
FIG. 36D is a perspective view of a mixing unit employed in the agitation device of FIG. 36C.

FIG. 36C is a cross-sectional view of an agitation device 60*a* including a mixing vessel or beaker 63, a mixing unit 1 shown in FIG. 36D as an agitation impeller put within vessel 63 for a rotatable movement, and a magnetic stirrer 64 supporting vessel 63 as still another modification of the above-described agitation devices.

The mixing unit 1 includes a mixing body 2 having a plurality of mixing elements 21 (21*a* and 21*b*) each having a plurality of first through holes 22 and a second through hole 23, and a magnetic function represented by a pedestal 3 having a magnet or magnetic member to receive rotating magnetic field generated from magnetic stirrer 64. The pedestal 3 is not limited to the configuration of FIG. 36D, and may be of any shape, for example, a disc shape, for receiving an external rotating magnetic field. The plurality of mixing elements 21 are stacked and fixed with bolts 11 to form a hollow portion 24 by communicating second through holes 23 one after another, and first through holes 22 are staggered by two types of mixing elements 21*a* and 21*b* different from each other in the arrangement pattern of the first through holes 22 in the same manner with mixing body 2 as shown in FIG. 30.

As shown in FIG. 36C, the magnetic stirrer 64 includes a rotating magnetic field generator 42 provided with a driving rotor 43 and magnet magnetic member 46*a* and 46*b* each having different magnetic poles, and a motor 45 to rotate driving rotor 43 and magnets 46*a* and 46*b* for rotating magnetic field to be applied to mixing unit 1 for a rotary movement.

As mixing unit 1 is driven to rotate by receiving rotating magnetic field generated from magnetic stirrer 64, fluid A enters into hollow portion 24 through a suction port 24*a* which is an upper opening portion of hollow portion 24, and is mixed by the plurality of first through holes 22 so that the mixed fluid A is discharged from discharge openings 22*a*. The discharged fluid A returns to the suction port 24*a*, and such fluid movements are repeated for mixing as mixing unit 1 rotates.

Thus, according to agitation device of FIG. 36C, the mixing unit 1 having a magnetic function is driven to rotate by non-contact driving means without any rotation shaft, viz., rotating magnetic field, which can be applied to a stirrer put within a beaker. The mixing unit 1 may be made by 3D printing as a single unit without using bolts 11. Further, the mixing unit 1 may be made of magnetic material as a magnetic function thereof by omitting pedestal (3) having a magnet. The magnetic stirrer 64 may be represented by any magnetic generator, viz., rotating magnet, for generating a rotating magnetic field which is disposed near or in parallel with the mixing unit 1.

According to the agitation device and the mixing unit of FIGS. 36C and 36D, there are provided an agitation impeller having a mixing unit or a mixing body having a magnetic function for receiving an external rotating magnetic field, an agitation device including the agitation impeller and a mixing vessel within which the agitation impeller is disposed, and further a agitation device or system including the agitation device and a rotating magnetic field generator for applying a rotating magnetic field to the mixing unit.

Thirteenth Embodiment

Figure 37:
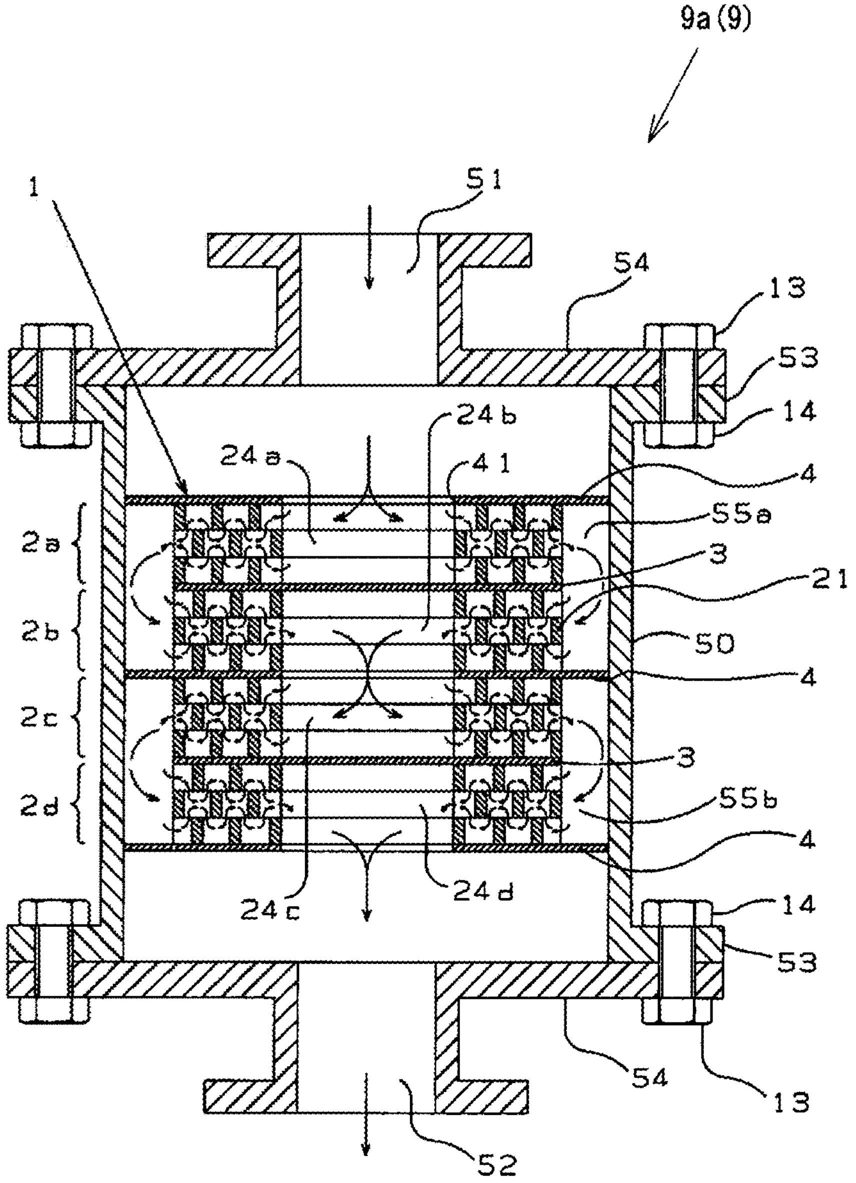
FIG. 37 is a cross-sectional view of a reaction device in accordance with a thirteenth embodiment of the present invention.

FIG. 37 is a cross-sectional view showing an internal structure of a reaction device 9*a* in accordance with a thirteenth embodiment of the present invention, showing how a fluid flows therein.

Since the structure of reaction device 9*a* shown in FIG. 37 is the same as that of mixing device 5*a* shown in FIG. 24A, the same symbols are used, and their detailed description will not be repeated.

In this reaction device 9*a*, when a plurality of types of fluid that are to undergo reaction are made to flow in through inlet 51, the fluid is passed, one after another, within mixing bodies 2*a* to 2*d* and annular space portions 55*a* and 55*b*, and flows toward the outlet 52. While the fluid is passed through the mixing bodies 2*a* to 2*d* and annular space portions 55*a* and 55*b*, the fluid is highly mixed as described above.

In other words, the fluid that is a reaction raw material is satisfactorily mixed. Hence, the reaction is promoted, and thus it is possible to rapidly obtain a desired reaction product. Since the fluid is mixed while the fluid is being passed within reaction device 9*a*, it is possible to satisfactorily mix not only the reaction raw material but also the reaction product.

Figure 38:
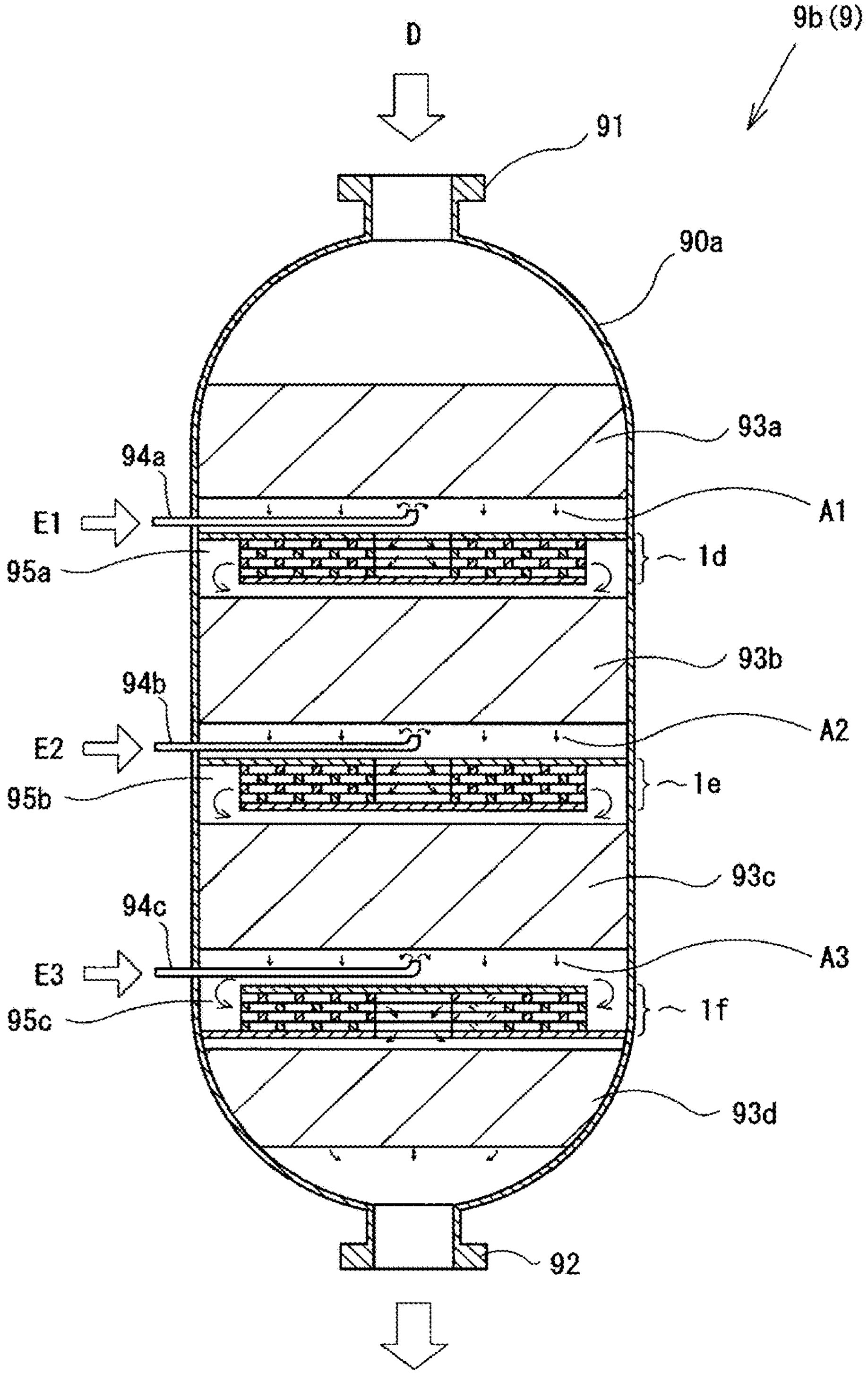
FIG. 38 is a cross-sectional view of a reaction device as a modification of the device of FIG. 37.
Figure 39A:
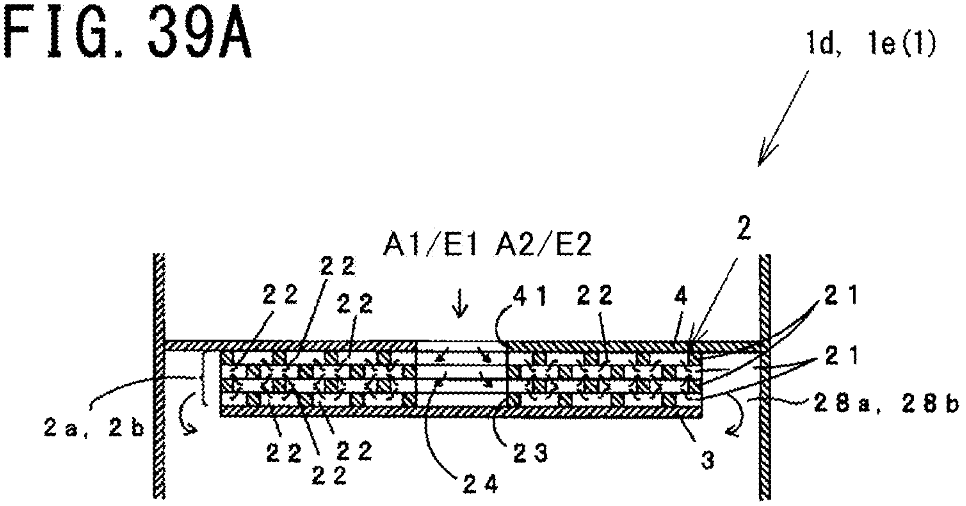
FIGS. 39A and 39B are partial cross-sectional views of mixing units employed in the reaction device of FIG. 38.
Figure 39B:
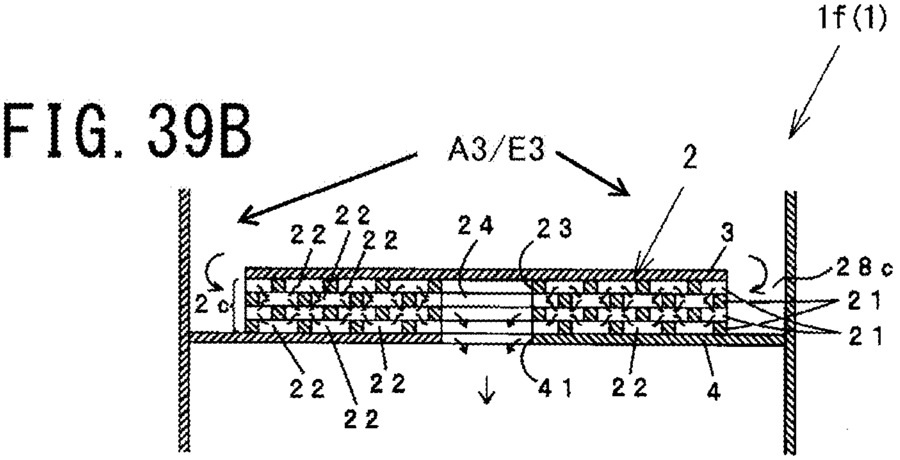

FIG. 38 is a cross-sectional view of a reaction device 9*b* within mixing units 1*d* to 1*f* are arranged as a modification of this thirteenth embodiment, showing how a fluid D and a fluid E flow within a reaction device 9*b*. FIGS. 39A and 39B are cross-sectional views showing how the fluid D and the fluid E flow within mixing units 1*d* to 1*f* arranged in reaction device 9*b*.

In reaction device 9*b*, catalyst layers 93*a* to 93*d* are provided within a substantially cylindrical vessel 90*a* having an inlet 91 and an outlet 92, and mixing units 1*d* to 1*f* and cooling gas feed nozzles 94*a* to 94*c* are arranged between catalyst layers 93*a* to 93*d*.

In this embodiment, reaction device 9*b* may be desirably used as a methanol synthesis reactor that involves a heterogeneous exothermic reaction; for example, a preheated high-temperature raw gas (fluid D) is fed from inlet 91, and low-temperature raw gases (fluids E1 to E3) that are not preheated are fed from the cooling gas feed nozzles 94*a* to 94*c*.

As shown in FIGS. 39A and 39B mixing units 1*d* to 1*f* are configured by sandwiching mixing body 2 (2*a* to 2*c*), in which a plurality of substantially disc-shaped mixing elements 21 are stacked, between first layer or plate 3 and second layer or plate 4 with appropriate fixing means, and mixing units 1*d* to 1*f* are further fixed within vessel 90*a* with predetermined fixing means.

First plate 3 is a circular plate; the outside diameter of first plate 3 is substantially equal to the outside diameter of mixing elements 21. Second plate 4 is a circular plate having a circular opening portion 41 substantially in the center portion through which fluids D and E flows in; opening portion 41 is substantially equal in inside diameter to second through holes 23 of mixing elements 21, and the outside diameter of opening portion 41 is substantially equal to the inside diameter of vessel 90*a*. The overlapped state of first through holes 22 in mixing elements 21 constituting the mixing units 1*d* to 1*f* is the same as that of mixing units 1*a*, 1*b* and 1*c* of foregoing embodiments.

With respect to the mixing units 1*d* to 1*f* described above, for example, in mixing unit 1*d* as shown in FIG. 39A, a high-temperature fluid A1 that has flowed from inlet 91 of reaction device 9*b* with appropriate pressure and that has passed through first catalyst layer 93*a* along with a fluid E1 fed from cooling gas feed nozzle 94*a* flows into a hollow portion 24 through opening portion 41 of second plate 4. Fluids A1 and E1 that have flowed in flow into a mixing body 2*a* through first through holes 22 in mixing element 21 communicating with hollow portion 24, and repeatedly flow in and out between first through holes 22 communicating with each other, with the result that fluids A1 and E1 are mixed. The mixed fluids A1 and E1 flow out of mixing body 2*a* through first through holes 22 in mixing element 21 communicating with an outside space portion 95*a* (FIG. 38) of mixing body 2*a*.

As described above, when fluids A1 and E1 are passed through first through holes 22 communicating with each other within mixing body 2*a* from the inner circumferential portion to the outer circumferential portion, they are dispersed, combined, reversed and subjected to turbulent flow, eddying flow, collision and the like, and thus fluids A1 and E1 are highly mixed. Then, the highly mixed fluids A1 and E1 are fed to downstream catalyst layer 93*b*, and thus the reaction rate in the catalyst layer 93*b* is increased.

Likewise, even with the mixing unit 1*e*, fluids A2 and E2 are highly mixed.

On the other hand, in mixing unit 1*f*, in contrast to mixing units 1*d* and 1*e*, first plate 3 is arranged on the upper portion of mixing body 2*c* and second plate 4 is arranged on the lower portion thereof. Even with mixing unit 1*c* configured as described above, fluids A3 and E3 flow into mixing body 2*c* through first through holes 22 in mixing element 21 communicating with an outside space portion 95*c* (FIG. 38) of mixing body 2*c*, and flow out through first through holes 22 in mixing element 21 communicating with a hollow portion 24, with the result that the fluids A3 and E3 are highly mixed.

As described above, in mixing unit 1 according to the thirteenth embodiment, second plate 4, mixing body 2 and first plate 3 may be stacked in this order in the direction in which the gas flows or, by contrast, first plate 3, mixing body 2 and the second plate 4 may be stacked in this order (see FIGS. 38 and 39(*a*) and 38(*b*)).

By freely selecting the number of mixing elements 21 stacked, it is easy to control the loss of pressure of the mixing units 1*d* to 1*f*. For example, since the fluid A3 is obtained by adding the fluids E1 and E2 to the fluid A1, the flow rate of fluid flowing into mixing unit 1*f* is larger than the flow rate of fluid flowing into the mixing unit 1*d*. In this case, by increasing the number of mixing elements 21 stacked in the mixing unit 1*f* more than the number of mixing elements stacked in the mixing unit 1*d*, it is easy to decrease the loss of pressure of the mixing unit 1*f*.

Figure 40A:
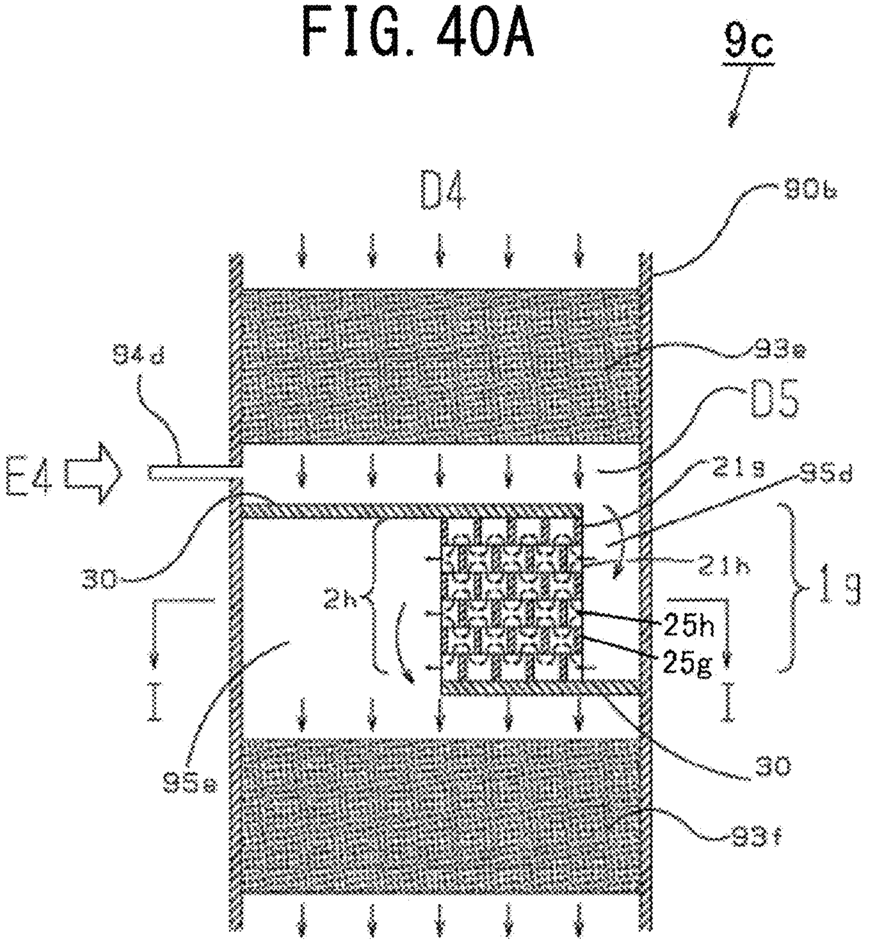
FIG. 40A is a cross-sectional view of a reaction device as another modification of the device of FIG. 37.
Figure 40B:
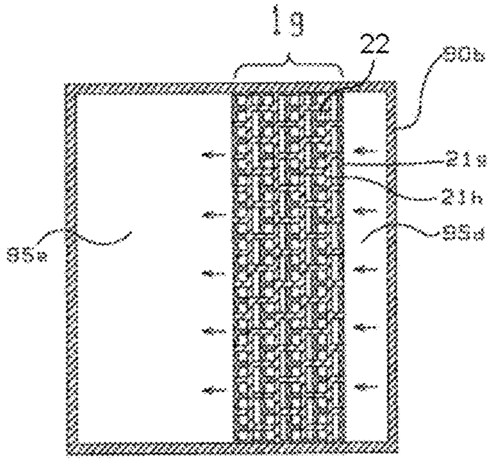
FIG. 40B is a cross-sectional view taken along line I-I of FIG. 40A.
Figure 40C:
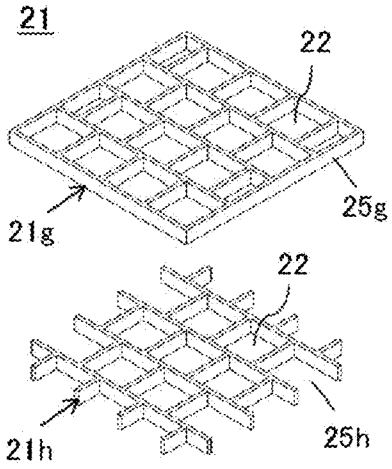
FIG. 40C is a perspective view of a pair of mixing elements employed in the reaction device of FIG. 40A.

FIG. 40A is a cross-sectional view of a reaction device 9*c* according to another modification of this thirteenth embodiment, showing how the fluids D and E flow through a mixing unit 1g provided in the reaction device. Reaction device 9*c* includes FIG. 40B is a cross-sectional view taken along line I-I of FIG. 40A. FIG. 40C shows a pair of mixing elements 21 (21*g* and 21*h*) employed in mixing unit 1*g* of reaction device.

As shown in FIG. 40C, mixing elements 21 each includes a plurality of first through holes 22, and are constituted with a combination of a mixing element 21*g* surrounded with a side frame 25*g* and a mixing element 21*h* with openings 25*h* formed by first through holes 22 at a peripheral portions of the element 21*h*. The mixing elements 21*g* and 21*h* are arranged to be stacked such that first through holes 22 of neighboring mixing elements 21*g* and 21*h* are staggered or shifted in parallel with each other to be overlapped as shown in FIGS. 40A and 40B.

Mixing unit 1*g* is configured by sandwiching a mixing body 2*h*, in which the mixing elements 21*g* and 21*h* are stacked, between a first layer or cover plate 30*a* and a second layer or cover plate 30*b* with appropriate fixing means, and is further fixed within vessel 90*b* with predetermined fixing means. First through holes 22 in mixing elements 21*g* and 21*h* on both ends of the mixing body 2*h* in the stacking direction are closed by the cover plates 30*a* and 30*b*; both ends of the mixing elements 21*g* and 21*h* in the direction in which the mixing element 21*g* and 21*h* extends are blocked by vessel 90*b* such that an inlet and an outlet for the fluids D5 and E4 are provided. First through holes 22 in mixing elements 21*g* and 21*h* of mixing unit 1*g* communicate with each other such that fluids D5 and E4 are passed in the direction in which mixing elements 21 extend.

As described above, in mixing unit 1*g*, fluids D5 and E4 flow into mixing body 2*h* through first through holes 22 in the mixing element 21*h* communicating with an outside space portion 95*d*, and repeatedly flow in and out between first through holes 22 communicating with each other, with the result that the fluids D5 and E4 are mixed. Then, the mixed fluids D5 and E4 flow out of mixing body 2*h* through the first through holes 22 in the mixing element 21*h* communicating with an outside space portion 95*e*.

Thus, the mixing element 1*g* provides fluid movements such that fluids D5 and E4 are divided and combined in the direction in which mixing elements 21 extend and also in the direction in which mixing elements 21 are stacked. The fluid movements are performed by an arrangement such that an upper surface of one mixing element (21*h*) is in contact with another mixing element (21*g*) and a lower surface of the one mixing element (21*h*) is in contact with the another mixing element (21*g*) as shown in FIG. 40A, and further the first through holes (22) are overlapped by a pair of neighboring adjacent mixing elements (21*g* and 21*h*) as shown in FIG. 40B.

When, as seen in cross-sectional view, mixing elements 21*g* and 21*h* are smaller than vessel 90*b*, part of the side surface of the mixing body 2*h* may be covered by an appropriate plate or the like such that an inlet and an outlet for the fluids D5 and E4 are provided.

Thus, according to this modification of FIG. 40, there is provided a mixing unit including a mixing body including mixing elements that are stacked in a stacking direction and that extend in an extending direction; wherein the mixing elements have a plurality of first through holes to form a flow path therein, and the mixing elements are arranged such that part or all of the first through holes in one of the mixing elements communicate with first through holes in the adjacent mixing elements to allow fluid to be passed in the extending direction in which the mixing element extends and to be divided as the fluid passes into the mixing elements, wherein the extending direction in which the mixing element extends is perpendicular to the stacking direction in which the mixing elements are stacked. Further, there is provided a reaction device including the mixing unit, and a catalyst layer, and a vessel housing the mixing unit and the catalyst layer.

Fourteenth Embodiment

Figure 41:
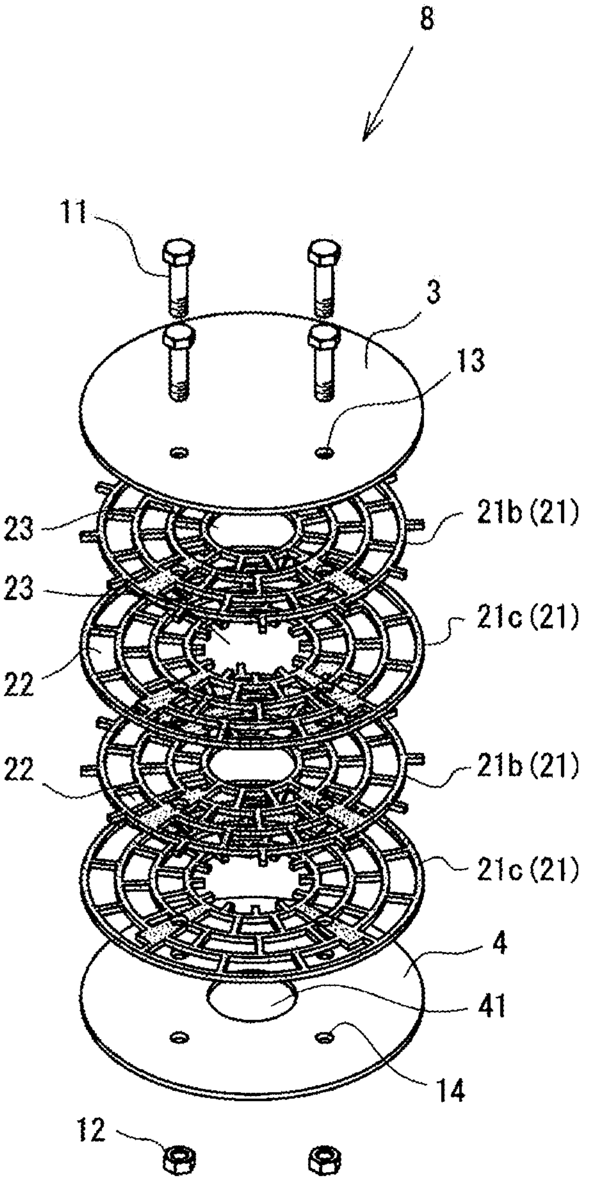
FIG. 41 is an exploded perspective view of a catalyst unit in accordance with a fourteenth embodiment of the present invention.

FIG. 41 is an exploded perspective view of a catalyst unit 8 in accordance with a fourteenth embodiment of the present invention.

The configuration of catalyst unit 8 is the same as that of the mixing units 1*a* to 1*f* in the foregoing embodiments except that mixing elements 21 have a catalytic ability.

In other words, mixing elements 21 forming catalyst unit 8 are formed of material having a catalytic action or have catalyst layers on their surfaces. The type of catalyst is selected as necessary according to a desired reaction.

In the catalyst unit 8 formed as described above, while the fluid passes through first through holes 22 within catalyst unit 8 one after another, the mixing of a reaction raw material and a reaction product is promoted. Since the promotion of mixing of the reaction raw material promotes the reaction, it is possible to rapidly perform a desired reaction.

According to one or more embodiments of the present invention, the program for manufacturing a mixing unit 1 according to one or more embodiments of the present invention may be stored on a non-transitory computer readable medium. Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 42:
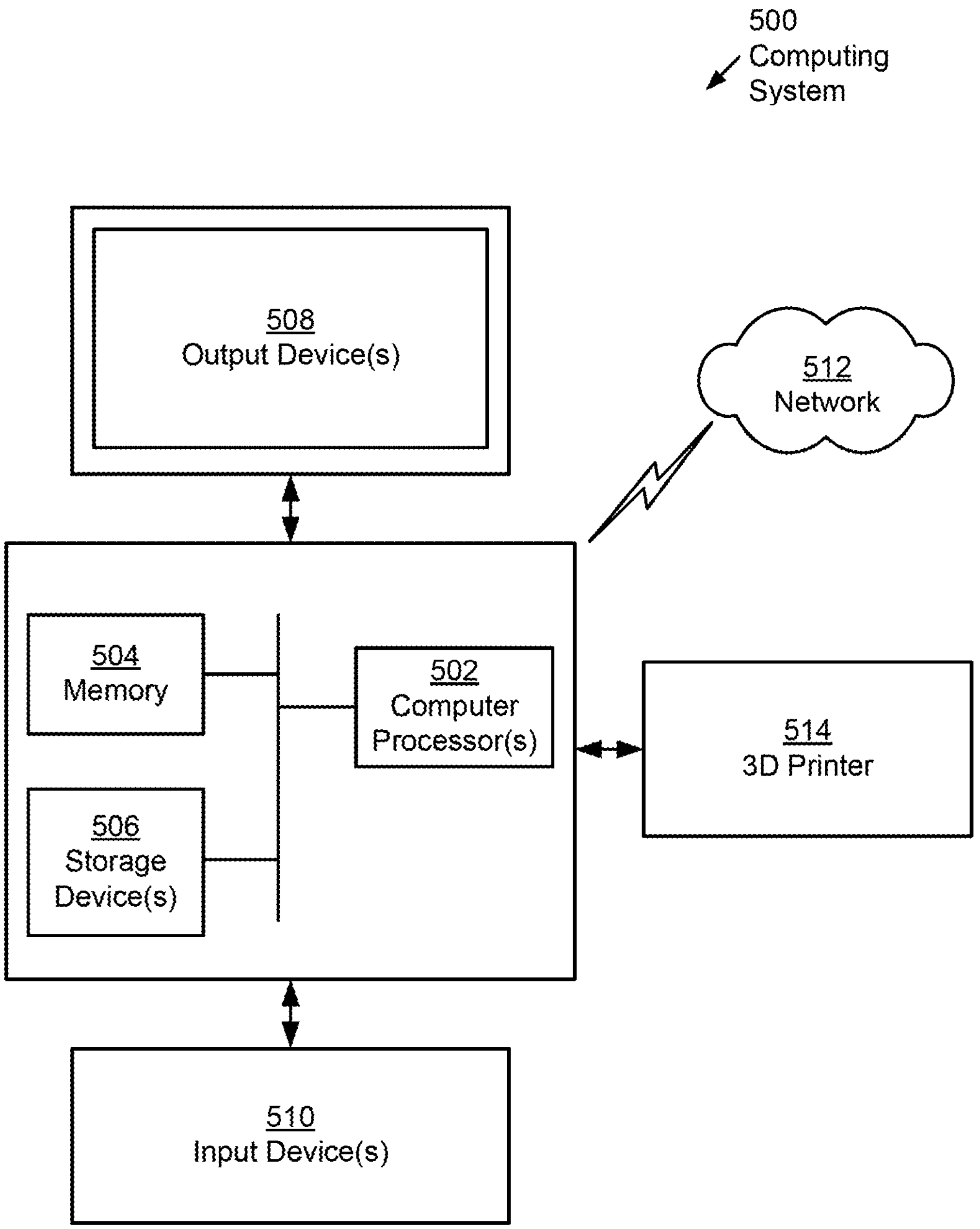
FIG. 42 is a schematic diagram showing a computing system that may be employed in manufacturing a mixing unit according to one or more embodiments of the present invention.

For example, as shown in FIG. 42, the computing system 500 may include one or more computer processor(s) 502, associated memory 504 (e.g., random access memory (RAM), cache memory, flash memory, etc.), one or more storage device(s) 506 (e.g., a hard disk, an optical drive such as a compact disk (CD) drive or digital versatile disk (DVD) drive, a flash memory stick, etc.), and numerous other elements and functionalities. The computer processor(s) 502 may be an integrated circuit for processing instructions. For example, the computer processor(s) may be one or more cores, or micro-cores of a processor. The computing system 500 may also include one or more input device(s) 510, such as a touchscreen, keyboard, mouse, microphone, touchpad, electronic pen, or any other type of input device. Further, the computing system 500 may include one or more output device(s) 508, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 500 may be connected to a network 512 (e.g., a local area network (LAN), a wide area network (WAN) such as the Internet, mobile network, or any other type of network) via a network interface connection (not shown). The input and output device(s) may be locally or remotely (e.g., via the network 512) connected to the computer processor(s) 502, memory 504, and storage device(s) 506.

Many different types of computing systems exist, and the aforementioned input and output device(s) may take other forms. Further, the computing system 500 may include one or more 3D printers 514 that may manufacture a mixing unit 1 according to one or more embodiments of the present invention.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 500 may be located at a remote location and connected to the other elements over a network 512. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, although the example where the two types of mixing elements described above are provided and they are alternately stacked has been described, for example, three or more types of elements may be provided. Instead of stacking the types of elements one by one, the types of elements may be irregularly stacked.

Although the embodiments discussed above have been described mainly with consideration given to the mixing and the reaction of a liquid and a gas as the fluid, the "fluid" of the present invention is not limited to what has been described above but includes a multiphase flow consisting of at least two or more types of liquids including a gas and a mist and solids such as a powder and granular material. The liquid may be a fluid such as a highly viscous liquid, a low viscous liquid, a Newtonian fluid or a non-Newtonian fluid. While "different types of fluids" includes fluids are different in composition, "different types of fluids" may also include fluids that have different ratios or temperatures of the same materials therein. For example, a salt water solution and a more dense salt water solution, or different temperature liquids or gases, are considered to be "different types of fluids."

Various types of mixing units and devices have been described as one or more embodiments of the present invention. One skilled in the art would appreciate that such units, device, and elements that constituent the units and devices may be manufactured by various types of manufacturing processes, e.g., employing a 3D printing, an injection molding, and a press molding.

While the invention has been described with respect to a limited number of embodiments, those skilled in the art, having benefit of this disclosure, will appreciate that other embodiments can be devised which do not depart from the scope of the invention as disclosed herein. Accordingly, the scope of the present invention is indicated not by the embodiments described above but by the scope of claims, and includes meaning equivalent to the scope of claims and all modifications and variations within the scope.

What is claimed is:

1. A mixing unit comprising:

a mixing body including mixing elements that are stacked in a stacking direction and that extend in an extending direction, wherein the mixing elements have a plurality of first through holes to form a flow path therein, and the mixing elements are arranged such that part or all of the first through holes in one of the mixing elements, whose upper surface is in contact with another mixing element and whose lower surface is in contact with another mixing element, communicate with first through holes in the adjacent mixing elements to allow fluid to be passed in the extending direction in which the mixing element extends and to be divided and combined as the fluid passes into the mixing elements and;

wherein the extending direction in which the mixing element extends is perpendicular to the stacking direction in which the mixing elements are stacked.

2. The mixing unit of claim 1, wherein the mixing elements include second through holes and are arranged such that the second through holes communicate with each other in a direction in which the mixing elements are stacked so as to form a hollow portion in the mixing body.

3. The mixing unit according to claim 1, wherein the mixing elements are arranged such that the first through hole in the one of the mixing elements overlaps the first through hole in the adjacent one of the mixing elements to allow the fluid to be unevenly divided in the extending direction.

4. The mixing unit according to claim 1, wherein the first through holes in each of mixing elements are non-linearly arranged in the extending direction.

5. The mixing unit according to claim 1, wherein the mixing elements are composed of layers or plates.

6. The mixing unit according to claim 1, wherein the mixing unit is formed as a single member.

7. A mixing device comprising the mixing unit according to claim 1, a fluid supplying unit, and a guide member connected between the fluid supplying unit and the mixing unit to allow fluid to pass into the mixing unit through the guide member and pass out therefrom.

8. An agitation impeller having the mixing unit of claim 1 disposed to be driven to rotate.

9. An agitation device comprising the agitation impeller of claim 8 and a mixing vessel within which the agitation impeller is disposed.

10. A mixer comprising:

a casing comprising a suction port that sucks fluid, and a discharge port that discharges fluid mixed within the casing;

a mixing unit supported by the casing for a rotatable movement around a rotational axis within and relative to the casing, and having a hollow part provided with an opening port around the rotational axis; and a flow path disposed within the mixing unit communicating the hollow part with a periphery of the mixing unit, wherein the casing sucks the fluid through the suction port from an outside of the casing into an inside of the casing, mixes the fluid within the casing, and discharges the fluid through the discharge port to the outside of the casing.

11. A mixing system comprising:

the mixer of claim 10; and a fluid circulating path communicating between the discharge port to the suction port of the mixer to allow the fluid to flow from the discharge port to the suction port for a circulation movement.

12. The mixing unit according to claim 1, further comprising a first layer and a second layer disposed opposite the first layer, wherein the mixing body is sandwiched between the first layer and the second layer.

13. The mixing unit according to claim 12, wherein the second layer comprises an opening portion that communicates with the first through holes in the mixing body; and wherein the flow path includes an opening portion on a periphery of the mixing unit that is different from the first and second layers.

14. A reaction device comprising the mixing unit of claim 12 disposed within a vessel provided with an inlet and an outlet for reacting fluid within the vessel.

15. The mixing unit according to claim 1, wherein each of the mixing elements comprises a partition wall between the first through holes.

16. The mixing unit according to claim 15, wherein the partition wall is disposed such that each of the mixing element is formed to have two layers of flow paths.

17. The mixing unit according to claim 16, wherein the partition wall is disposed in each of the mixing elements so as to produce a spiral flow.

18. A fluid mixing method using the mixing unit of claim 1, comprising the steps of:

passing fluid into the mixing body, and dividing the fluid through the first through holes arranged in the direction in which the mixing element extends.

19. A fluid mixing method using the mixing unit of claim 2, comprising the step of:

passing fluid into the mixing body, and rotating the mixing body to pass fluid into the hollow portion in the mixing body and to an outer circumferential portion of the mixing body through the first through holes.

20. A manufacturing method for a mixing unit, the method comprising:

forming mixing elements extending in an extending direction, each of which includes first through holes; and forming a mixing body by the mixing elements, wherein the mixing elements are arranged such that at least one of the first through holes of one of the mixing elements communicates with at least one of the first through holes in an adjacent one of the mixing elements, whose upper surface is in contact with another mixing element and whose lower surface is in contact with another mixing element, to allow fluid to be passed in the extending direction to provide a flow path that divides the fluid in the extending direction.

* * * * *